(12) United States Patent
Riar et al.

(10) Patent No.: US 11,626,811 B2
(45) Date of Patent: Apr. 11, 2023

(54) MULTI-LEVEL MODULAR CONVERTER

(71) Applicant: Auckland UniServices Limited, Auckland (NZ)

(72) Inventors: Baljit Singh Riar, Auckland (NZ); Duleepa Jayanath Thrimawithana, Auckland (NZ); Regan Andrew Zane, Hyde Park, UT (US); Wenwei (Victor) Wang, Auckland (NZ)

(73) Assignee: Auckland UniServices Limited, Auckland (NZ)

( * ) Notice: Subject to any disclaimer, the term of this patent is extended or adjusted under 35 U.S.C. 154(b) by 50 days.

(21) Appl. No.: 16/964,948

(22) PCT Filed: Jan. 25, 2019

(86) PCT No.: PCT/NZ2019/050006
§ 371 (c)(1),
(2) Date: Jul. 24, 2020

(87) PCT Pub. No.: WO2019/147144
PCT Pub. Date: Aug. 1, 2019

(65) Prior Publication Data
US 2021/0044216 A1 Feb. 11, 2021

(30) Foreign Application Priority Data
Jan. 25, 2018 (NZ) ........................................ 739396

(51) Int. Cl.
*H02M 7/483* (2007.01)
*H02J 50/12* (2016.01)
(Continued)

(52) U.S. Cl.
CPC ............. *H02M 7/483* (2013.01); *H02J 50/10* (2016.02); *H02J 50/12* (2016.02); *H02M 1/12* (2013.01);
(Continued)

(58) Field of Classification Search
CPC ............. H02M 7/4835; H02M 7/4815; H02M 7/4818; H02J 50/12
See application file for complete search history.

(56) References Cited

U.S. PATENT DOCUMENTS

2009/0009006 A1* 1/2009 Jin .......................... H02J 50/90
307/104
2011/0198936 A1* 8/2011 Graovac .................. B60L 58/14
363/71
(Continued)

OTHER PUBLICATIONS

International Search Report & Written Opinion for PCT/NZ2019/050006, dated Apr. 12, 2019.
(Continued)

*Primary Examiner* — Alex Torres-Rivera
(74) *Attorney, Agent, or Firm* — Piloff Passino & Cosenza LLP; Martin J. Cosenza

(57) ABSTRACT

The present disclosure relates to an integrated boost modular multilevel converter, which has particular, but not sole, relevance to a converter for an inductive or capacitive (wireless) power transfer system. More particularly, the present invention according to an embodiment discloses a modular multilevel power converter (MMPC) comprising: at least one submodule stack having an output for connection to a load and an input for connection to an input power source, at least one inductive element provided between the input and the output, the at least one submodule stack including at least two submodules, each submodule comprising at least one capacitor and a plurality of controllable switches, and the submodules being operable to selectively transfer energy from the at least one inductive element to boost a voltage at the output relative to a voltage at the input.

33 Claims, 36 Drawing Sheets

(51) Int. Cl.
  *H02J 50/10*    (2016.01)
  *H02M 1/12*    (2006.01)
  *H02J 7/02*    (2016.01)
(52) U.S. Cl.
  CPC ............ *H02M 7/4835* (2021.05); *H02J 7/02* (2013.01); *H02J 2310/48* (2020.01)

(56) References Cited

U.S. PATENT DOCUMENTS

| | | | |
|---|---|---|---|
| 2013/0119970 A1 | 5/2013 | Trainer et al. | |
| 2014/0203659 A1* | 7/2014 | Madawala | H04B 5/0037 307/104 |
| 2014/0355321 A1 | 12/2014 | Akagi et al. | |
| 2014/0362618 A1* | 12/2014 | Hassan | H02M 7/483 363/35 |
| 2016/0105109 A1 | 4/2016 | Jasim et al. | |
| 2017/0070096 A1* | 3/2017 | Madawala | B60L 53/122 |
| 2018/0233953 A1* | 8/2018 | Thrimawithana | H02J 50/12 |
| 2018/0354383 A1* | 12/2018 | Namou | B60L 53/124 |
| 2019/0089197 A1* | 3/2019 | Mao | H01F 27/363 |

OTHER PUBLICATIONS

Udaya K. Madawala et al., "A Bidirectional Inductive Power Interface for Electric Vehicles in V2G Systems," IEEE Transactions on Industrial Electronics, Oct. 2011, pp. 4,789-4,796, vol. 58, No. 10.

J. Mei et al., "Lithium-titanate battery (LTO): A better choice for High current equipment," 2016 International Symposium on Electrical Engineering (ISEE), Dec. 2016.

Omer C. Onar et al., "A Novel Wireless Power Transfer for In-Motion EV/PHEV Charging," 2013 Twenty-Eighth Annual IEEE Applied Power Electronics Conference and Exposition (APEC), Mar. 2013.

Zeinab Rezvani et al., "Advances in consumer electric vehicle adoption research: A review and research agenda," Transportation Research Part D: Transport and Environment, Jan. 2015, pp. 122-136, vol. 34.

Braden J. Limb et al., "Economic Feasibility and Infrastructure Optimization of In-Motion Charging of Electric Vehicles Using Wireless Power Transfer," 2016 IEEE PELS Workshop on Emerging Technologies: Wireless Power Transfer (WoW), Oct. 2016.

Hulong Zeng et al., "SiC-Based Z-Source Resonant Converter With Constant Frequency and Load Regulation for EV Wireless Charger," IEEE Transactions on Power Electronics, Nov. 2017, pp. 8,813-8,822, vol. 32, No. 11.

Tobias Diekhans et al., "A Dual-Side Controlled Inductive Power Transfer System Optimized for Large Coupling Factor Variations and Partial Load," IEEE Transactions on Power Electronics, Nov. 2015, pp. 3,320-6,328, vol. 30, No. 11.

Hamid Reza Rahnamaee et al., "A Multi-level Converter for High Power-High Frequency IPT Systems," 2014 IEEE 5th International Symposium on Power Electronics for Distributed Generation Systems (PEDG), Jun. 2014.

Mohammed Alsolami et al., "A Gallium Nitride Device Based Switched Capacitor Multilevel Converter for UPS Applications," 2015 IEEE Applied Power Electronics Conference and Exposition (APEC), Mar. 2015.

Jose Rodriguez et al., "Multilevel Converters: An Enabling Technology for High-Power Applications," Proceedings of the IEEE, Nov. 2009, pp. 1,786-1,817, vol. 97, No. 11.

Yong Li et al., "Harmonic Elimination and Power Regulation Based Five-level Inverter for Supplying IPT Systems," 2015 IEEE PELS Workshop on Emerging Technologies: Wireless Power (2015 WoW), Jun. 2015.

Hamid Reza Rahnamaee, MOSFET based Multi-level Converter for IPT Systems, 2014 IEEE International Conference on Industrial Technology (ICIT), Feb. 2014.

Bac Xuan Nguyen et al., "Cascaded Multilevel Converter based Bidirectional Inductive Power Transfer (BIPT) System," 2014 International Power Electronics Conference (IPEC—Hiroshima 2014—ECCE Asia), May 2014.

Qijun Deng et al., "An Inductive Power Transfer System Supplied by a Multiphase Parallel Inverter," IEEE Transactions on Industrial Electronics, Sep. 2017, pp. 7,039-7,048, vol. 64, No. 9.

Hao Hao et al., "A Parallel Topology for Inductive Power Transfer Power Supplies," IEEE Transactions on Power Electronics, Mar. 2014, pp. 1,140-1.151, vol. 29, No. 3.

Su Zhang et al., "A New Controller for Modular Multi-level Converters," 2016 IEEE 2nd Annual Southern Power Electronics Conference (SPEC), Dec. 2016.

Gaurav R. Kalra, "A Novel Boost Active Bridge based Wireless Power Interface for V2G/G2V Applications,".

* cited by examiner

| Circuit State | SM1 | SM2 | SM3 | SM4 | Vpi |
|---|---|---|---|---|---|
| #1 | 0 | 0 | 0 | 0 | 0 |
| #2 | 1 | 0 | 0 | 0 | Vdc/2D |
| #3 | 1 | 1 | 0 | 0 | Vdc/D |
| #4 | 0 | 1 | 0 | 0 | Vdc/2D |
| #5 | 0 | 0 | 1 | 0 | -Vdc/2D |
| #6 | 0 | 0 | 1 | 1 | -Vdc/D |
| #7 | 0 | 0 | 0 | 1 | -Vdc/2D |
| #8 | 0 | 1 | 1 | 1 | -Vdc/2D |
| #9 | 1 | 0 | 1 | 1 | -Vdc/2D |
| #10 | 1 | 1 | 0 | 1 | Vdc/2D |
| #11 | 1 | 1 | 1 | 0 | Vdc/2D |
| #12 | 1 | 0 | 0 | 1 | 0 |
| #13 | 0 | 1 | 0 | 1 | 0 |
| #14 | 0 | 1 | 1 | 0 | 0 |
| #15 | 1 | 0 | 1 | 0 | 0 |
| #16 | 1 | 1 | 1 | 1 | 0 |

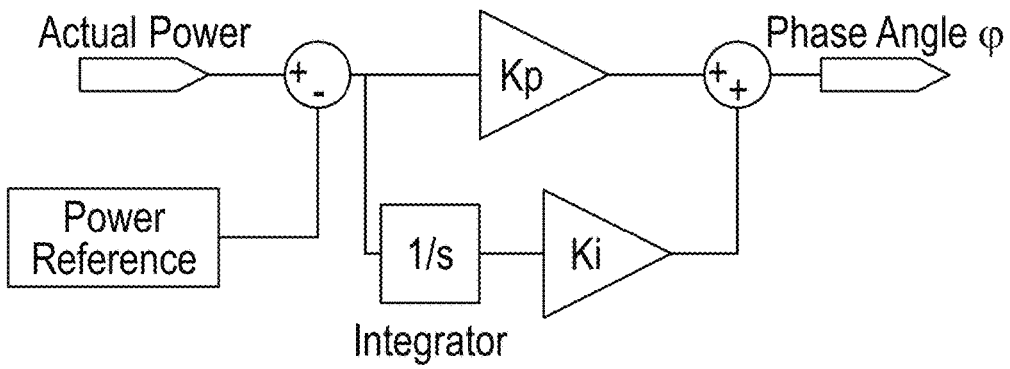
FIG. 6
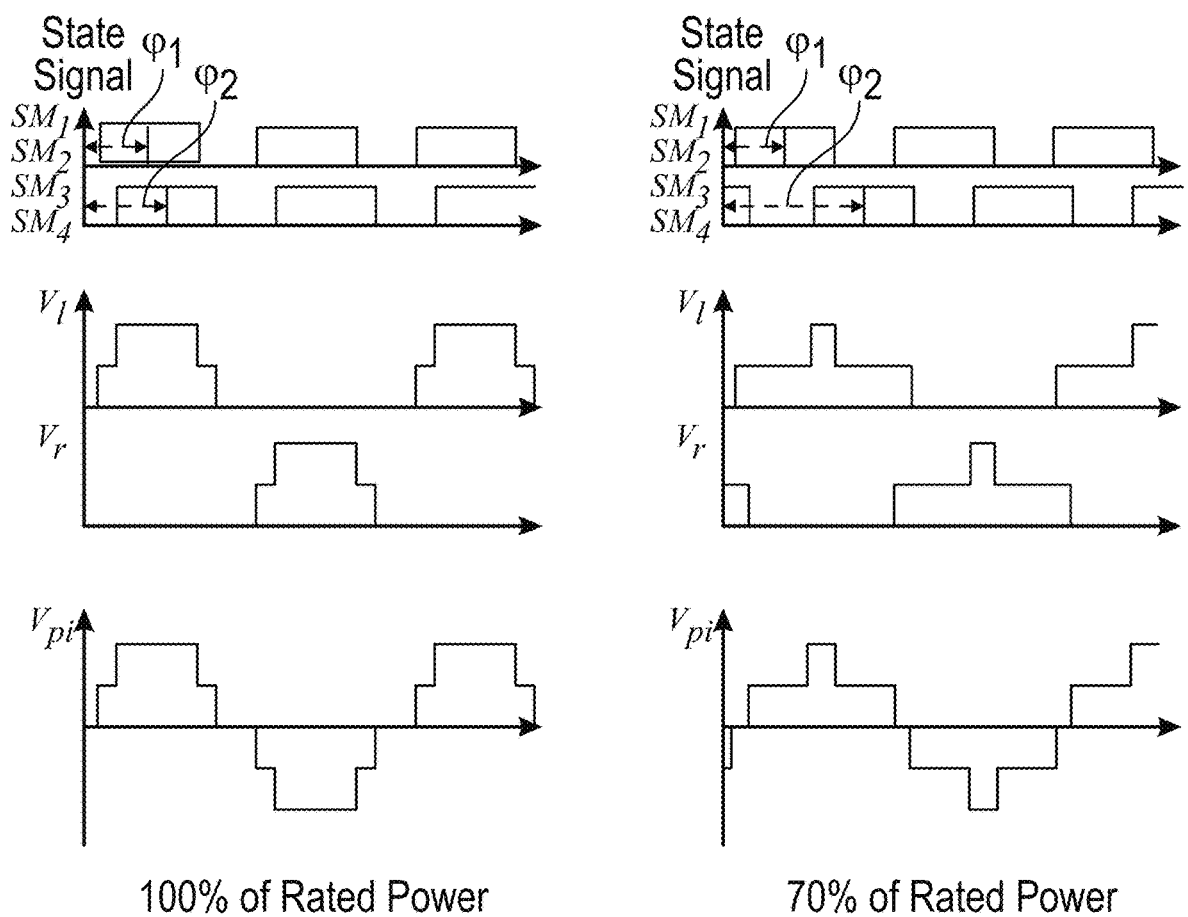
FIG. 7A  100% of Rated Power
FIG. 7B  70% of Rated Power

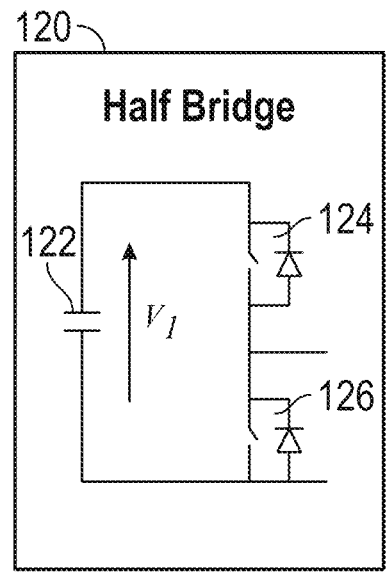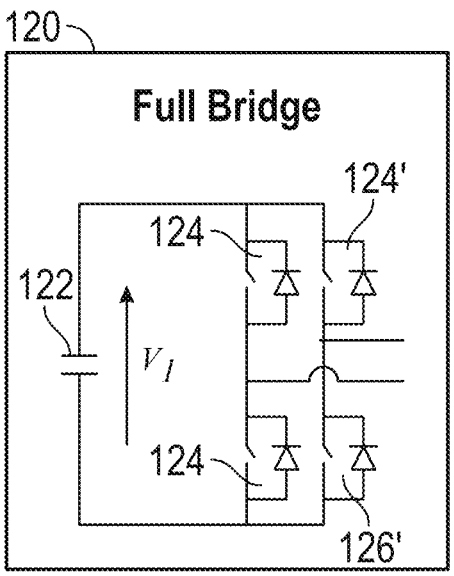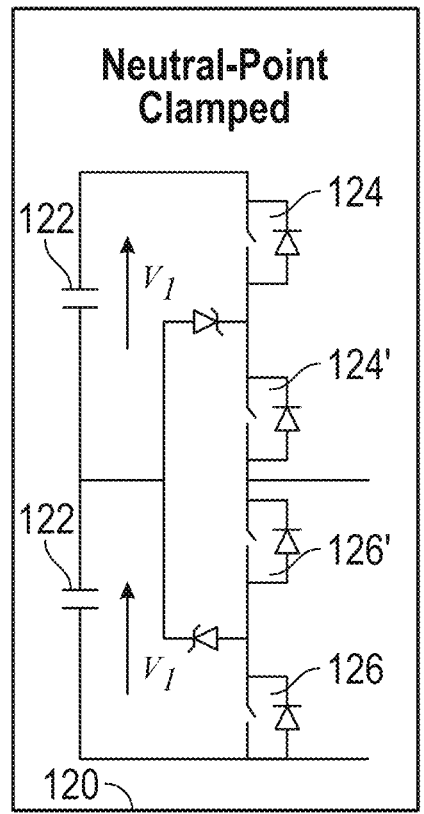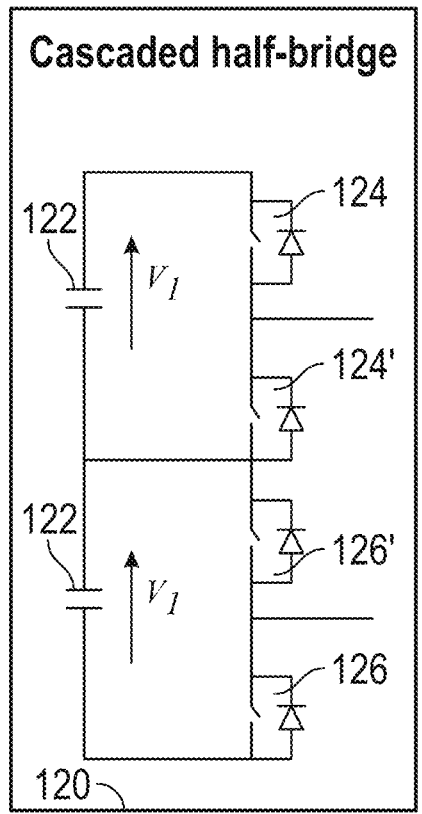
FIG. 11E 3.7kW

Circuit State #1

Circuit State #2

Circuit State #3

Circuit State #4

Circuit State #5

Circuit State #6

Circuit State #7

5-Level Staircase Waveform

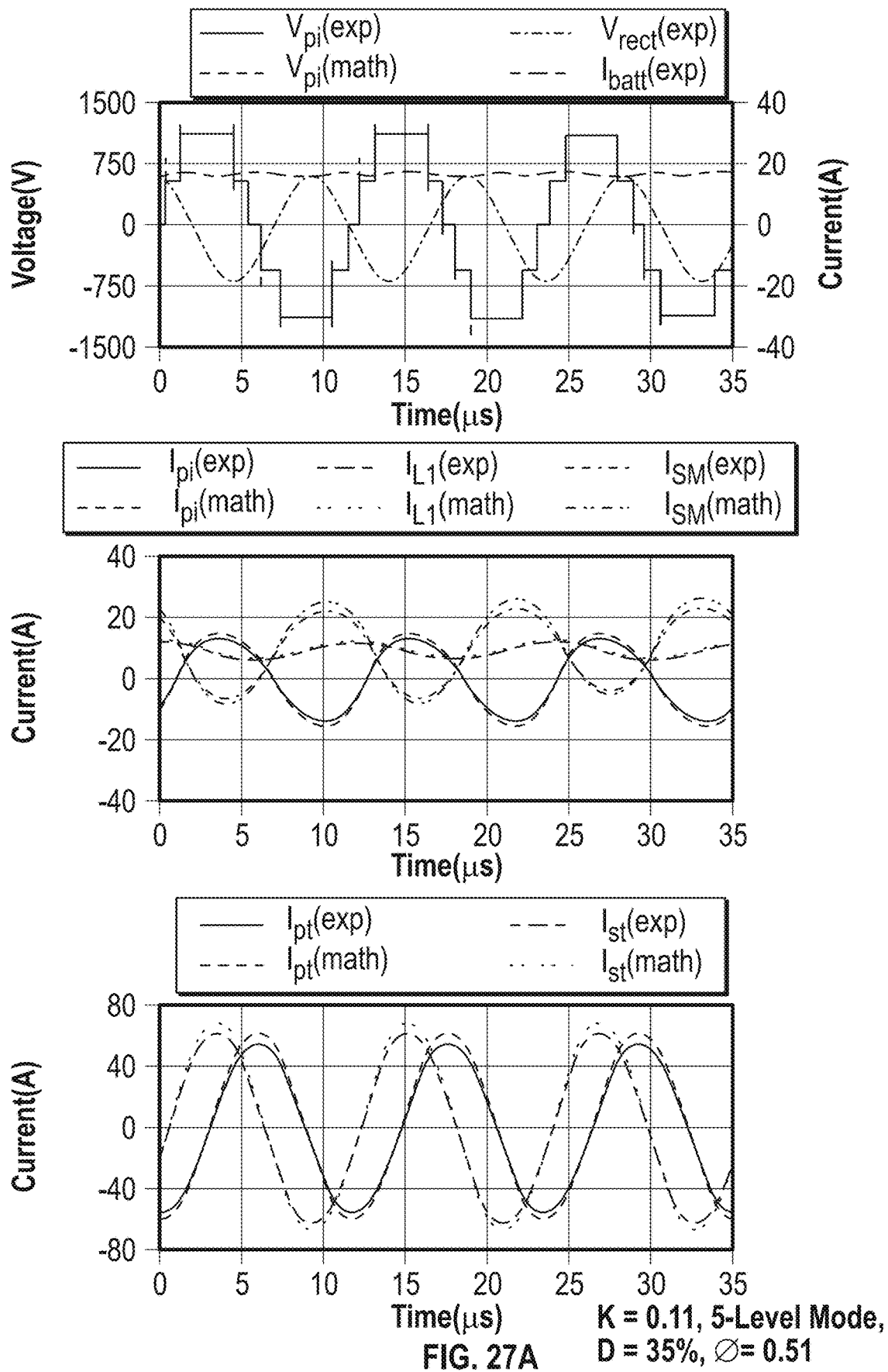
FIG. 27A  K = 0.11, 5-Level Mode, D = 35%, ⌀ = 0.51

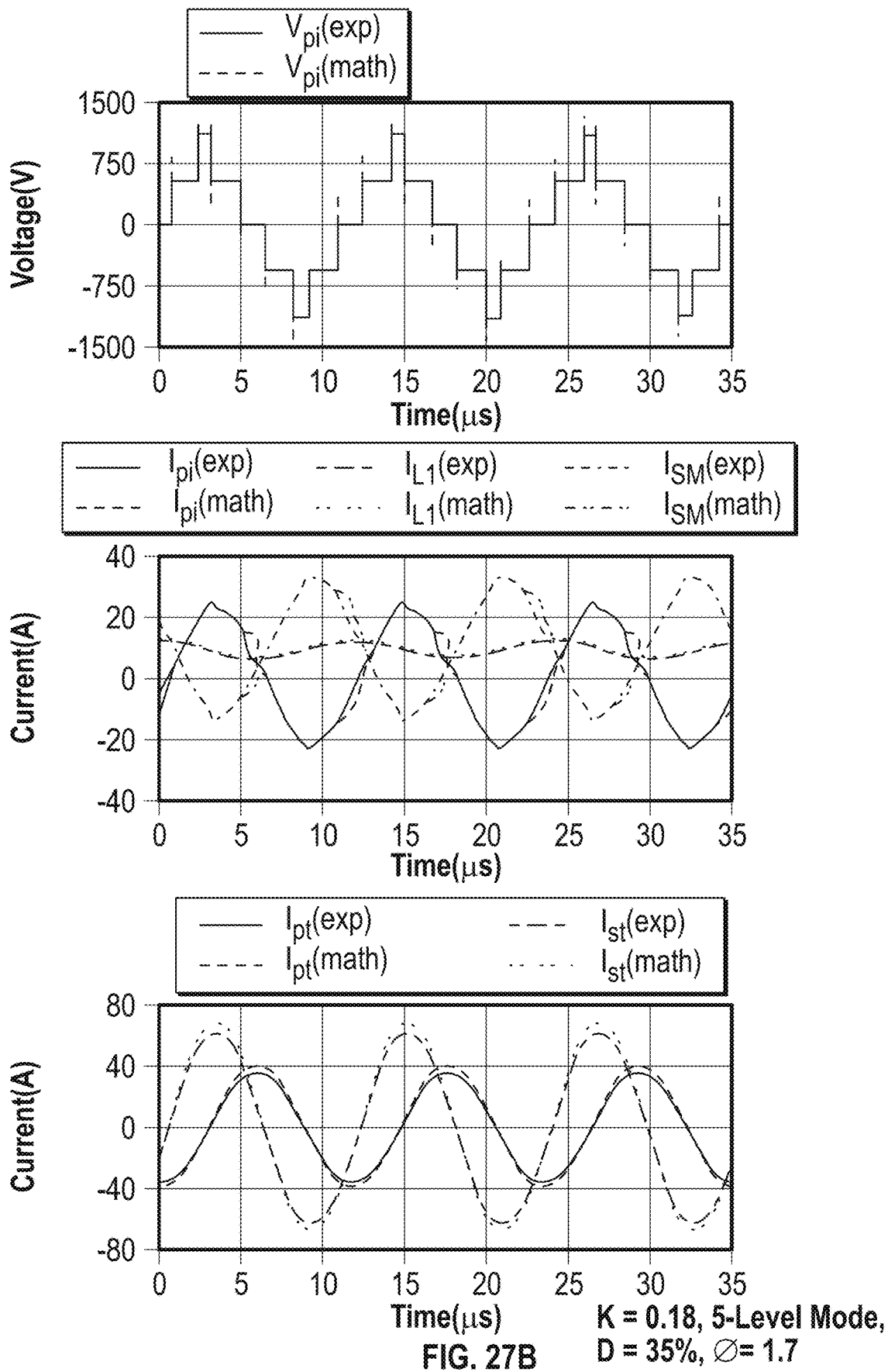
FIG. 27B  K = 0.18, 5-Level Mode, D = 35%, ∅ = 1.7

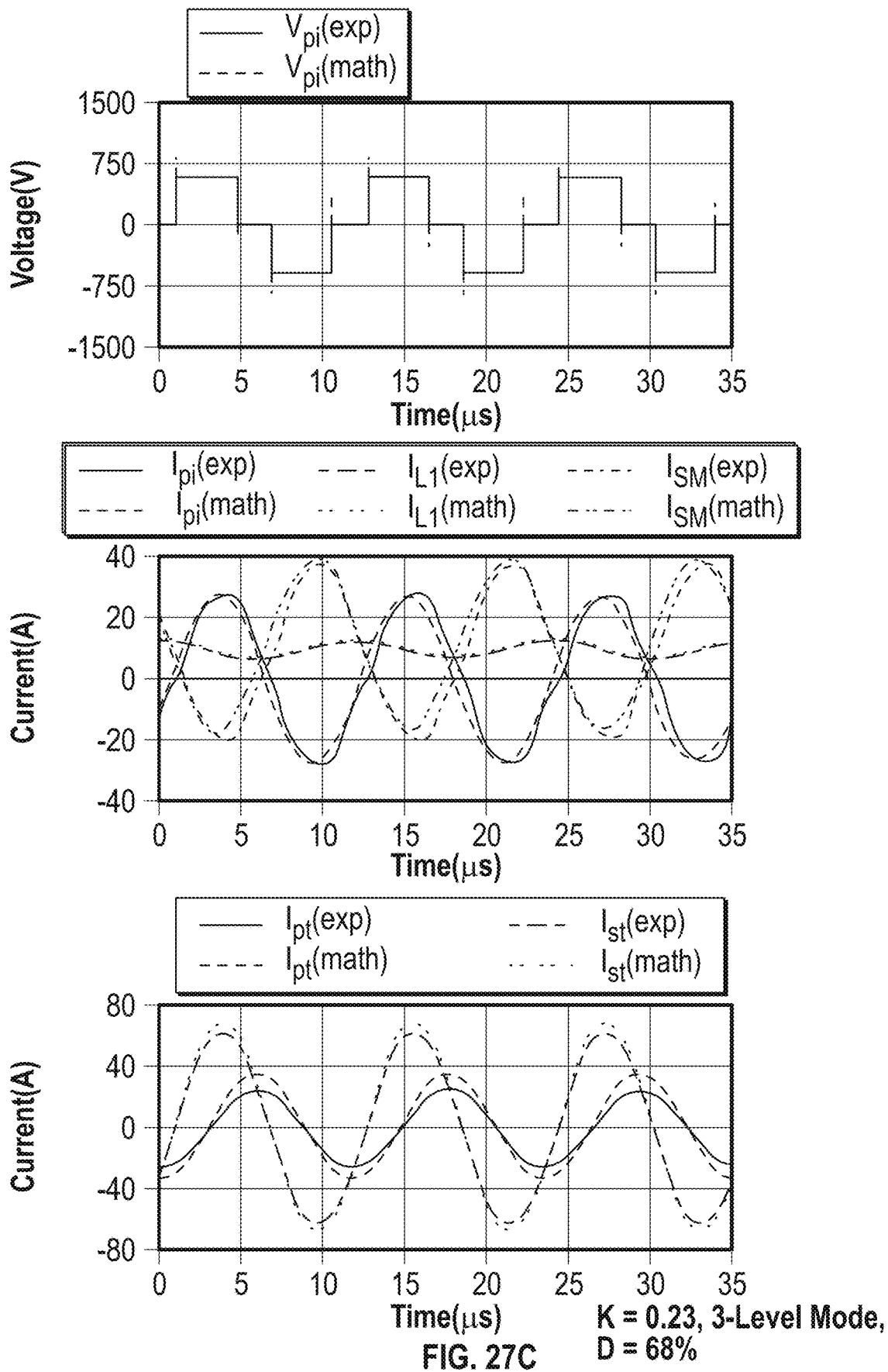
FIG. 27C  K = 0.23, 3-Level Mode, D = 68%

MULTI-LEVEL MODULAR CONVERTER

FIELD OF THE DISCLOSURE

The present disclosure relates to an integrated boost modular multilevel converter, which has particular, but not sole, relevance to a converter for an inductive or capacitive (wireless) power transfer system.

BACKGROUND

Electric Vehicles (EVs) are becoming increasingly popular as the preferred transportation method for a sustainable future. Although currently EVs employ wired chargers, Wireless Power Transfer (WPT) technology is expected to revolutionize the way EVs are charged by offering an attractive alternative. This has fuelled the development of cost effective commercially viable WPT solutions to allow EVs to be simply charged by parking over a designated ground-based charging pad.

In-home wired and wireless EV chargers were traditionally designed to operate with a single-phase supply and with power ratings of up to 7.4 kW, which results in charging times of between 3-7 hours. However, there is an increasing demand for faster charging speeds, especially at public EV charging stations. As a result, the industry focus is now shifting towards the design of wired and wireless fast chargers with power ratings of up to 150 kW. For example, the Nissan Leaf can be charged using its 50 kW rapid charger technology to achieve a charging time of 20~30 mins/100 km. The Tesla Model S, on the other hand, can be charged using their 120 kW supercharger technology at a rate of 10 mins/100 km. In the future, wireless fast chargers and new battery technologies are expected to be developed to make the charging of EVs convenient and comparable to the refuelling time of a vehicle with an internal combustion engine There is also a growing interest among researchers and industries to explore the feasibility of using WPT technology to charge EVs while being driven on roadways with special lanes containing underground charging pads. This application is referred to as in-motion charging or dynamic charging. It is expected to provide a cost-effective solution to issues such as limited range and charging speed, which are considered as the two main factors hindering the widespread use of EVs. As an example, a study conducted by Utah State University has shown that an EV with a 25 mile on-board electrical range and a 50 kW in-motion charging system can meet 99% of the mobility requirements of a typical light-duty vehicle user. Currently, the accumulators used in electric vehicles have an on-board range of about 70 miles to 300 miles, and accounts for a significant portion of the cost of an EV. Therefore, a significantly smaller accumulator is expected to dramatically reduce the ownership cost of an electric vehicle.

To address these future needs, there is a significant drive to develop high-power WPT systems that are suitable for fast-charging of stationary and moving vehicles. IGBT based full-bridge converters have traditionally been used in the primary supply of high-power WPT systems and recently the use of SiC MOSFET based full-bridge converter designs have been explored. In these designs, the primary full-bridge converter is operated close to the resonant frequency of the system and phase-shift modulation is used to regulate the power flow. As a result, the voltage waveform generated by the full-bridge converter has significant harmonic content, which becomes a considerable issue at higher-power levels due to additional conduction losses introduced in switches and the tuning network. Although pulse width modulation (PWM) schemes can be employed to improve the Total Harmonic Distortion (THD) of the converter output, the higher switching losses from increased switching frequency will have a significant impact on the efficiency.

Alternatively, multilevel converters with pulse amplitude modulation schemes, which yield high quality output waveform with lower THD, can be utilized in high power WPT systems. Multilevel converters also greatly reduce the voltage stress on the switching devices, making it possible to use low voltage rated devices such as high-performance Si and GaN MOSFET switches. Therefore, the combination of lower THD and better switching devices could enable the development of efficient and affordable high-power WPT systems using multilevel converter topologies.

Among the many different types of multilevel converter topologies developed to-date, diode clamped converter, flying capacitor converter, cascaded full-bridge converter and modular multilevel converters become the industry standard. A diode clamped converter, shown in FIG. 1(a), utilizes a number of cascaded capacitors together with a special arrangement of diodes to synthesize an output voltage waveform with multiple voltage levels. The disadvantages of this technology are the need for clamping diodes and the difficulty to control real power flow. In contrast, a flying capacitor converter, shown in FIG. 1(b), employs a special arrangement of capacitors to generate a pulse amplitude modulated output voltage. The drawbacks of such a topology include the need for an excessive number of bulky storage capacitors, and the large circulating current when the capacitor voltages are imbalanced. A cascaded full-bridge converter, shown in FIG. 1(c), consists of a number of series connected full-bridge modules with its own storage capacitors. However, the need for separate DC sources increases the losses and the cost for such topology. The modular multilevel converter (MMC), depicted in FIG. 1(d), consists of a number of series-connected full-bridge or half-bridge modules, which are controlled to synthesize a multilevel output voltage. However, complex control techniques are required to balance the capacitor voltages and therefore to reduce circulating current.

To-date, the application of multilevel converters in WPT systems has been very limited, mainly as the WPT systems are operated at relatively lower voltages, typically in the range of 400 V to 800 V. The use of a few commonly known multilevel converter topologies in WPT systems have been recently investigated. Unfortunately, these WPT systems inherited some of the drawbacks of the multilevel converter topologies employed, limiting their suitability as an economical and efficient solution to high-power WPT systems. Therefore, currently, there is a significant drive to develop new and improved multilevel and modular converter topologies to address the limitations imposed by the existing converters employed in high-power WPT systems.

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

OBJECTS OF HTE DISCLOSURE

It is an object of the disclosure to provide a converter which will at least go some way to overcoming disadvantages of existing systems, or which will at least provide a useful alternative to existing systems.

Further objects of the disclosure will become apparent from the following description.

SUMMARY OF DISCLOSURE

Accordingly in one aspect the disclosure may broadly be said to consist in a modular multilevel power converter comprising:

at least one submodule stack having an output for connection to a load and an input for connection to an input power source, at least one inductive element provided between the input and the output, the at least one submodule stack including at least two submodules, each submodule comprising at least one capacitor and a plurality of controllable switches, and the submodules being operable to selectively transfer energy from the at least one inductive element to boost a voltage at the output relative to a voltage at the input.

Preferably, the energy is transferred between at least two of: the submodule(s), input power source and load.

Preferably the submodules are operable to provide a staircase voltage waveform at the output.

Preferably, the modular multilevel power converter comprises a plurality of submodule stacks.

A method of controlling a modular multilevel power converter having:

at least one submodule stack having an output for connection to a load and an input for connection to an input power source, at least one inductive element provided between the input and the output, the at least one submodule stack including at least two submodules, each submodule comprising at least one capacitor and a plurality of controllable switches, the method comprising:

operating the controllable switches to selectively transfer energy from the at least one inductive element to boost a voltage at the output relative to a voltage at the input.

Preferably the method includes operating the switches to selectively transfer energy between at least two of: the submodule(s), input power source and load.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the disclosure relates, such known equivalents are deemed to be incorporated in the specification.

DRAWING DESCRIPTION

A number of embodiments of the disclosure will now be described by way of example with reference to the drawings as follows.

Figures 3A, 3B:
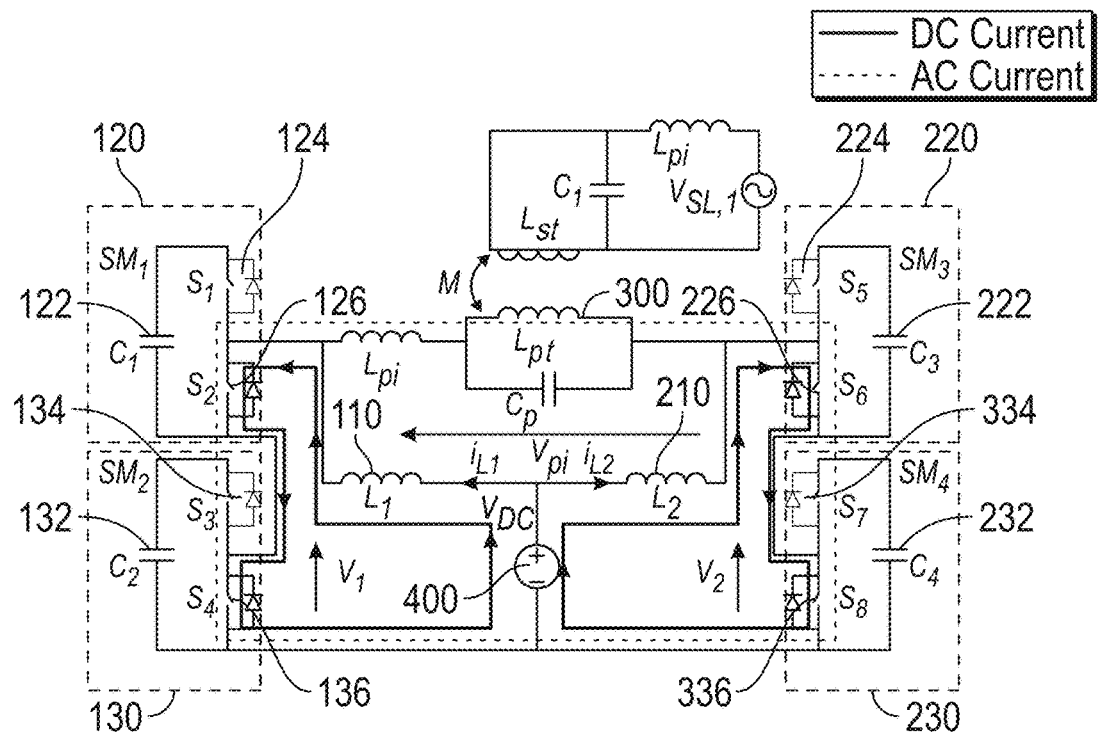

FIG. 3A depicts a state of all the 16 circuit states, and FIGS. 3B-3E depict diagrams of all the 16 circuit states, where the corresponding circuit diagram of the circuit states are also illustrated, for example (b) circuit state #1 current flow (c) circuit state #2 current flow (d) circuit state #3 current flow (e) circuit states #1-7 resulting 5 level staircase voltage waveform Vpi.

Figure 4:
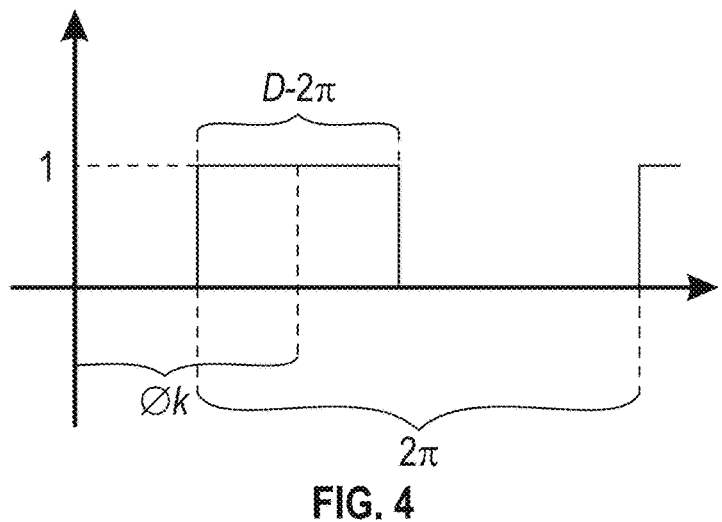

FIG. 4 shows a state signal describing the state of the submodule.

Figures 5A, 5B:
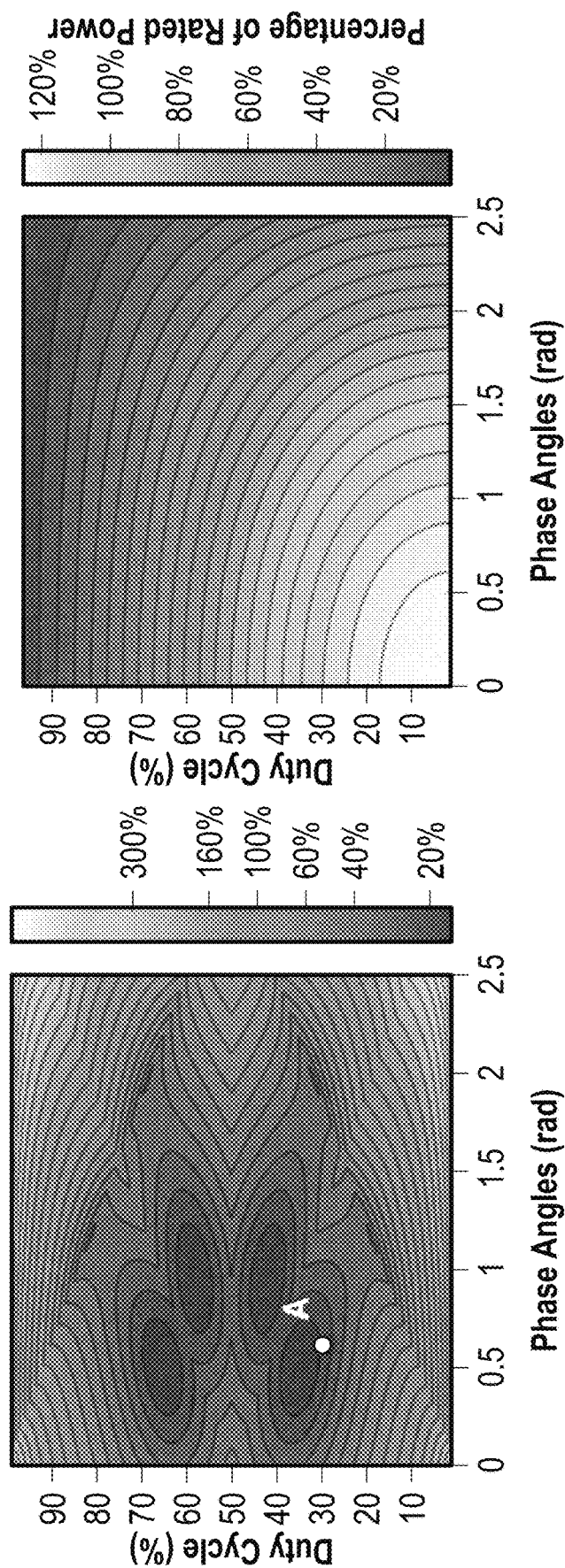

FIGS. 5A and 5B show, respectively (a) total harmonic distortion and (b) Power level for different combinations of Duty Cycle and Phase Angle in an IB-MMC with 2 SMs in each arm.

FIG. 6 depicts the PI controller for power regulation

Figure 8:
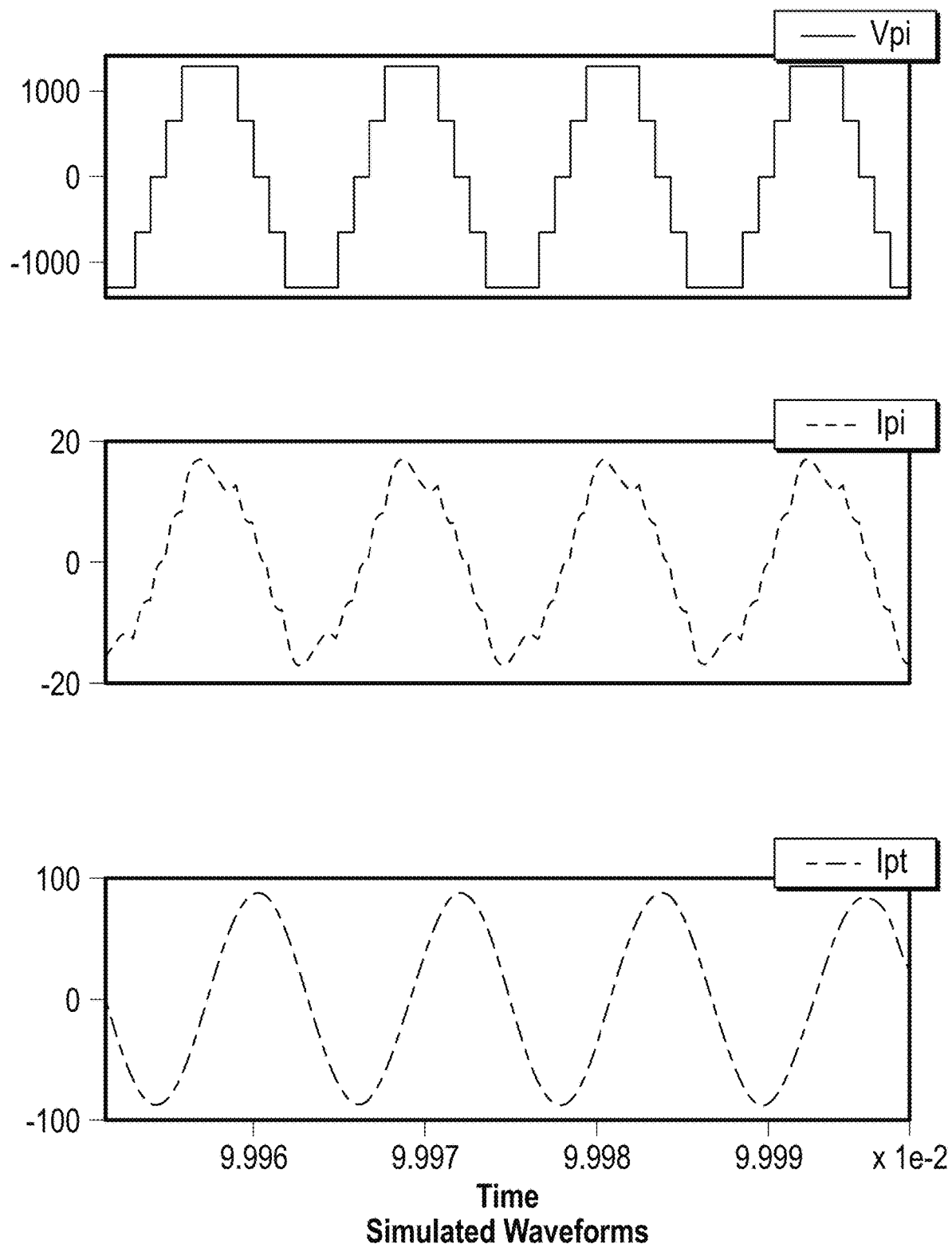

FIG. 7 is a graph showing SM state signals and Vpi waveforms at 100% and 70% rated power FIG. 8 shows simulated waveforms produced by a grid connected converter.

FIGS. 9a to 9L show current flows for different circuit states of the present IBMC disclosure.

Figure 10:
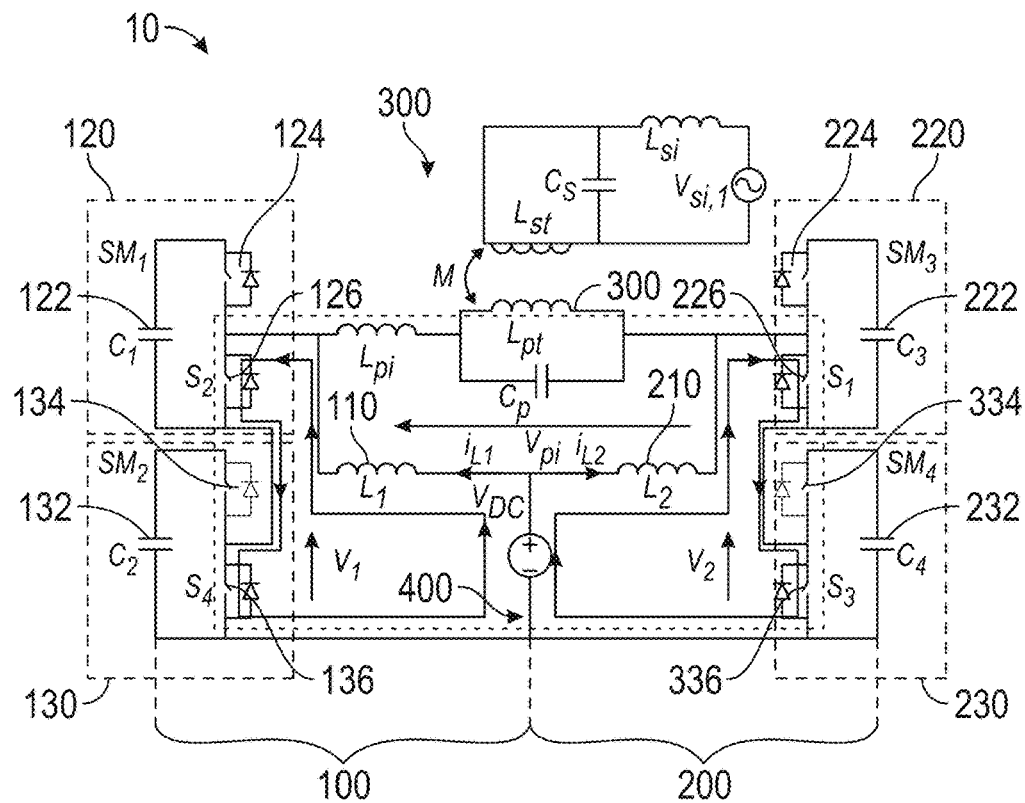

FIG. 10 depicts an embodiment of the circuit diagram of the present IBMC system.

FIGS. 11A to 11E depict the circuit diagrams of various embodiments of the present IBMC system, more specifically the figures illustrate the multilevel converter arrangements and sub module configurations (to half bridge, full bridge, cascaded half-bridge, neutral-point clamped configurations).

Figure 12:
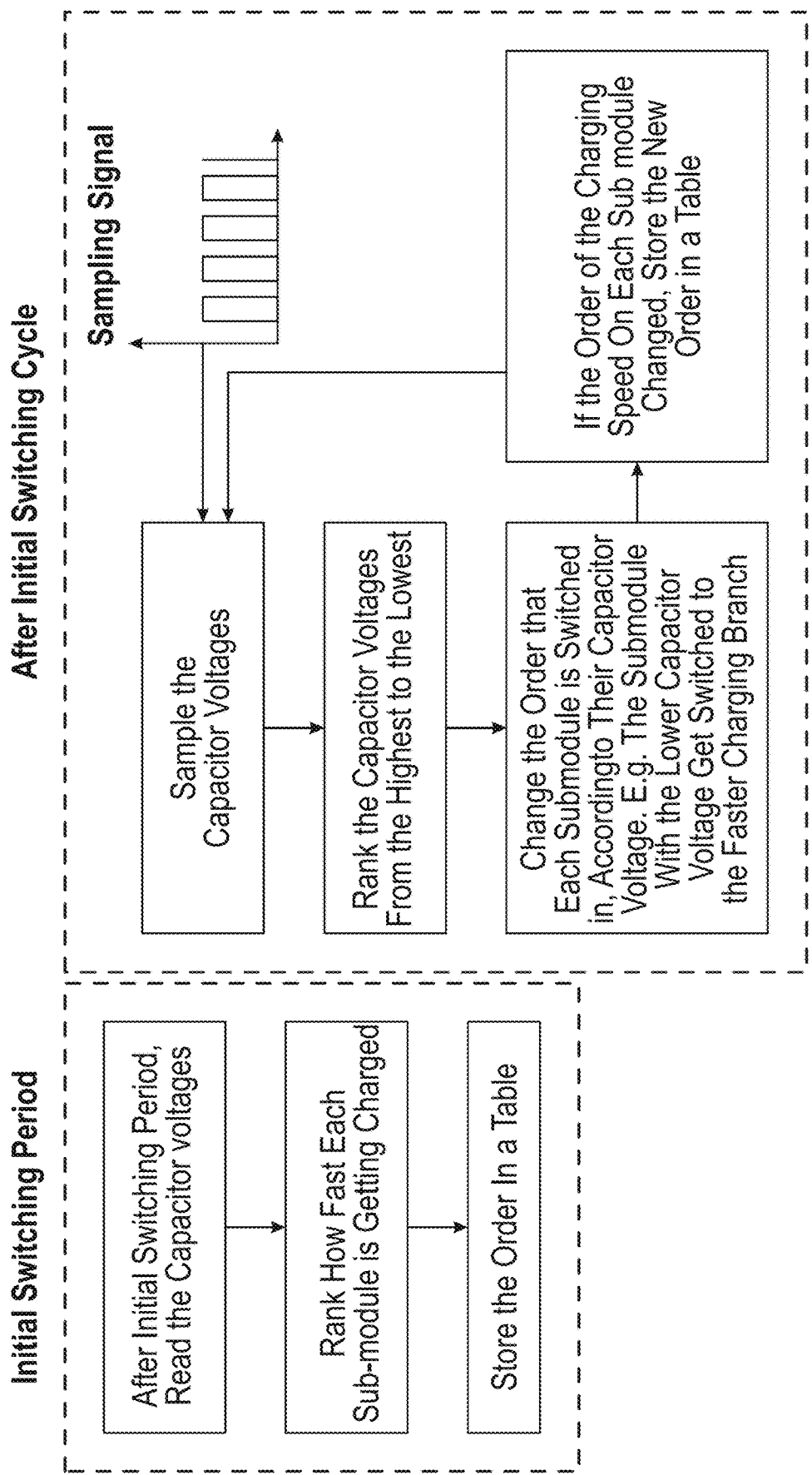

FIG. 12 shows a flowchart of the sorting algorithm for capacitor balancing.

Figure 13:
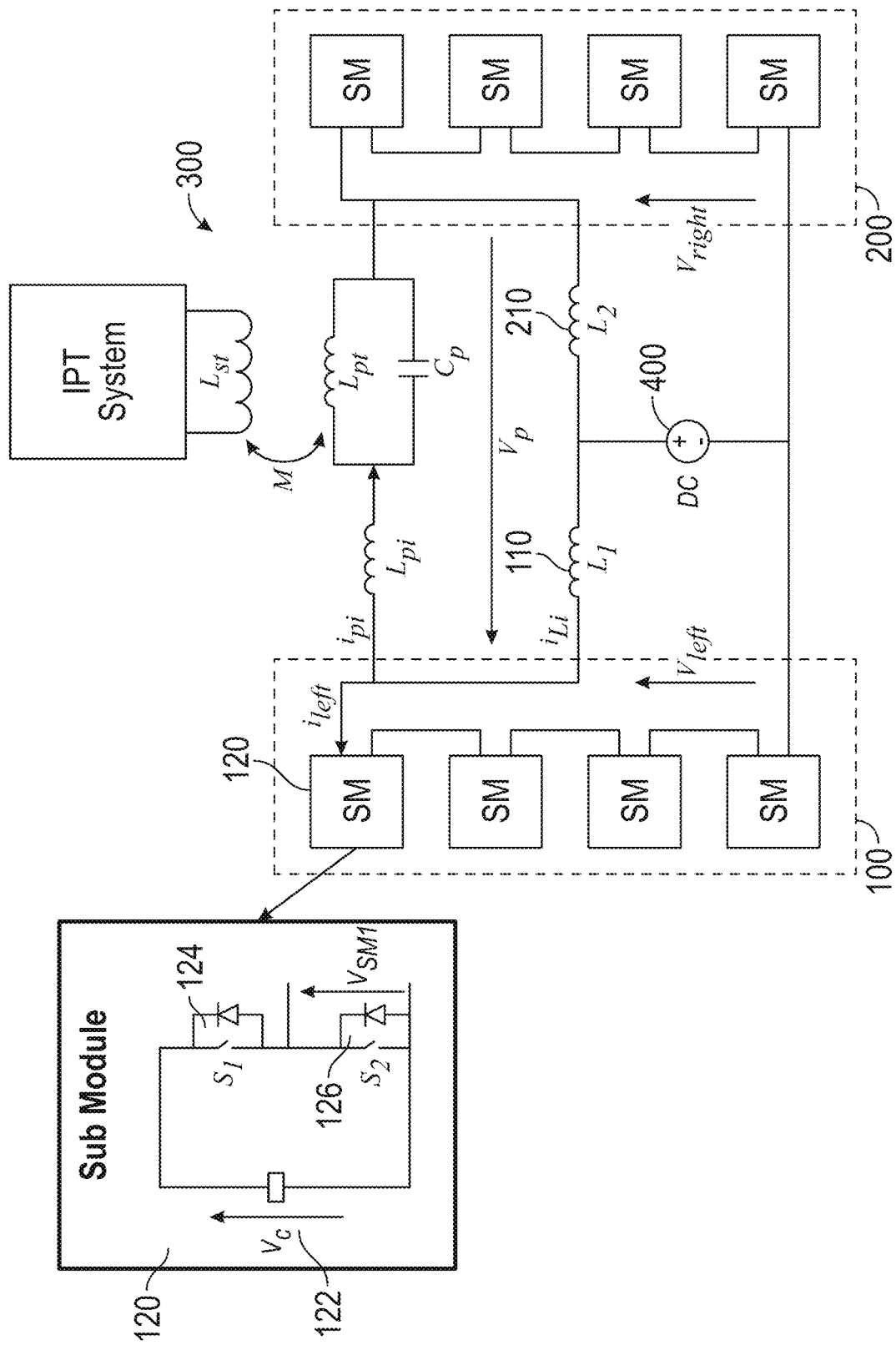

FIG. 13 depicts an example embodiment of the present IBMC system used in the simulation and testing.

Figure 14A:
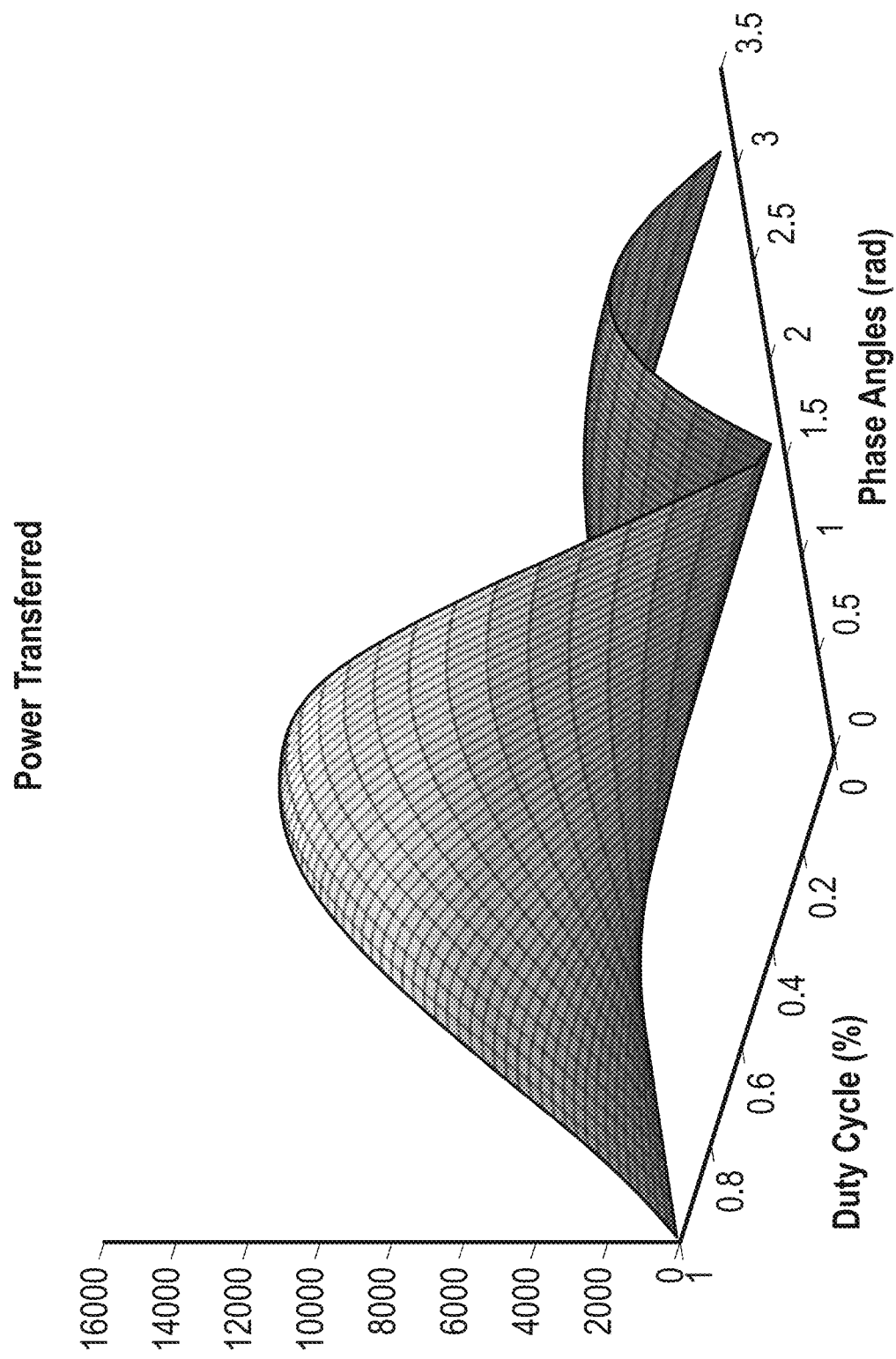
Figure 14B:
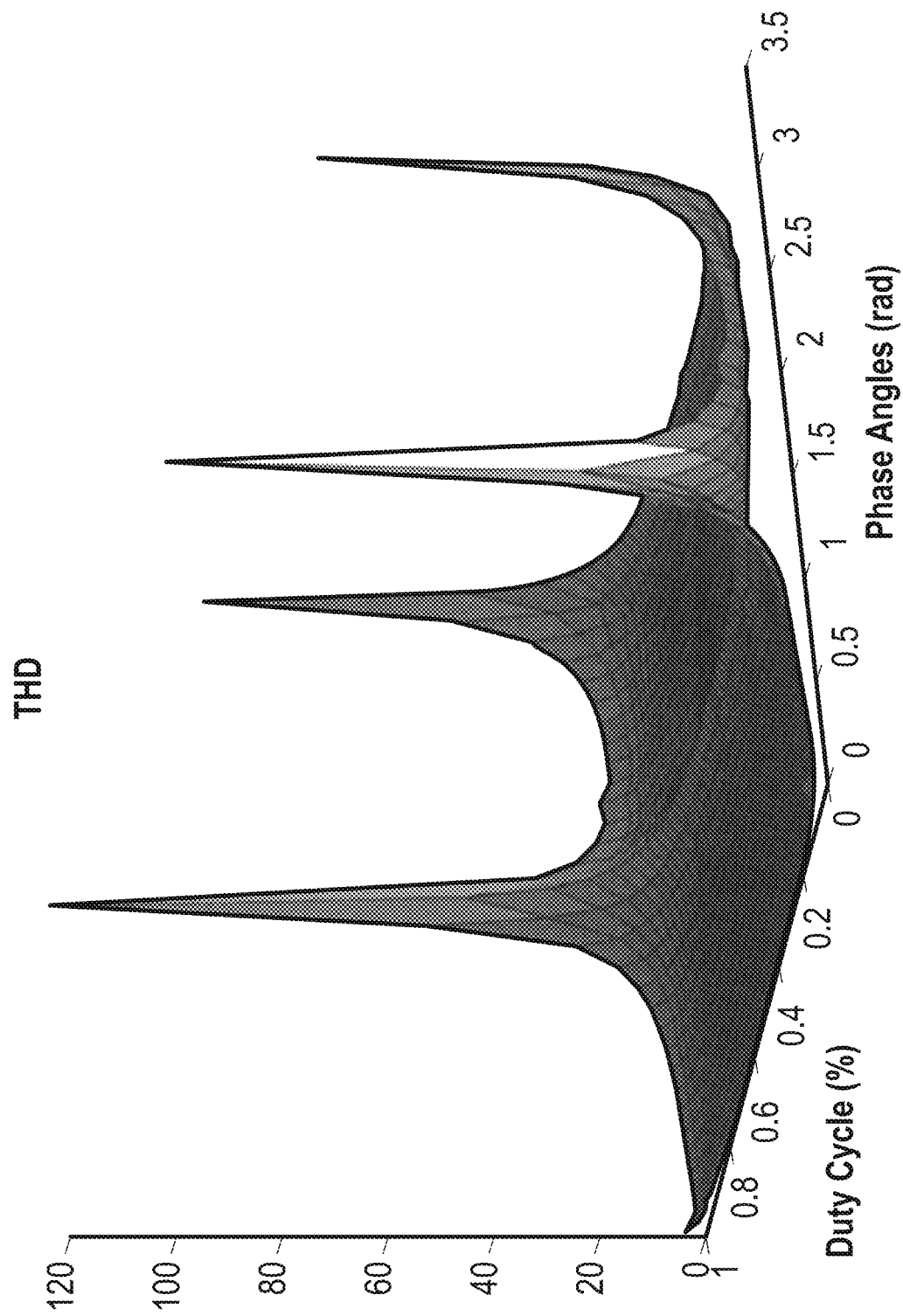
Figure 15:
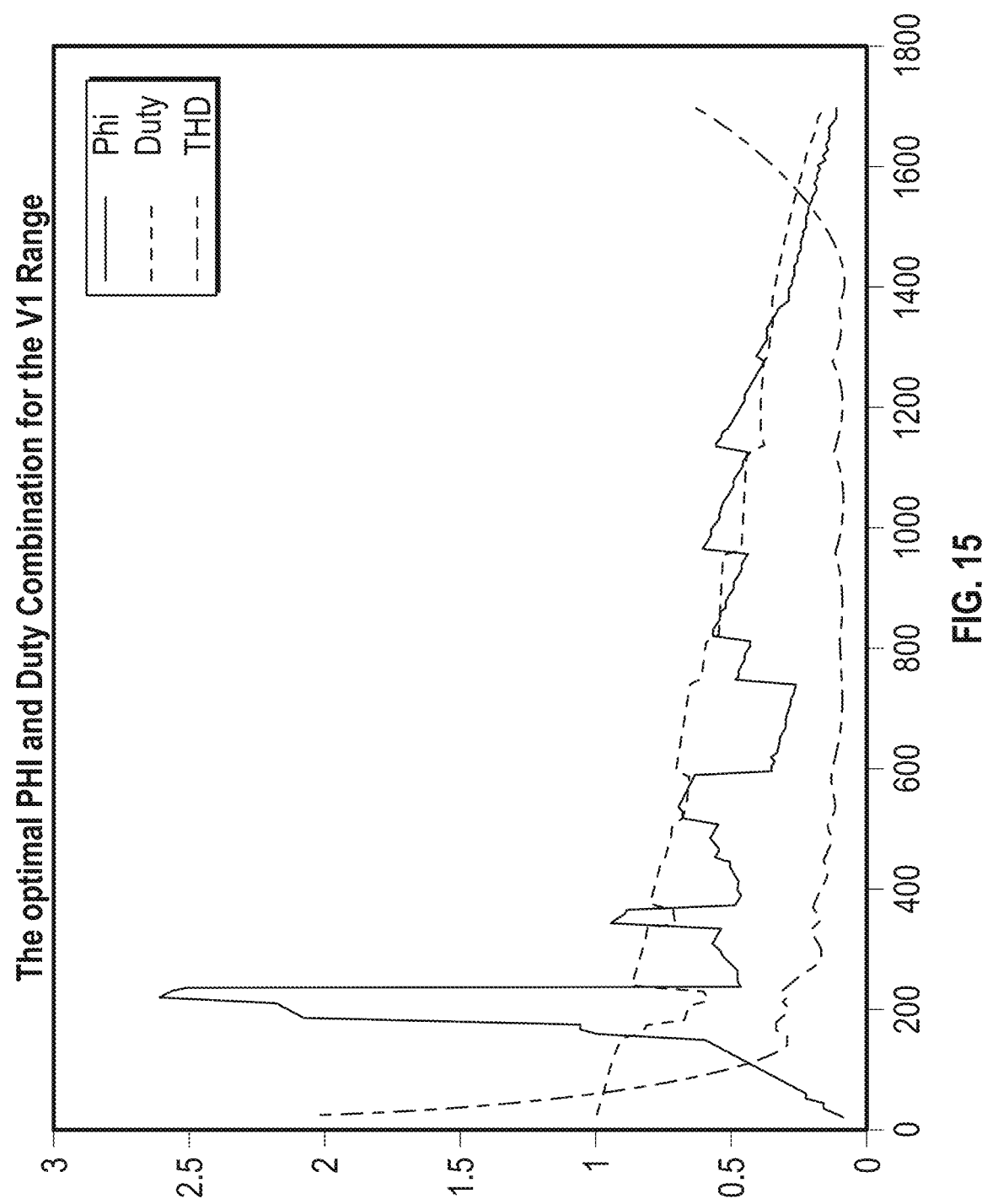

FIG. 14 illustrates the power level and THD for different combinations of duty cycle and phase angles FIG. 15 illustrates the optimal Duty Cycle and Phase Angle for Minimal THD of the IBMC system.

Figure 16:
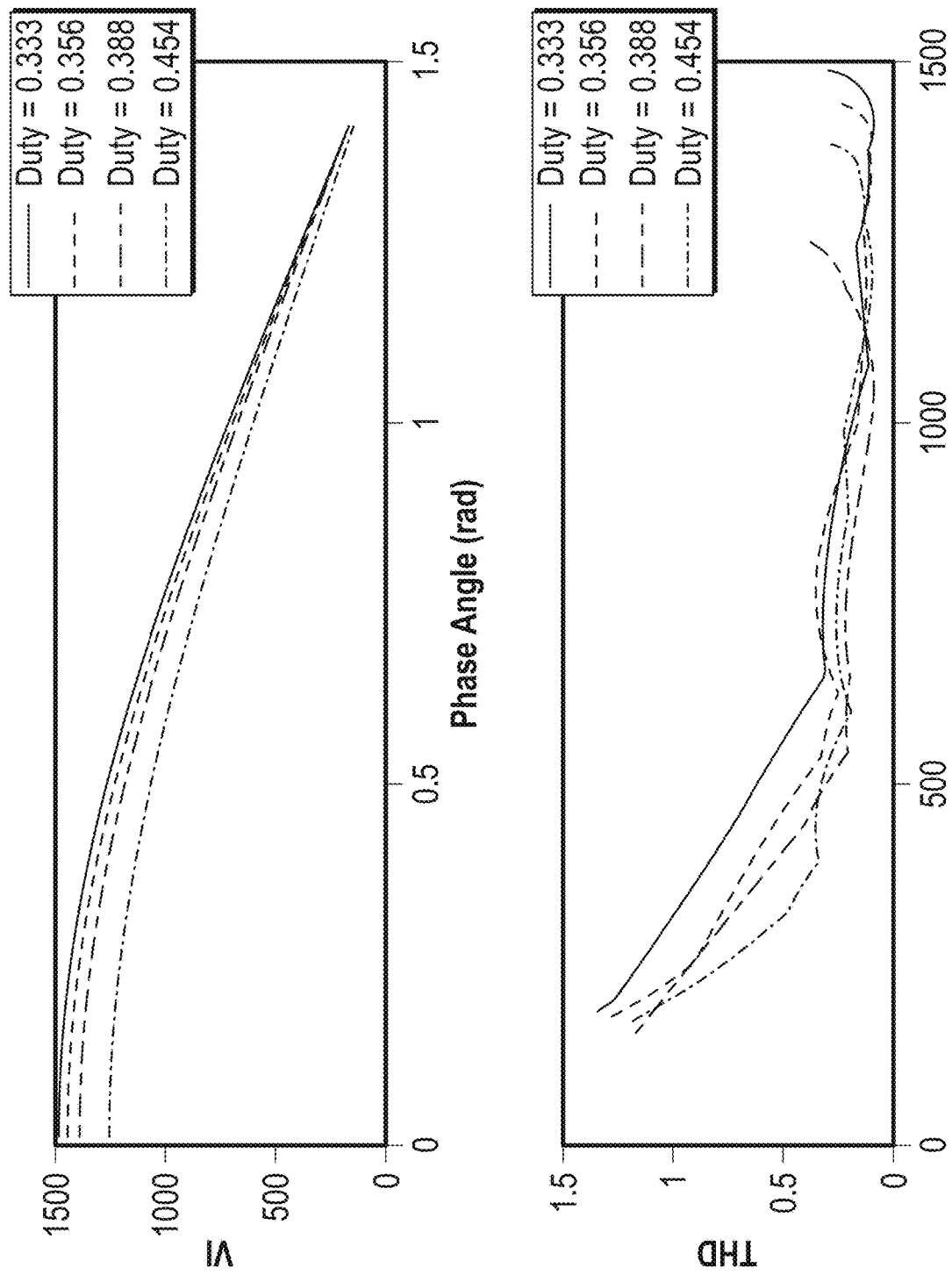

FIG. 16 illustrates a voltage curve V1 and a curve of a total harmonic distortion (THD) against varying phase angles, at different fixed duty cycles.

Figure 17:
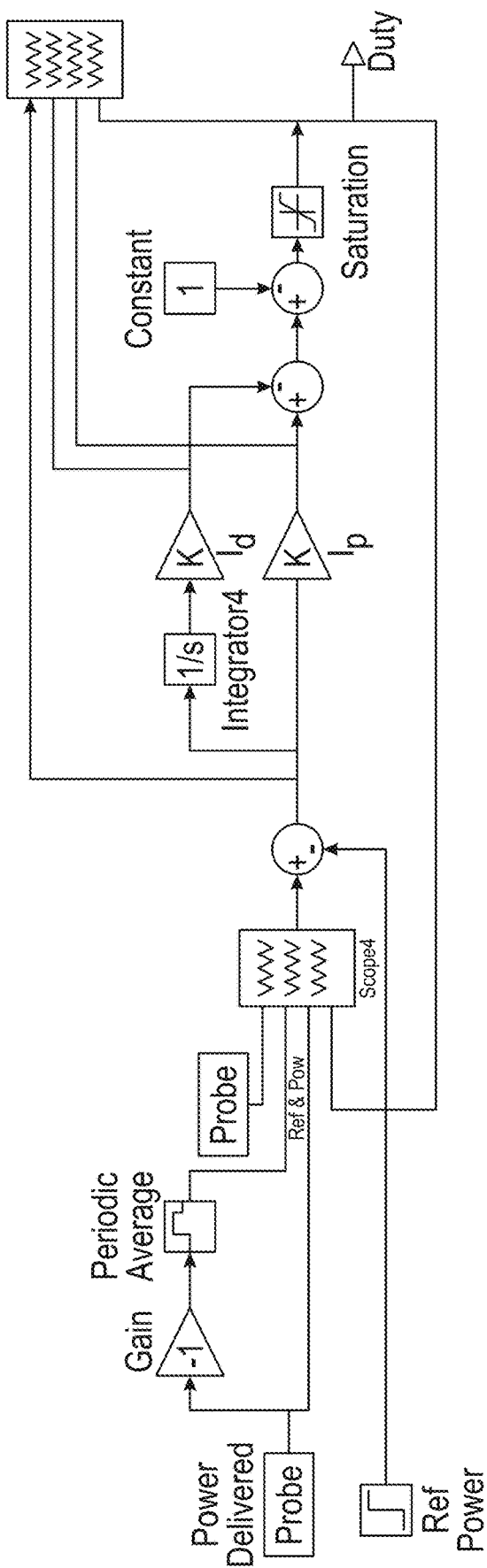

FIG. 17 shows a schematic of a PI controller for power transfer

Figure 18A:
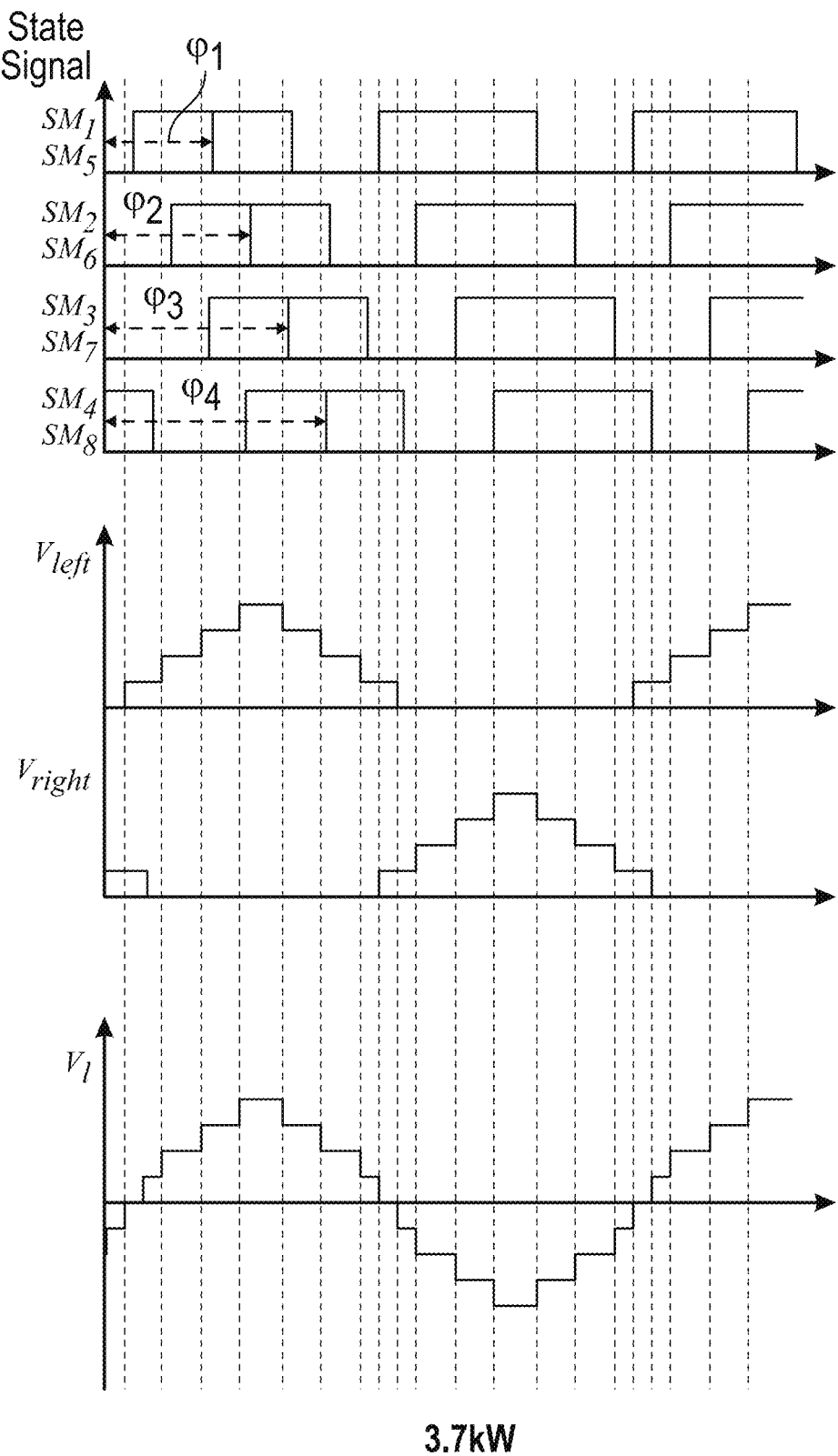
Figure 18B:
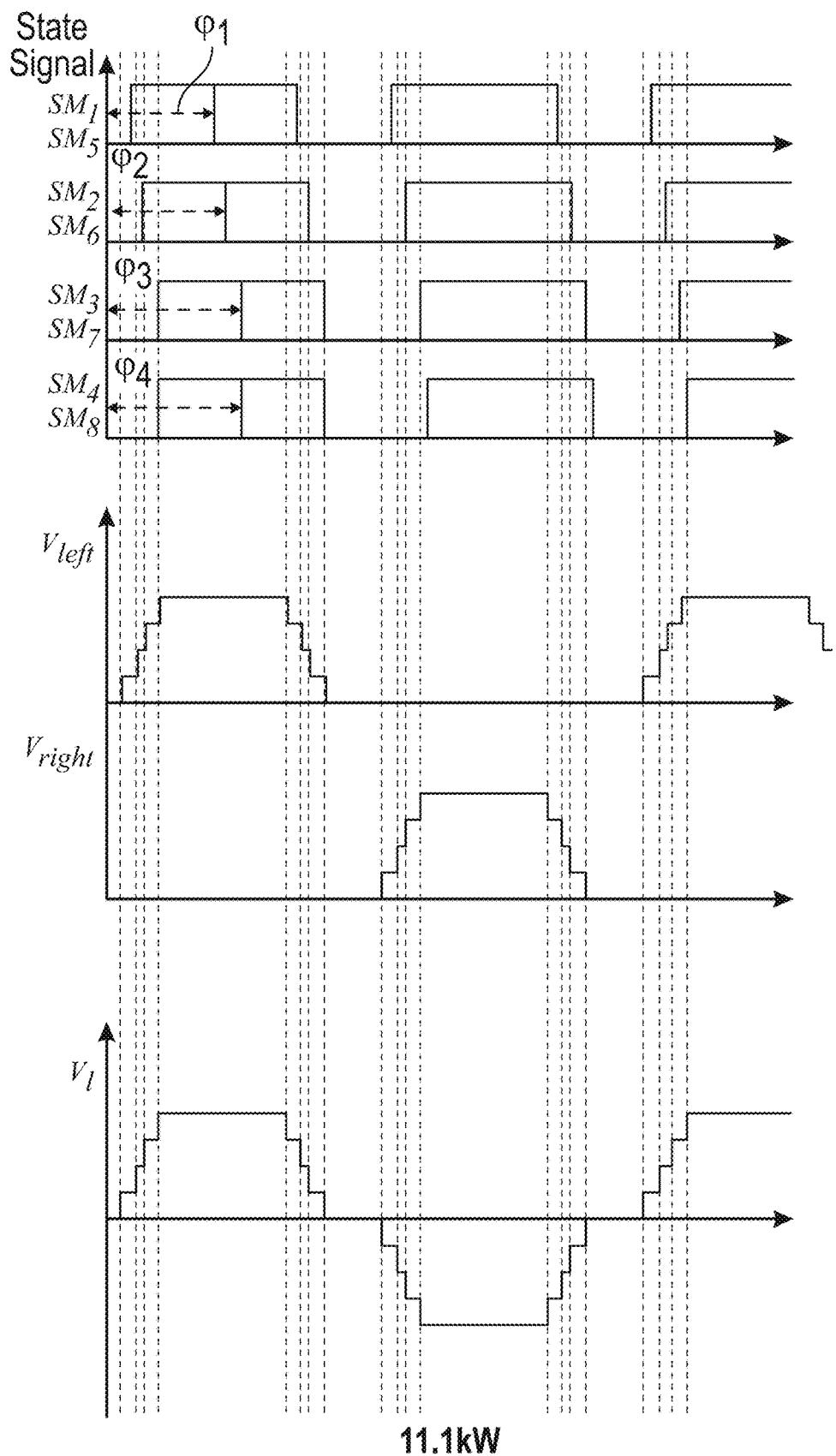

FIG. 18 shows curves of submodule state signals and voltage V1 waveforms at different values of power delivery.

Figure 19B:
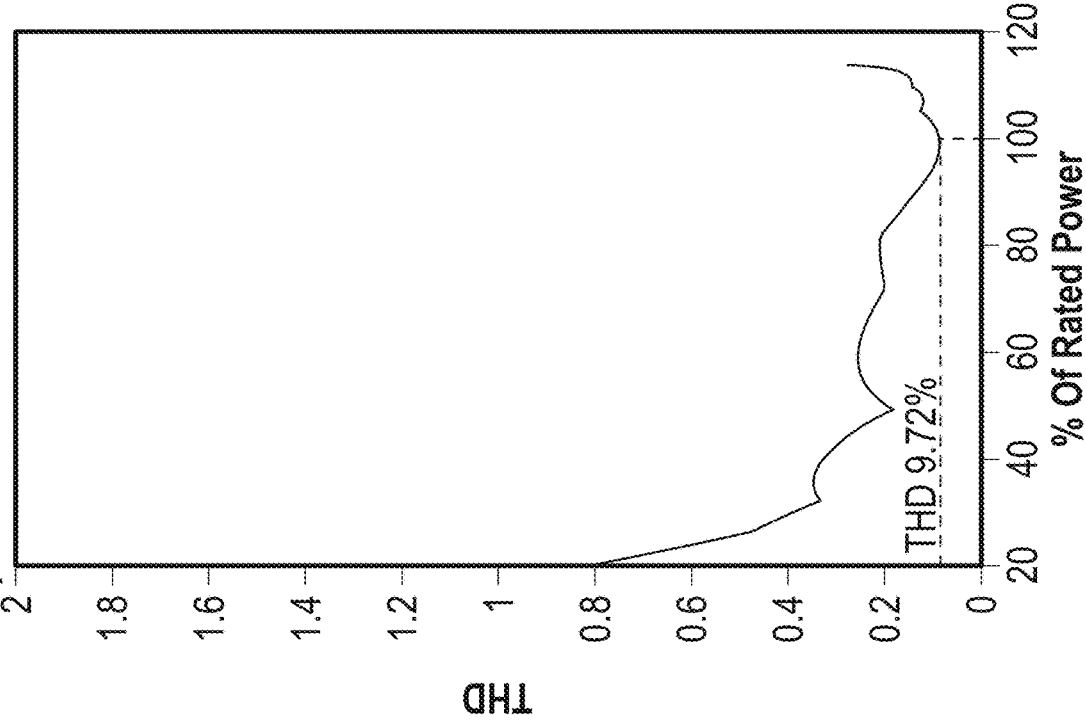
Figure 19A:
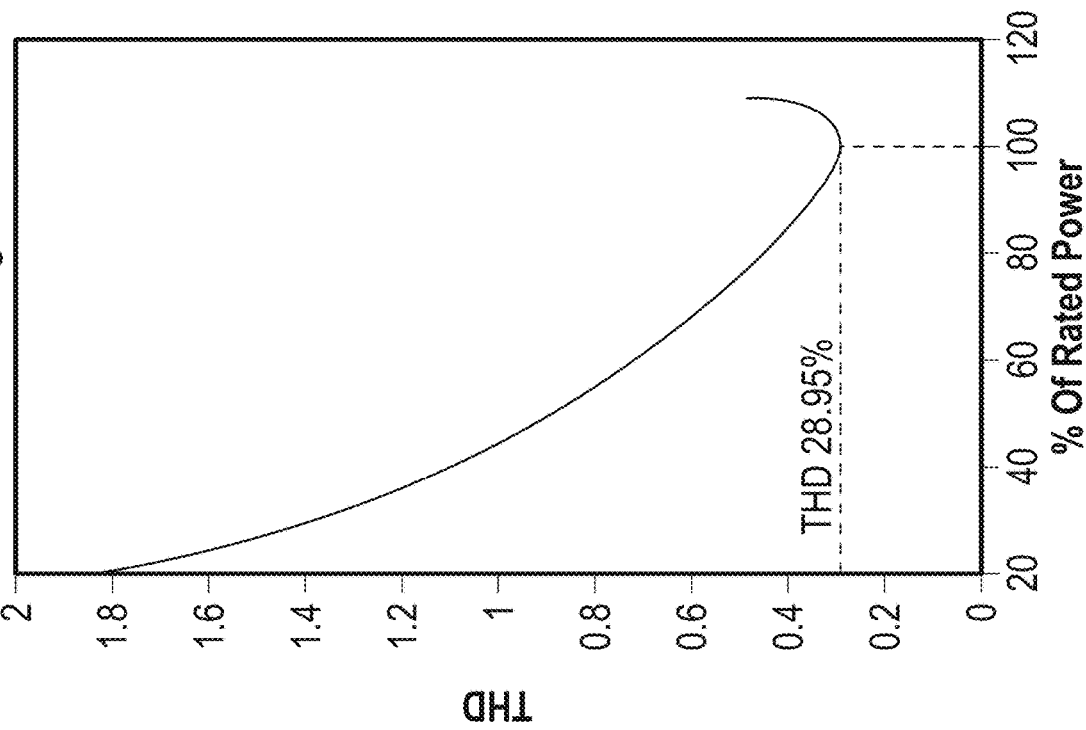

FIG. 19 shows the comparison of the graphs of the percentage of rated power between a traditional H-Bridge converter and the current IBMC THD comparison.

Figure 20:
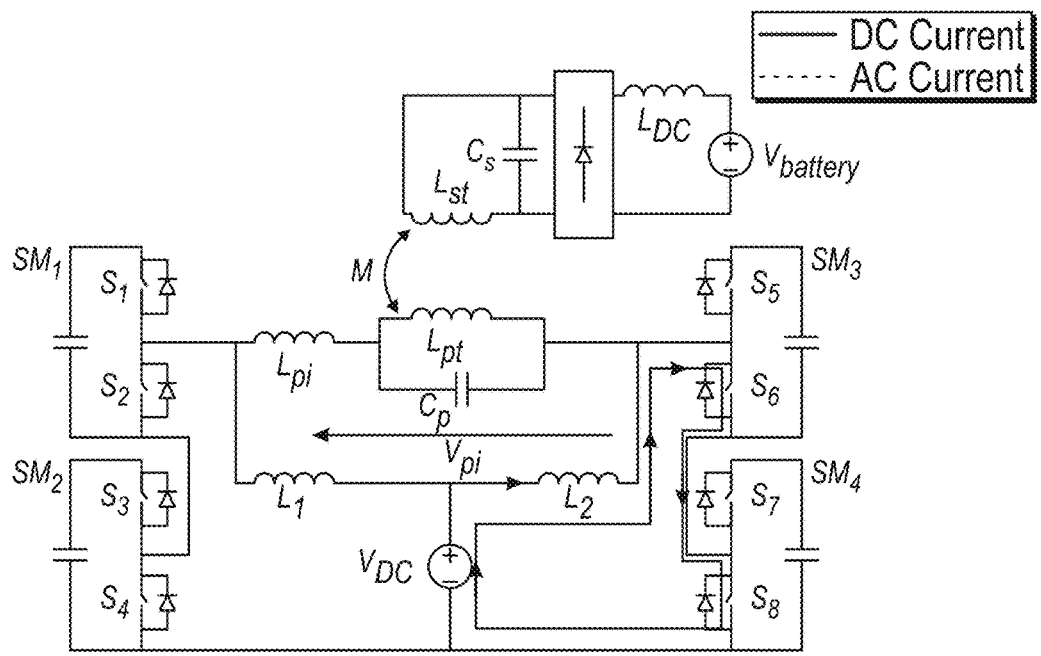

FIG. 20 depicts an embodiment comprising a 5-level IBMMC WPT system.

FIGS. 21A to 21G depict the operations of the circuit in seven different circuit states. FIG. 21H graphically depicts a 5-level staircase voltage waveform.

Figure 22:
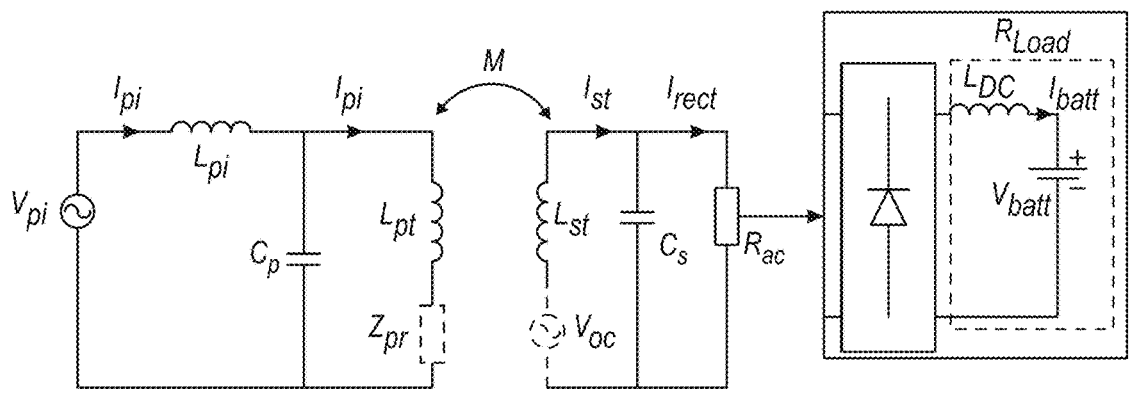

FIG. 22 shows an embodiment of a simplified LCL-LC WPT circuit diagram.

Figure 23:
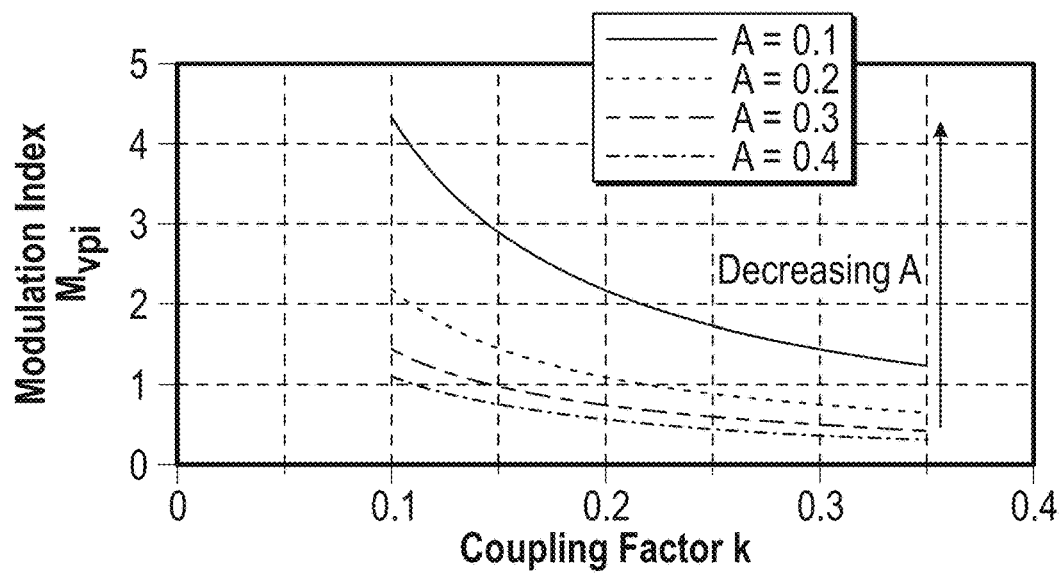

FIG. 23 shows the relationship between the modulation index vs coupling factor in a graphical representation.

Figure 24:
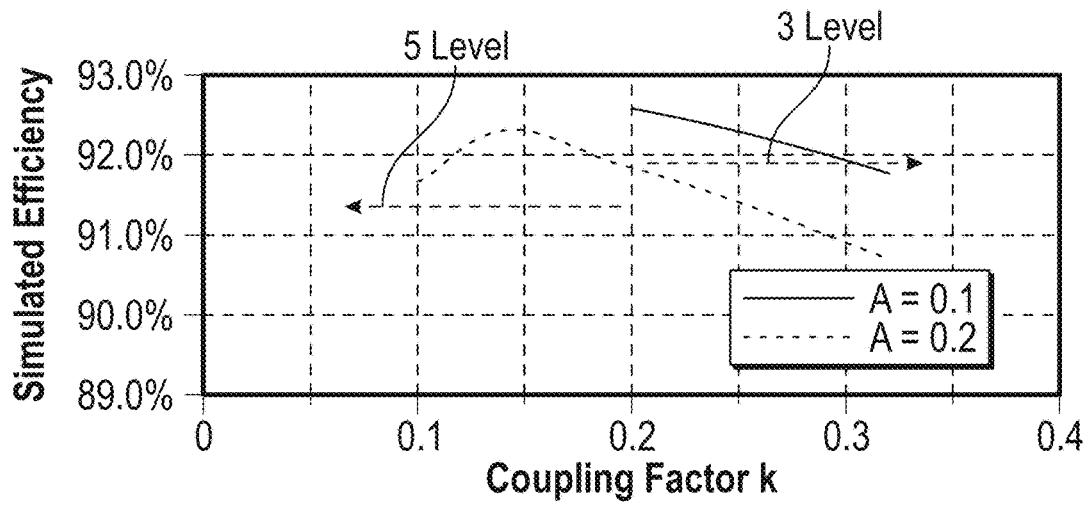

FIG. 24 shows the relationship between the simulated efficiency vs coupling factor in a graphical representation.

Figure 25:
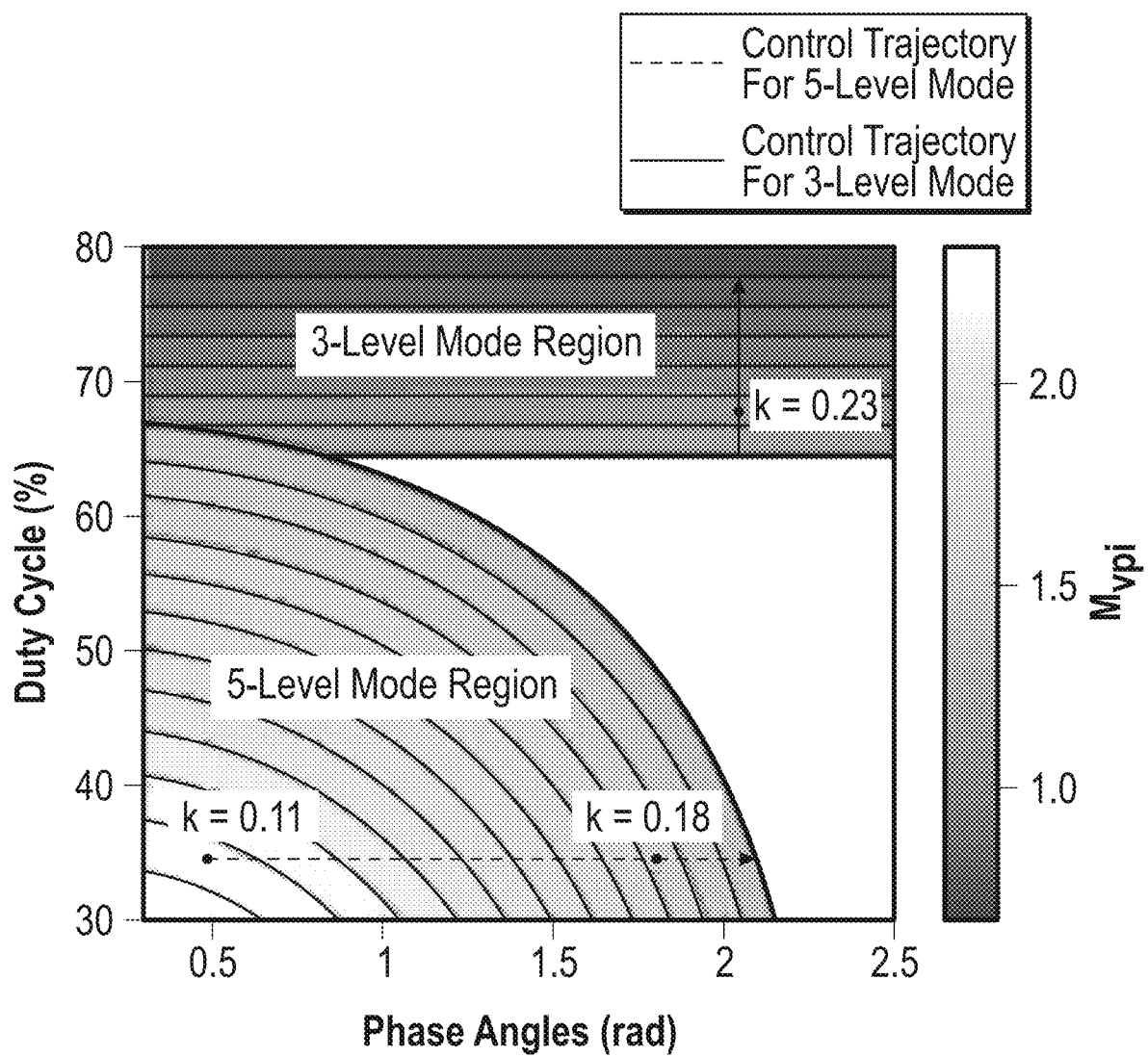

FIG. 25 depicts a contour plot of the Modulation index and control trajectories for 3-level and 5-level mode.

Figure 26:
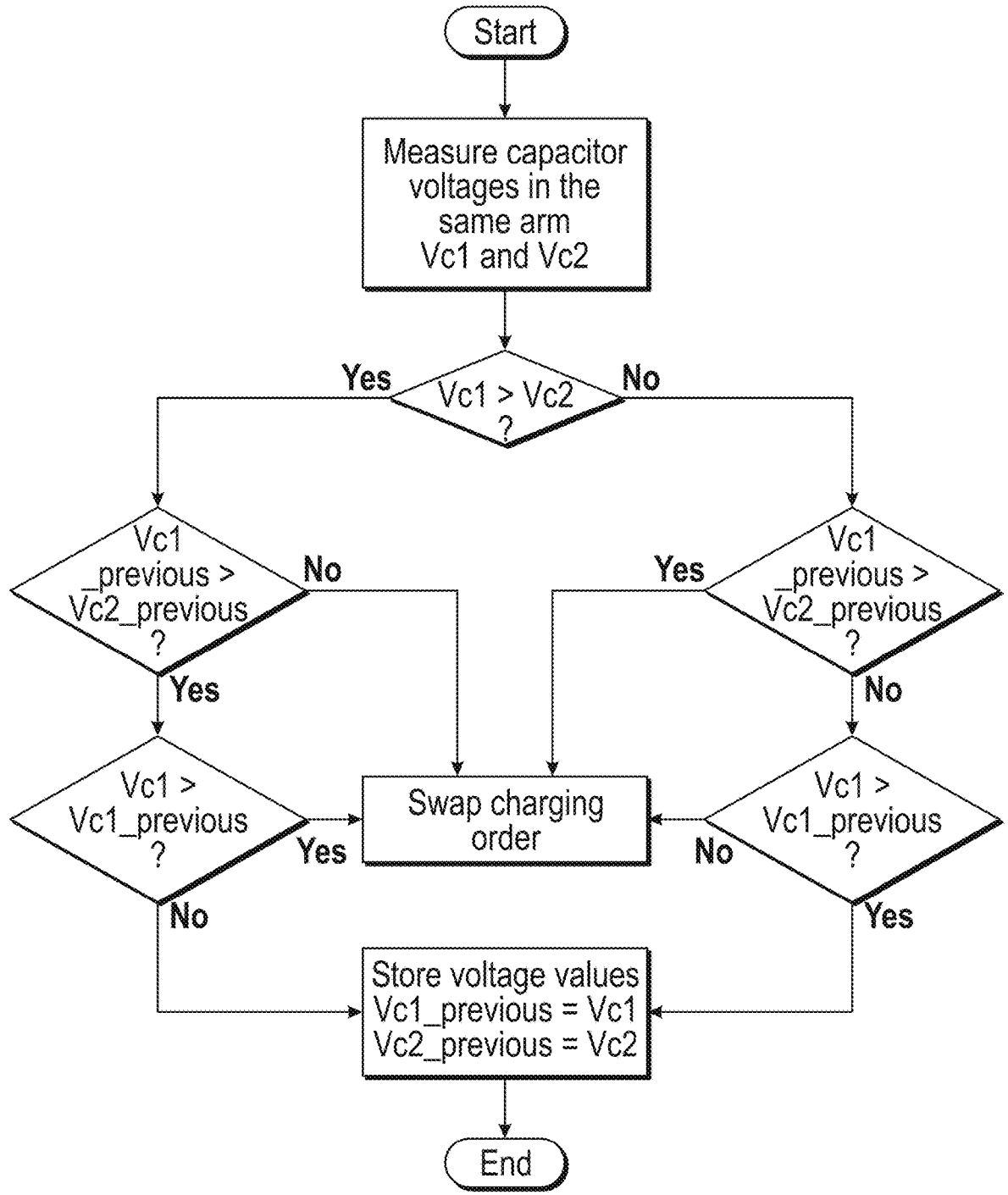

FIG. 26 shows a flowchart for the capacitor voltage balancing algorithm.

FIGS. 27A to C depict the Experimental waveforms at (a) the best coupling, (b) the nominal coupling and (c) the worst coupling positions).

Figure 28:
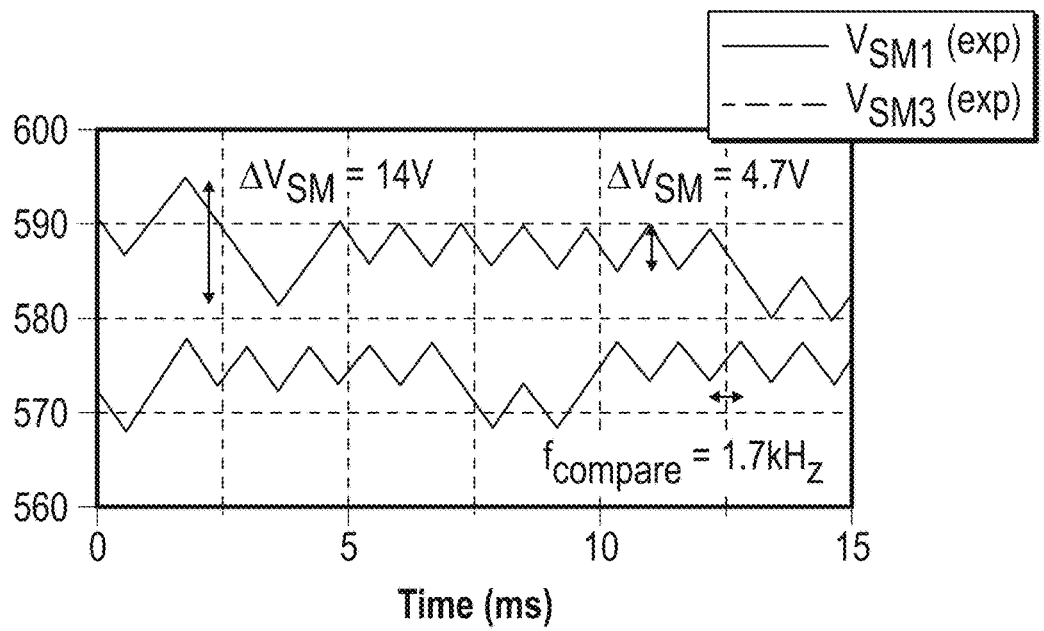

FIG. 28 depicts in graphical form the effect of capacitor voltage on SM1 and SM3.

Figure 29A:
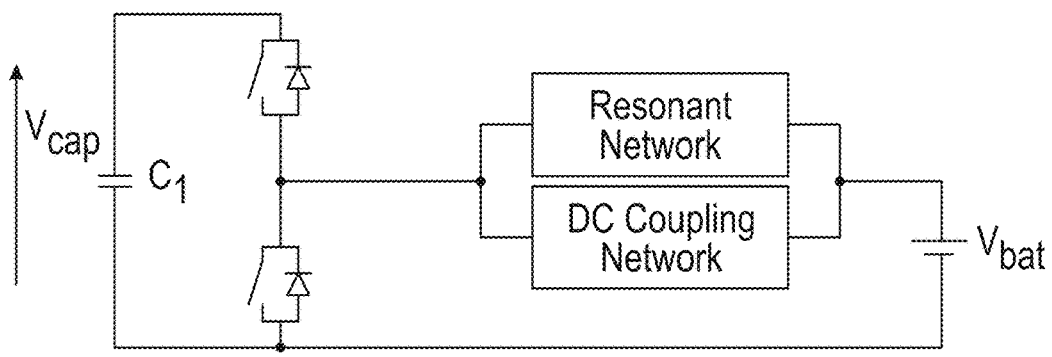
Figure 29B:
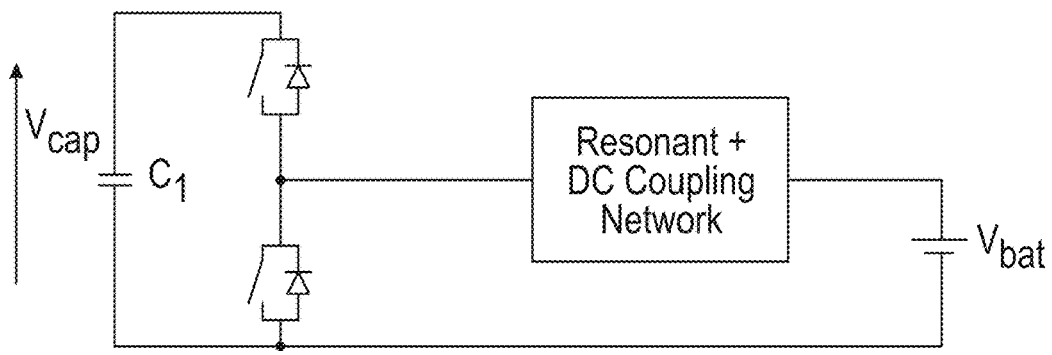

FIGS. 29A to B show the circuit configurations of the generic submodules according to an embodiment of the present invention. In the first configuration (a) a separate DC coupling network such as a inductor or a coupled inductor is used. In the second configuration (b) the DC coupling network is integrated with the resonant network.

DETAILED DESCRIPTION OF THE DRAWINGS

In comparison to traditional conductive EV charging, Inductive Power Transfer (IPT) based Wireless Power Transfer technologies have become attractive for charging EVs when they are simply parked over a designated ground-based charging pad. While WPT technologies provide aesthetically pleasing, convenient and safe EV charging solutions, they also enable automated charging. Over the past decade, IPT based WPT technologies have advanced considerably making low to medium power stationary charging commercially feasible. However, in recent years, the focus has been shifted to explore the feasibility of high-power IPT solutions that enable fast charging as well as in-motion charging. The refuelling time of EVs can be significantly reduced using fast chargers, while in-motion charging or dynamic charging can help extending the effective range and avoid deep-cycling of the EV batteries. This trend is further evident by the emphasis on WPT3 (11 kW) and WPT4 (22 kW) power classes defined in the SAE J2954 standard.

In order to develop high-power WPT systems, the use of SiC MOSFET based full-bridge converter designs in the primary power supply has been explored in the past. These systems commonly employed a significantly high-voltage DC bus, which was derived through the grid-side converter or a separate boost converter, to feed the SiC MOSFET based full-bridge converter. Some solutions also utilised a high-frequency step-up transformer to drive the compensation network at a higher voltage, thereby increasing the power transfer capability. Alternatively, other designs proposed that the WPT transmitter and receiver coils can be partially series tuned to increase the power transfer capability. While these solutions helped increasing the power transfer, the voltage waveform generated by full bridge converters to drive the compensation network contained a significant amount of harmonic content. At higher power levels, this leads to the increased conduction losses in the switches and the compensation network.

Among the many different types of multilevel converter topologies proposed to-date, the diode-clamped or neutral point clamped converter (NPC), flying capacitor converter (FC), cascaded H-bridge converter (CHBC) and modular multilevel converter (MMC) have become the industry standard. However, the application of these multilevel converters in WPT systems has been very limited, mainly as the WPT systems are operated at relatively lower voltages, typically in the range of 400 V to 800 V. These multilevel converter based solutions, which were predominantly based on the CHBC topology, helped improving the power transfer capability. However, the requirement for separate DC power supplies to power each full-bridge module in a CHBC, somewhat limited the suitability of these topologies as economical and efficient solutions.

As such, there is a significant drive to develop new and improved multilevel converter topologies, which address the limitations imposed by the existing converters employed in high-power WPT systems. To help address this need, a novel Integrated Boost Multilevel Converter (IB-MMC) 10 for high power WPT applications has been proposed. Similar to a traditional MMC, the proposed IB-MMC consists of series-connected half-bridge or full-bridge sub-modules (SMs) forming each arm of the converter. However, the DC source in an IB-MMC is interfaced with each arm through an inductor, which together functions as a boost converter delivering energy to each SM from the DC source. In contrast to a traditional MMC, this unique circuit configuration enables the IB-MMC to generate higher AC voltages to drive the WPT coil and eliminates the circulating currents, thus making it an attractive option for high-power WPT systems. Consequently, the current IB-MMC provides a unique boost circuit configuration in the modular multilevel converter arrangement, which allows it to produce low THD staircase voltage waveforms with significantly higher amplitude than traditional multilevel converters, while eliminating circulating current.

A mathematical model of IB-MMC is presented and the control technique is discussed below. The present mathematical model describes the behaviour of the IB-MMC topology, which is derived to show the voltages and currents in an IB-MMC. An expression for power transferred is derived and the control techniques that allow regulating the output power as well as voltages across each module are discussed. Results obtained from a 7.7 kW proof of concept prototype are presented to validate the suitability of the proposed IB-MMC technology for high-power WPT systems.

The generic form of the proposed Integrated Boost Modular Multilevel Converter (IB-MMC) is shown in FIG. 2(a). Similar to a traditional MMC, each arm of an IB-MMC consists of a number of series connected half-bridge (or full-bridge) SMs that produce a staircase modulated output voltage. The SMs in each arm of the IB-MMC are controlled to generate a regulated low THD AC voltage, Vpi, which, in this example, drives the primary transmitter coil, Lpt, through the primary compensation network. The DC power source, VDC, of this unique topology, is connected across the output of the left and the right arms, V1 and V2, through DC inductors, L1 and L2, respectively. As such, this configuration enables the SMs to extract energy from VDC, which will be typically derived from the utility grid. Because of the use of a single power source VDC, the SMs can extract energy without requiring additional circuitry, unlike traditional multilevel converters such as CHBC where multiple DC sources are needed. Each DC inductor together with the SMs attached to it also functions as a boost converter, thereby enabling the IB-MMC to generate a significantly higher Vpi across the transmitter coil from a low voltage DC source. Furthermore, the proposed circuit topology eliminates circulating currents since the design ensures zero DC offset across Vpi. In comparison to traditional full-bridge and multilevel converter based WPT systems, IB-MMC offers a number of advantages that can simplify the design of high power WPT systems.

Figure 1A:
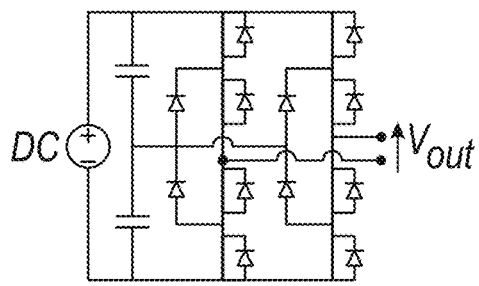
FIGS. 1A to 1D are circuit diagrams of a traditional multilevel converter topology, depicting the topopgies of a: (a) diode clamped converter; (b) flying capacitor converter; (c) cascaded H-bridge converter; and (d) modular multilevel converter.
Figure 1B:
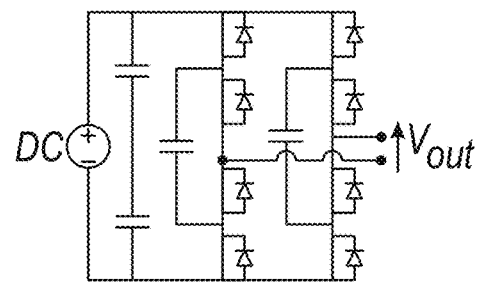
Figure 1C:
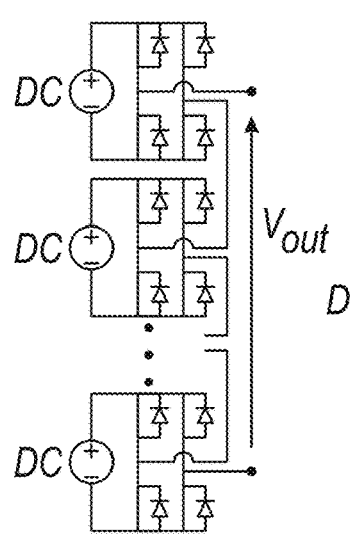
Figure 1D:
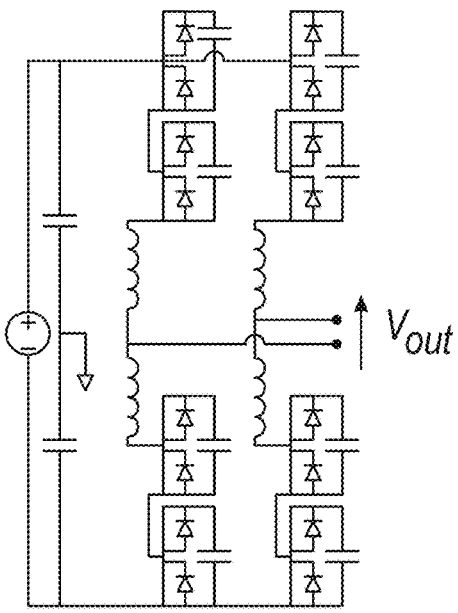
Figure 2:
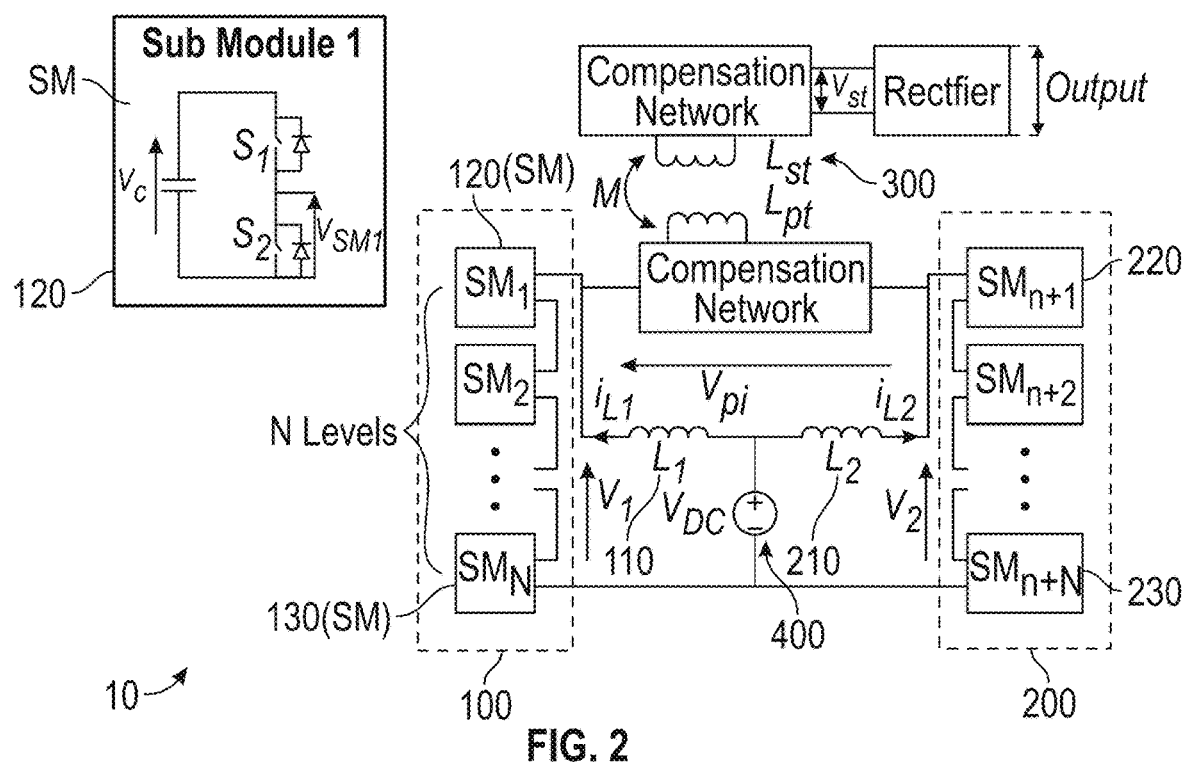
FIG. 2 is a general circuit diagram of the Integrated Boost Multilevel Converter (IBMC) of the present disclosure.

Referring to the Integrated Boost Modular Multilevel Converter (IB-MMC) 10 shown in FIG. 2., similar to a traditional MMC, each arm 100, 200 of this IB-MMC 10 includes of a stack of series connected half-bridge (or full-bridge) submodules (SMs) that produce a staircase modulated output voltage. The simplest IB-MMC 10 can employ a single arm 100 to drive a single transmitter coil, whereas higher power poly-phase WPT systems may utilize multiple arms to drive a poly-phase transmitter.

Each SM has a set of switches to insert or bypass the capacitor voltage. In the embodiment as depicted in should be 11a, the DC power source 400 is connected across the output of the multilevel converter 10 through a DC inductive element 110 ($L_1$). As such, this configuration enables the SMs of the proposed multilevel converter 10 to extract energy from the DC power source 400 without requiring additional circuitry, which are typically found in other multilevel converter topologies. The DC inductor 110 also functions as a boost inductor, thereby enabling the converter 10 to generate a significantly higher AC voltage across the load 300 from a low voltage DC power source 400. Furthermore, the proposed circuit topology eliminates circulating current issues found in commonly used multilevel converter topologies and by design ensures zero DC offset across $V_1$.

Thus, the converter 10 shown in FIG. 2 may represent one phase module of a poly-phase converter. To avoid confusion, the modules in each arm or limb 100, 200 of the converter module are referred to herein using the terminology commonly adopted in the art, as submodules SMs.

As depicted in FIG. 2, one embodiment of an IB-MMC 10 employs two submodule stacks, limbs or arms 100, 200 and drives a single transmitter coil Lpt as a load 300. It should be noted that the load 300 is not limited to the WPT systems. The SMs in each arm 100, 200 of the IB-MMC 10 in FIG. 2 are controlled to generate a regulated low THD AC voltage, Vpi, which drives the primary transmitter coil, Lpt, through the primary compensation network. In this embodiment, the DC power source 400 ($V_{DC}$), is connected across the output of left 100 and right 200 arms, V1 and V2, through DC inductors 110, 210 (L1 and L2), respectively. As such, this configuration enables the SMs to extract energy from the power source 400 ($V_{DC}$), which will be typically derived from the utility grid, without requiring additional circuitry. Each DC inductor 110, 210 together with the SMs attached to it also functions as a boost converter, thereby enabling the IB-MMC 10 to generate a significantly higher Vpi across the transmitter coil from a low voltage DC power source 400. Furthermore, the proposed circuit topology eliminates circulating currents since the design ensures zero DC offset across $V_{pi}$. As such, in comparison to traditional full-bridge and multilevel converter based WPT systems, WPT systems based on IB-MMC as disclosed herein offer a number of advantages that can simplify the design of high-power WPT systems.

To gain an insight to the operating principles of the proposed technology, consider an IB-MMC based WPT system utilising two arms 100, 200 with only two half-bridge SMs 120, 130, 220, 230 in each arm 100, 200 as shown in FIG. 3. The primary and the pick-up of this WPT system employ LCL compensation networks formed by Lpi-Cpt-Lpt and Lsi-Cst-Lst, respectively. The WPT system, alternatively, can employ other types of compensation networks depending on the application. In FIG. 3, the red line indicates the DC current path whereas the blue dotted line indicates the AC current path. The DC part of the current flows from the DC power source 400 into the SMs 120, 130, 220, 230 and charges the capacitors 122, 132, 222, 232, thus transferring energy from the DC power source 400 to the SMs 120, 130, 220, 230. The AC part of the current flows through the LCL compensation network and represents the power transferred to the load 300 attached to the pick-up converter, which is denoted by a voltage source, Vsi. Turning on the top switch 124, 134, 224, 234 of each SM 120, 130, 220, 230 inserts its storage capacitor 122, 132, 222, 232 in series with the current flow, while turning on the bottom switch 126, 136, 226, 236 bypasses the current flow. Therefore, in this particular example, assuming all SMs 120, 130, 220, 230 are operating at the same duty-cycle D, where D is the ratio between the time SM 120, 130, 220, 230 is inserted to the switching time-period, there are 16 circuit states. Although, all 16 circuit states, which are summarised in FIG. 3(a), can be utilised for circuit operation, the proposed system only utilises circuit states #1-7 to regulate Vpi and the power delivered to the load 300.

Brief descriptions of these states #1-7 are given below to highlight the operating principles of the converter 10:

In state #1, as shown in FIG. 3(b), all the SMs 120, 130, 220, 230 are bypassed, and therefore the voltage driving the LCL network, Vpi, is 0. As the voltages V1 and V2 are also 0 V, DC currents, IL1 and IL2 linearly increase storing energy in inductive elements 110, 210 (L1 and L2), respectively.

Figure 3C:
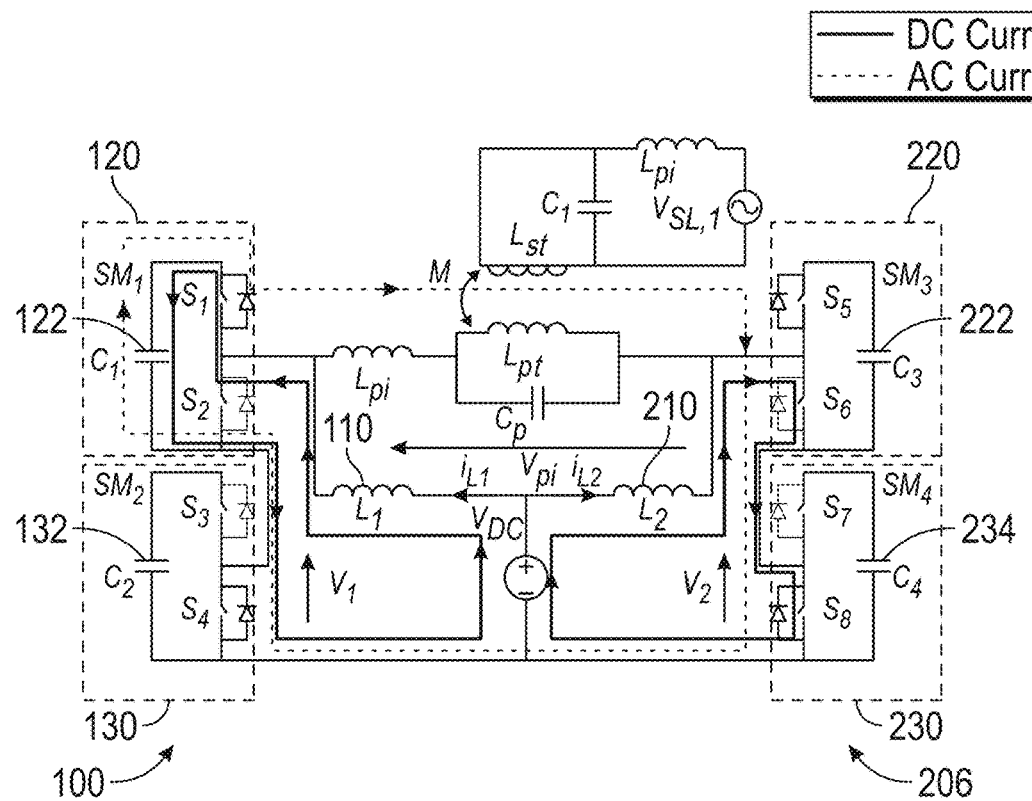
Figure 3D:
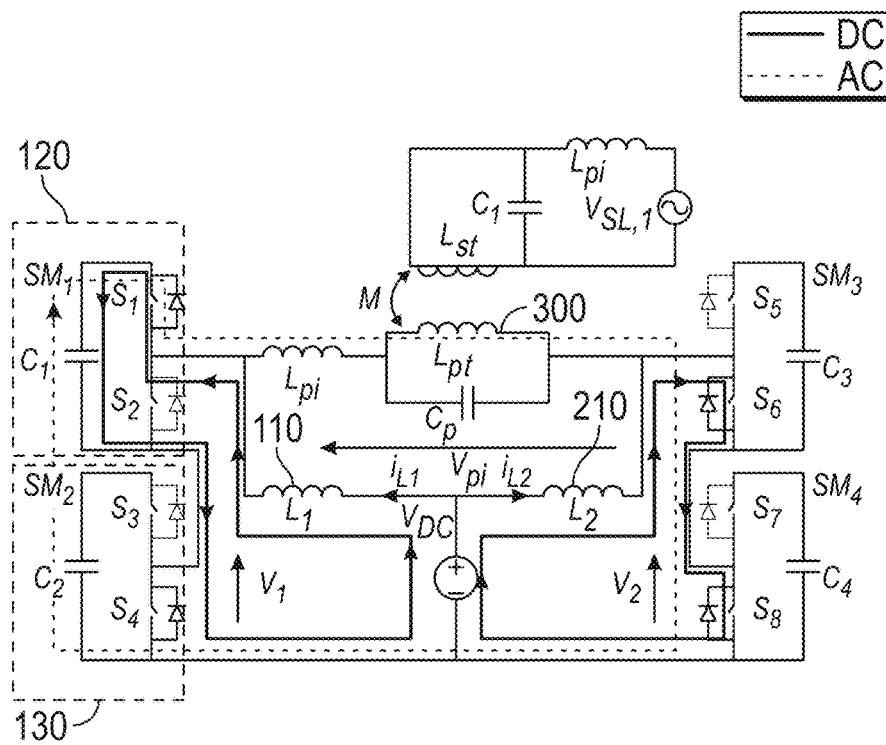

In state #2, as shown in FIG. 3(c), SM 120 (SM1) is inserted and the rest of SMs 130, 220, 230 are bypassed. SM 120 (SM1) together with the inductive element 110 (L1) and the power source 400 ($V_{DC}$) acts as a boost converter, thus charging the capacitor 122 (C1) to Vdc/2D by transferring the energy stored in inductive element 110 (L1) during state #1. In contrast, current IL2 continues increasing and storing energy in inductive element 210 (L2). Since SMs 130, 220, and 230 (2-4) are bypassed, the resulting voltage across the primary LCL network is VDC/2D and energy is also transferred from capacitor 122 (C1) to the load 300 as indicated by the AC current. The operating principles are similar during circuit states #4, #5 and #7, as only a single SM 120, 130, 220, 230 is inserted, and the resulting Vpi is either VDC/2D or −VDC/2D depending on whether the SM 120, 130, 220, 230 inserted is in the right or the left arm, respectively.

In state #3, as shown in FIG. 3 (d), SM 120 (SM1) and SM 130 (SM2) are inserted while SM 220 (SM3) and SM 230 (SM4) are bypassed. This part of the circuit can also be seen as a boost converter where the energy stored in inductive element 110 (L1) is transferred to both capacitor 122 (C1) and capacitor 132 (C2). Therefore, under steady state conditions, the average voltage across the left arm 100, V1, is equal to VDC/D. Since the right arm 200 is bypassed, the voltage across the LCL network is VDC/D and energy is transferred from capacitor 122 (C1) and capacitor 132 (C2) to the load 300. Similarly, in state #6, energy stored in inductive element 210 (L2) is transferred to capacitor 222 (C3) and capacitor 234 (C4) while capacitor 222 (C3) and capacitor 234 (C4) generates −VDC/D to drive the primary LCL network.

Figure 3E:
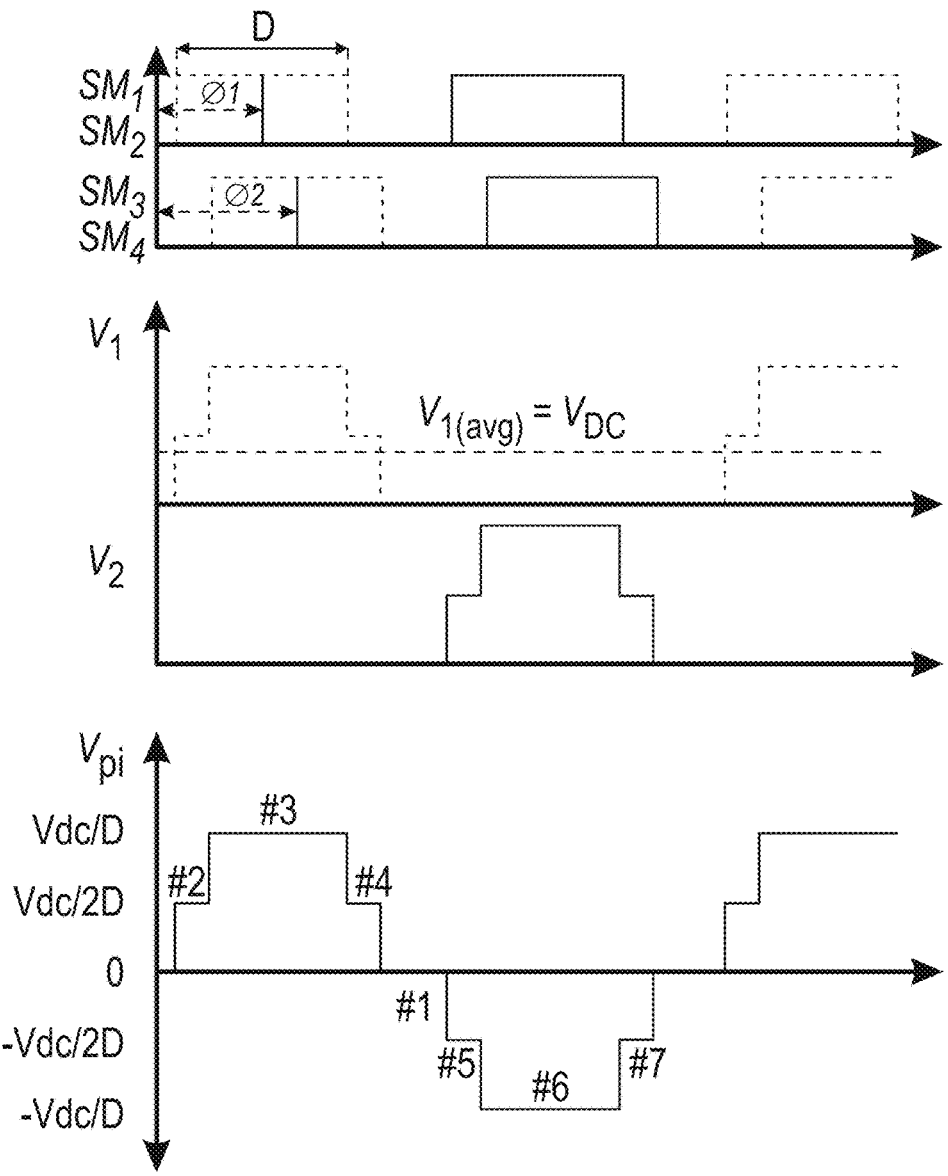

By operating the circuit in states #1-7 described above, a 5-level staircase voltage waveform Vpi can be derived as shown in FIG. 3(e). The duration of each voltage-level can be controlled either by changing D or introducing a phase-shift, φ_k, to the outputs generated by each SM 120, 130, 220, 230. As shown in FIG. 3(e), under steady state operating conditions, the average of V1 and V2 is $V_{DC}$. As a result, the design ensures zero DC offset across V-pi and eliminates the need for the DC-blocking capacitor employed in traditional LCL tuned WPT systems.

Apart from circuit states #1-7, other states shown in FIG. 3(a) can be used to improve control flexibility. Circuit operation during states #8-11 is similar to state 2 as the IB-MMC 10 generates ±VDC/2D to drive the primary LCL network. Similar to state #4, states #12-16 generates 0 V across the primary LCL network, and thus these redundant states can be used for voltage balancing.

In another embodiment as seen in FIGS. 29(a)-(b), a circuit configuration of a generic submodule is shown. This may be used as a single module by itself. Alternatively they can be connected in series to form a branch of the proposed IBMMC. The first configuration in 29(a) shows where a separate DC coupling network such as a inductor or a coupled inductor is used. In the second configuration in 29(b) the DC coupling network is integrated with the resonant circuit.

Another embodiment incorporating a 5-level IB-MMC based WPT converter, provides further insights as to the topology of the present converter. The 5-level IB-MMC utilizes two arms, where each arm consists of two half-bridge SMs as shown in FIG. 20. The output voltage of the IB-MMC drives an inductor-capacitor-inductor (LCL) compensation network formed by Lpi-Cp-Lpt for wireless power transfer. The pick-up circuit consists of a parallel-tuned inductor-capacitor (LC) compensation network formed by Lst-Cs, and a diode rectifier that feeds a battery. The WPT system, alternatively, can employ other types of compensation networks depending on the application. The circuit states are shown in FIG. 21, where the red lines indicate the DC current paths while the blue dotted lines indicate the AC current paths. The DC part of the current flows from the DC source into the SMs and charges the capacitors, thus transferring energy from the DC source to the SMs. The AC part of the current flows through the LCL compensation network and represents the power transferred to the load attached to the pick-up converter, which is denoted by a battery, Vbatt. Turning on the top switch of each SM inserts its storage capacitor in series with the current flow, while turning on the bottom switch bypasses the current flow.

Each SM of an IB-MMC is typically operated at the same duty-cycle, D, where D is the ratio between the time SM is inserted to the switching time-period. This operation results in 16 circuit states, which are summarised in Table. I, where "0" represents bypassing the SM, "1" represents inserting the SM. A description of the circuit states are given below to highlight the operating principles of the converter.

TABLE I 5-level IB-MMC Circuit States

| Circuit State | SM1 | SM2 | SM3 | SM4 | Vpi |
|---|---|---|---|---|---|
| #1 | 0 | 0 | 0 | 0 | 0 |
| #2 | 1 | 0 | 0 | 0 | $V_{DC}/2D$ |
| #3 | 1 | 1 | 0 | 0 | $V_{DC}/D$ |
| #4 | 0 | 1 | 0 | 0 | $V_{DC}/2D$ |
| #5 | 0 | 0 | 1 | 0 | $-V_{DC}/2D$ |
| #6 | 0 | 0 | 1 | 1 | $-V_{DC}/D$ |
| #7 | 0 | 0 | 0 | 1 | $-V_{DC}/2D$ |
| #8 | 0 | 1 | 1 | 1 | $-V_{DC}/2D$ |
| #9 | 1 | 0 | 1 | 1 | $-V_{DC}/2D$ |
| #10 | 1 | 1 | 0 | 1 | $V_{DC}/2D$ |
| #11 | 1 | 1 | 1 | 0 | $V_{DC}/2D$ |
| #12 | 1 | 0 | 0 | 1 | 0 |
| #13 | 0 | 1 | 0 | 1 | 0 |
| #14 | 0 | 1 | 1 | 0 | 0 |
| #15 | 1 | 0 | 1 | 0 | 0 |
| #16 | 1 | 1 | 1 | 1 | 0 |

Figure 21A:
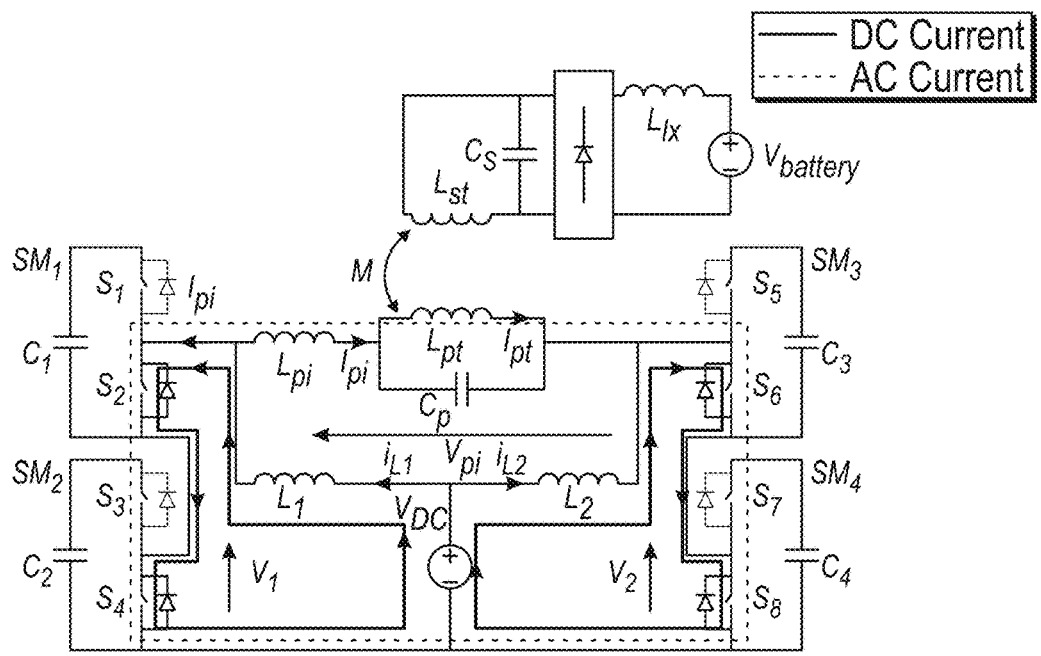

According to this implementation, in circuit state #1, as shown in FIG. 21(a), all SMs are bypassed. This results in 0 V across both left and right arms, therefore, the output voltage Vpi driving the compensation network is also 0 V. The DC current, which is indicated by the red line, flows through the DC inductors L1 and L2, storing energy in L1 and L2, respectively.

Figure 21B:
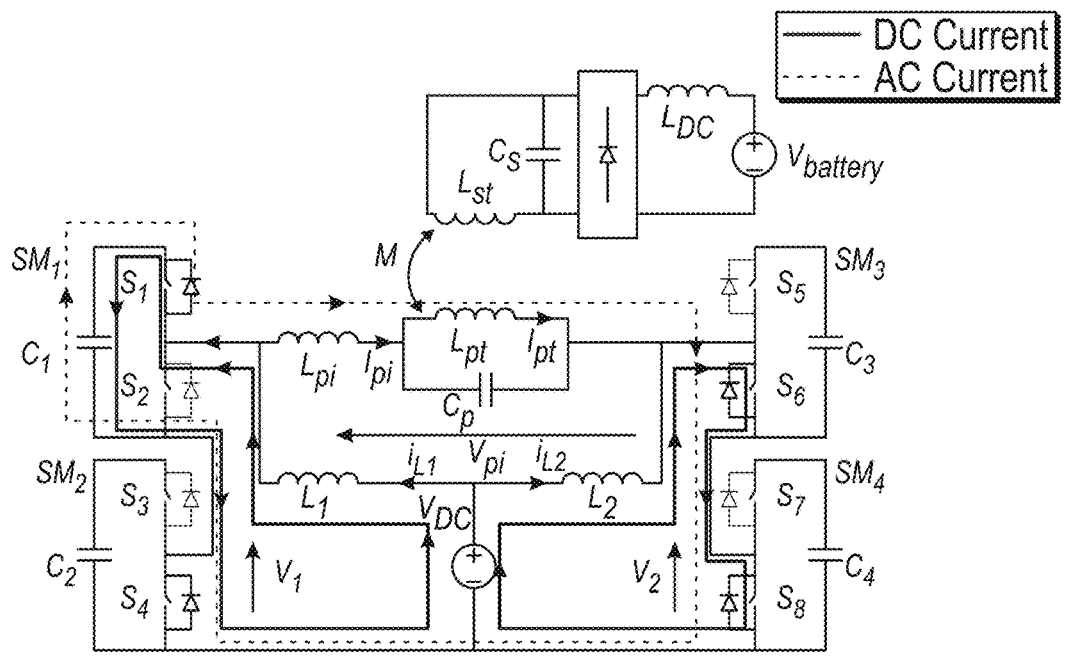

In circuit state #2, as shown in FIG. 21(b), SM1 is inserted and all other SMs are bypassed. SM1 together with the DC inductor L1 acts as a boost converter, thus, the energy stored in L1 during circuit state #1 and #5-7 is transferred to the capacitor C1, charging it to VDC=2D. In contrast, the DC current continues flowing through L2 and storing more energy in L2.

Since SM2-4 are bypassed, the voltage across the left arm V1 is VDC=2D, and the voltage across the right arm V2 is 0 V, resulting in an overall output voltage VDC=2D. This output voltage, depicted as Vpi, is driving the compensation network and produces an AC current flowing in the system, indicated by the blue dotted line. Therefore, the energy is transferred from C1 to the battery through the compensation networks. The operating principles of circuit states #4, #5 and #7, which are shown in FIG. 21(d), (e) and (g), are similar to that of circuit state #2, where a single SM is inserted. However, the resulting output voltage Vpi is either VDC=2D or −VDC/2D depending on whether the SM is inserted in the left arm or the right arm, respectively.

Figure 21C:
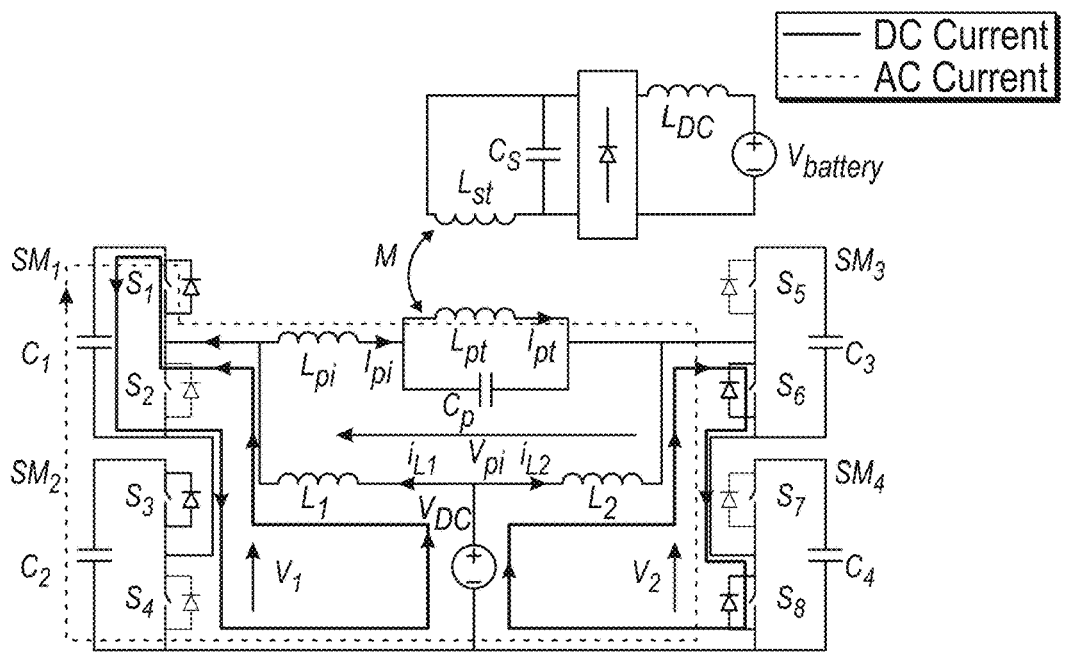
Figure 21D:
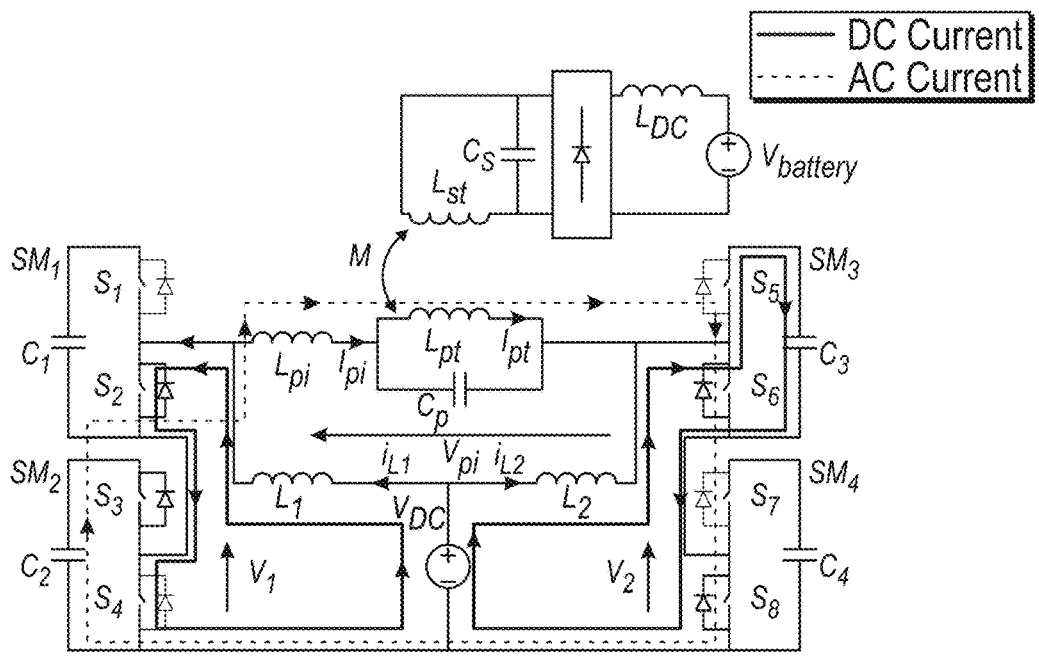
Figure 21E:
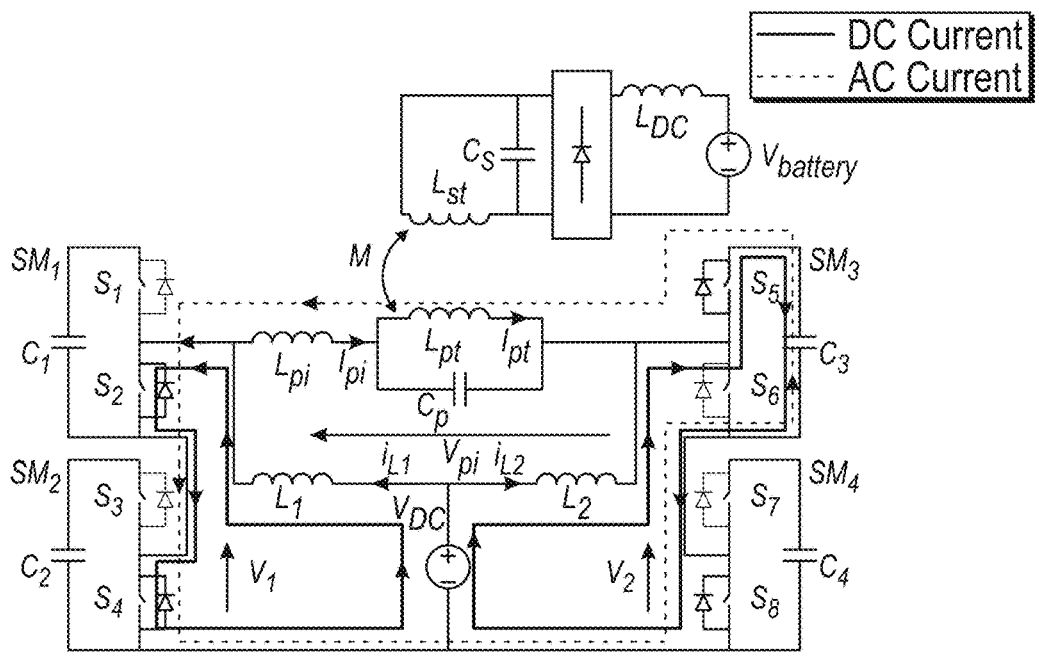
Figure 21F:
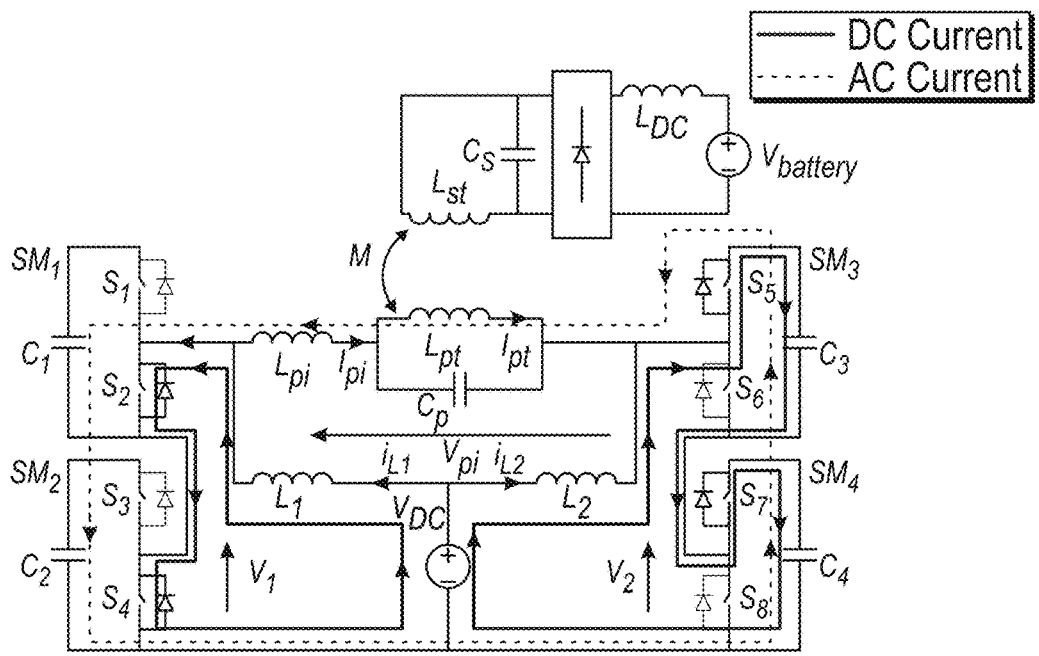
Figure 21G:
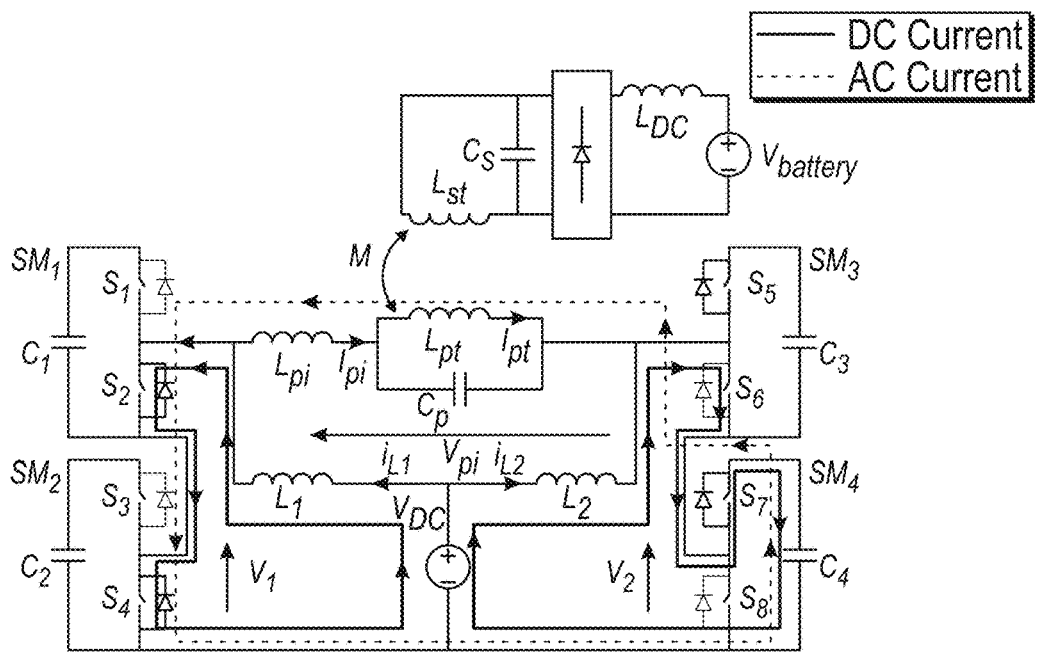
Figure 21H:
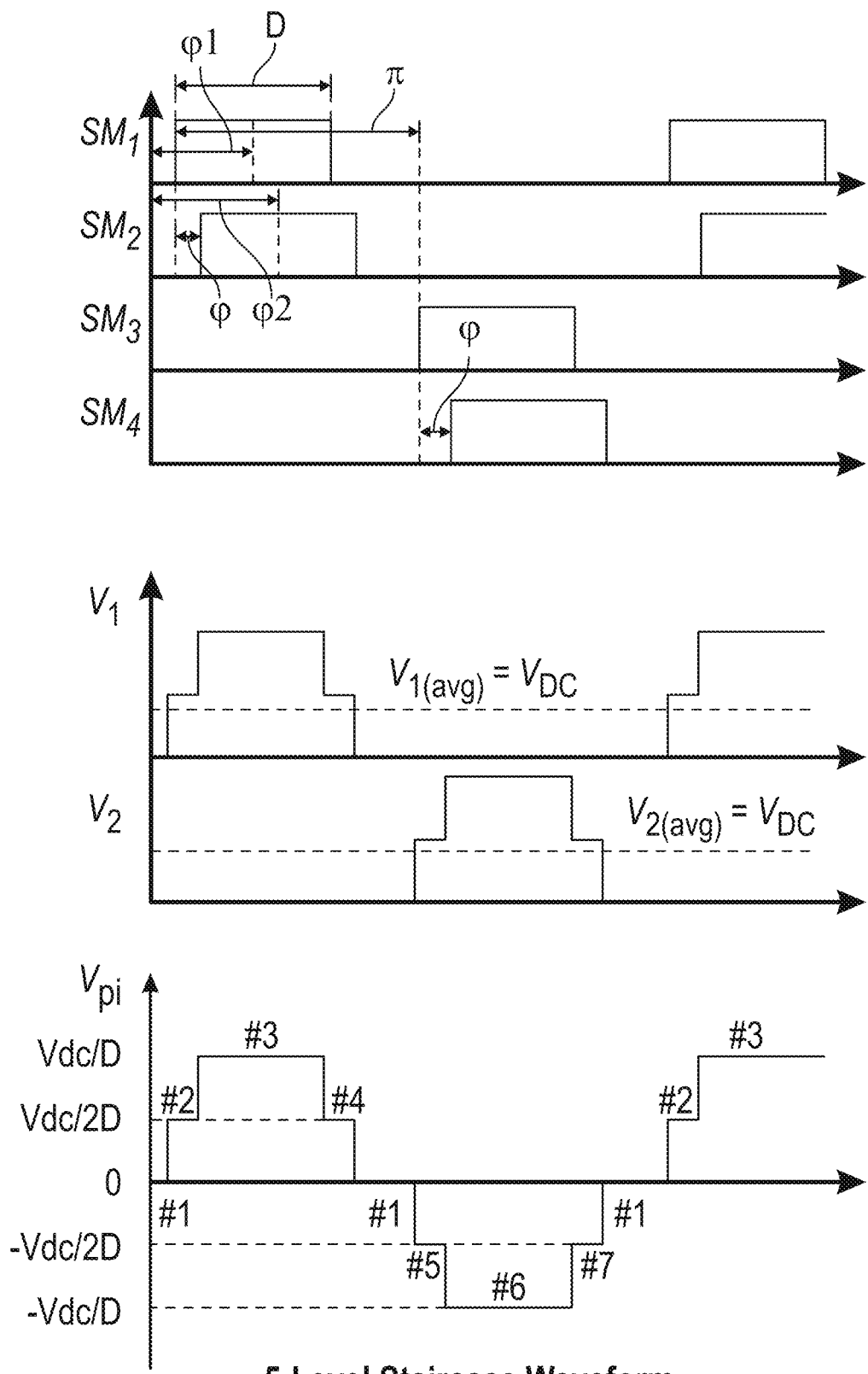

In circuit state #3, as shown in FIG. 21(c), SM1 and SM2 are inserted while SM3 and SM4 are bypassed. This part of the circuit can also be seen as a boost converter where the energy stored in L1 is transferred to both C1 and C2. Therefore, under steady-state conditions, the voltage across the left arm, V1, is equal to VDC=D. Since the right arm is bypassed, the voltage across the LCL network is VDC=D. Energy is transferred from C1 and C2 to the load during this state. Similarly, in state #6, energy stored in L2 is transferred to C3 and C4 while C3 and C4 generates −VDC=D to drive the primary LCL network. By operating the IB-MMC in the circuit states described above, a 5-level staircase voltage waveform Vpi can be derived as shown in FIG. 21(h). The amplitude of each voltage level is determined by the duty-cycle D of the SMs. The duration of each voltage level can be controlled by introducing a phase shift, $\varphi_k$, to the output generated by each SM. Under steady state conditions, because of L1 and L2, the average of V1, as well as the average of V2 is equal to VDC, as shown in FIG. 21(h). As a result, the proposed IB-MMC ensures zero DC offset across the output voltage Vpi, thereby eliminates the need for the DC-blacking capacitor employed in traditional LCL compensated WPT systems.

Another embodiment of a modular multilevel power converter 10 according to the present disclosure will now be described with reference to FIGS. 9a to 9l. These figures depict current flows for different circuit states of a modular multilevel power converter 10 having only a single one converter limb 100 with the output for connection to the load 300 and the input for connection to the input power source 400. Like in FIG. 3, the red line indicates the DC current path whereas the blue dotted line indicates the AC current path.

This embodiment includes one single inductive element 110 provided between the input and the output.

The limb 100 includes two submodules 120, 130, wherein each submodule 120, 130 comprises at least one capacitor 122, 132 and two controllable switches 124, 126, 134, 136. The submodules 120, 130, 220, 230 are operable to selectively transfer energy from the at least one inductive element 110, 210 to boost a voltage at the output relative to a voltage at the input.

As it includes a minimal number of limbs 100, 200 and submodules 120, 130, 220, 230, this embodiment might also be referred to as a kernel unit of one example. In the following description, the submodule 120 will be referred to as the upper or top submodule, while submodule 130 will be referred to the lower or bottom submodule.

Figure 9A:
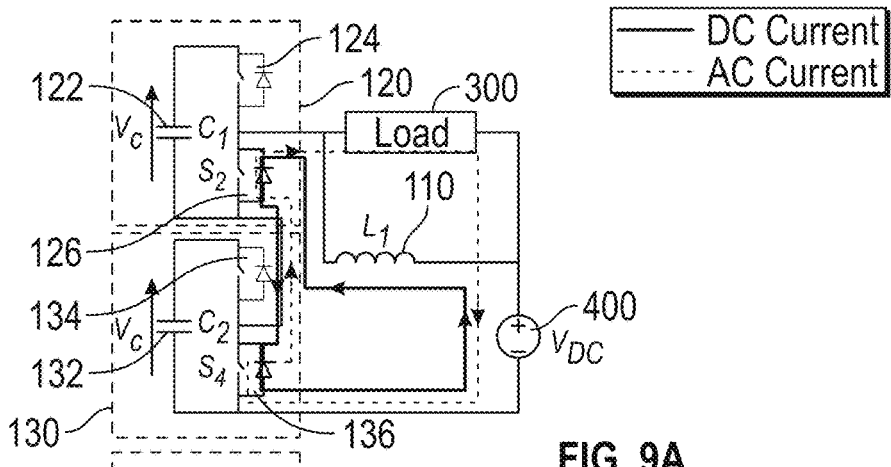

In the circuit state shown in FIG. 9a, both submodules 120, 130 are bypassed, wherein switches 124 and 126 are operated such as to bypass submodule 120, and switches 134 and 136 are operated such as to bypass submodule 130. Thus, the voltage driving the load 300 is $-V_{DC}$, wherein $V_{DC}$ corresponds to the voltage at the input power source 400. As the voltage across the submodules 120, 130 is 0 V, current through the inductive element 110 increases linearly, thereby storing energy in inductive element 110.

Figure 9B:
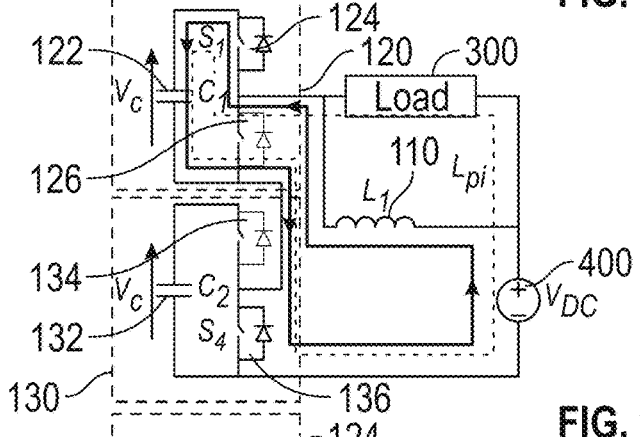

Turning to FIG. 9b, the upper submodule 120 is inserted by operating switches 124 and 126 accordingly, while the bottom submodule 130 is bypassed. The upper submodule 120 together with the inductive element 110 and the input power source 400 acts as a boost fly-back converter, thus the capacitor 122 is charged to the voltage level $V_{DC}$ by transferring the energy stored in the inductive element 110 during the state shown in FIG. 9a. The resulting voltage across the load 300 is 0 V.

Figure 9C:
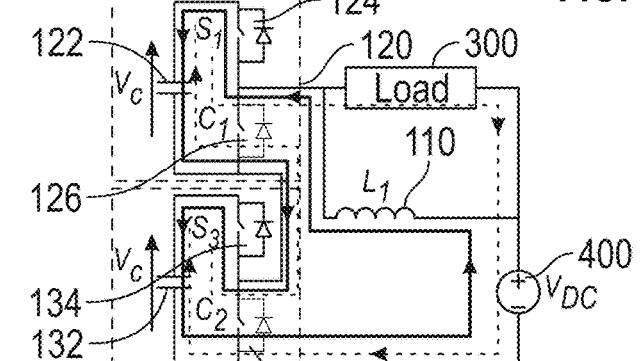

In the state shown in FIG. 9c, both submodules 120, 130 are inserted in the circuit. In this configuration, the circuit can also be seen as a boost fly-back converter where the energy stored in the inductive element 110 is transferred to both capacitor 122 and capacitor 132. Therefore, under steady state conditions, the average voltage across the converter limb 100 is equal to $2V_{DC}$. Thus, the voltage across the load 300 corresponds to $V_{DC}$, and energy is also transferred from capacitor 122 and capacitor 132 to the load 300.

Figure 9D:
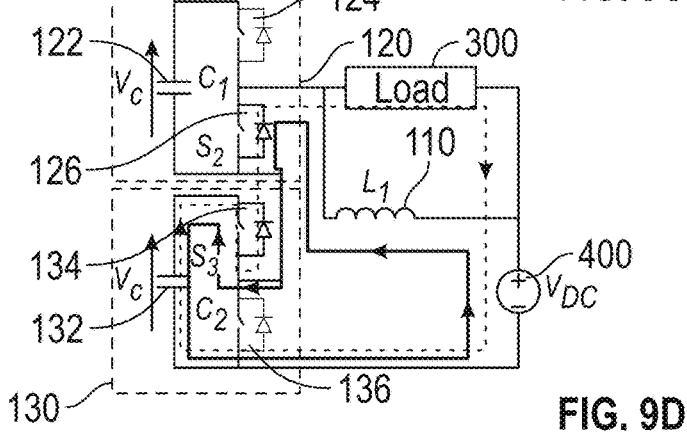

FIG. 9d shows a state in which the lower submodule 120 is inserted and the upper submodule 130 is bypassed. The lower submodule 130 together with the inductive element 110 and the input power source 400 acts as a boost fly-back converter, thus the capacitor 132 is charged to a voltage level corresponding to $V_{DC}$ by transferring the energy stored in the inductive element 110 as in the state shown in FIG. 9b above. The resulting voltage across the load 300 is 0 V.

Figure 9E:
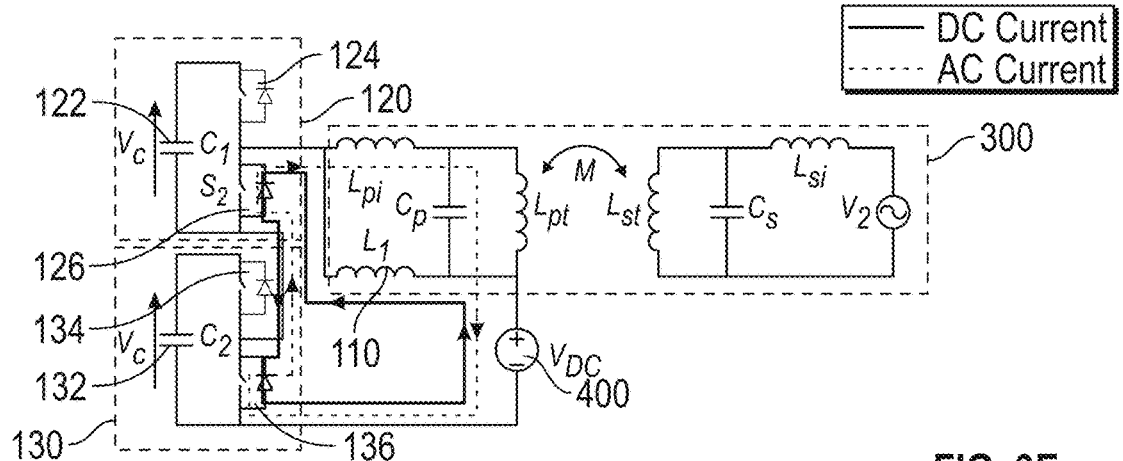

FIG. 9e shows the switching states discussed above in the same order as presented in FIGS. 9a-d. However, in this embodiment, an LCL-LCL IPT system 300' is used as the load 300 to show the application of the present disclosure in an IPT system.

Figure 9F:
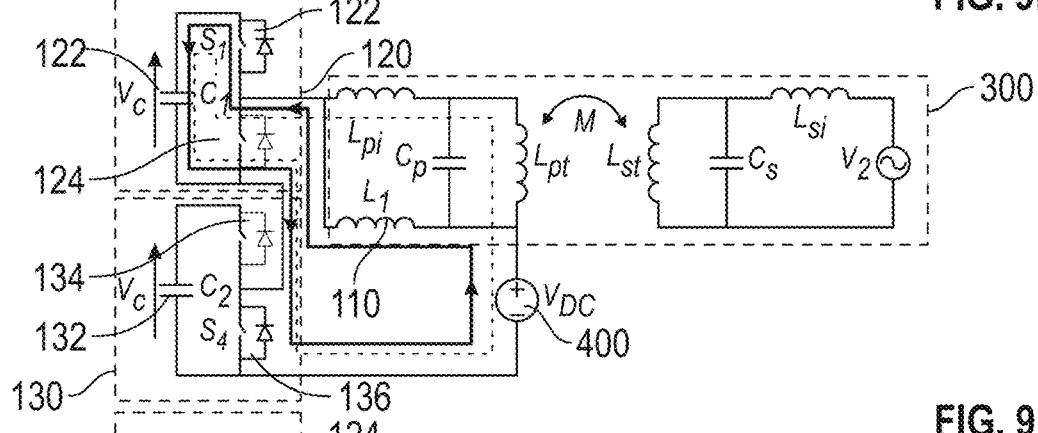
Figure 9G:
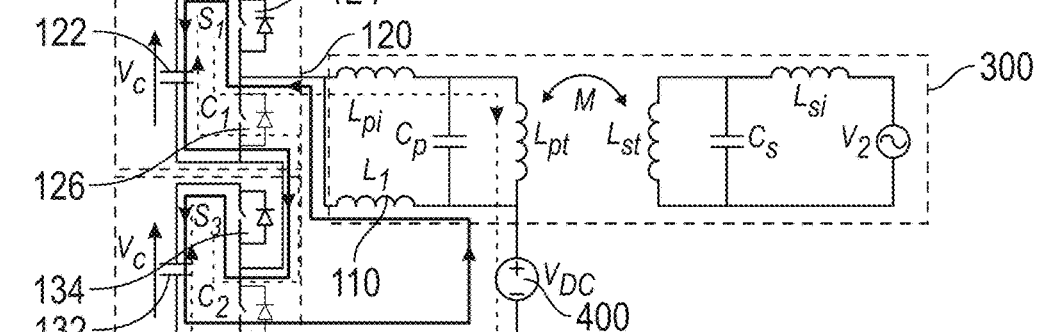
Figure 9H:
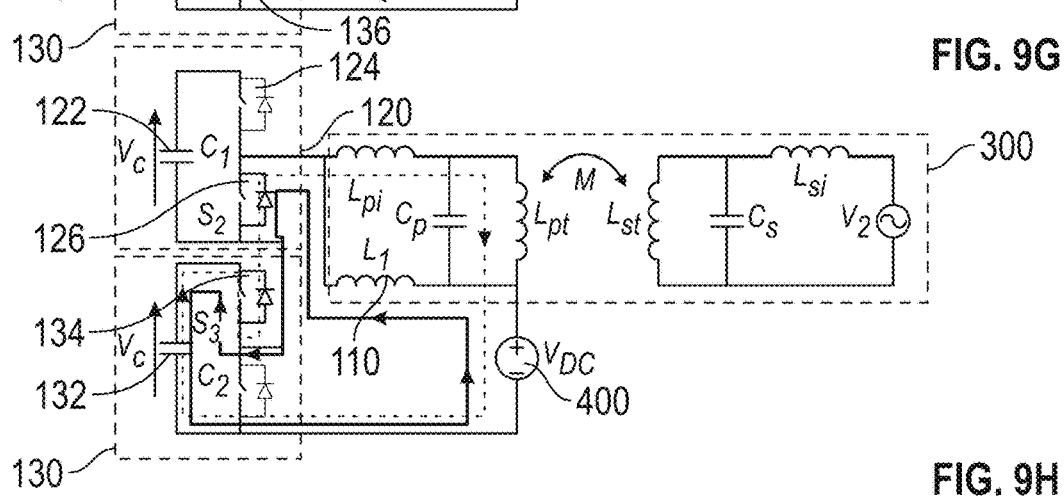
Figure 9I:
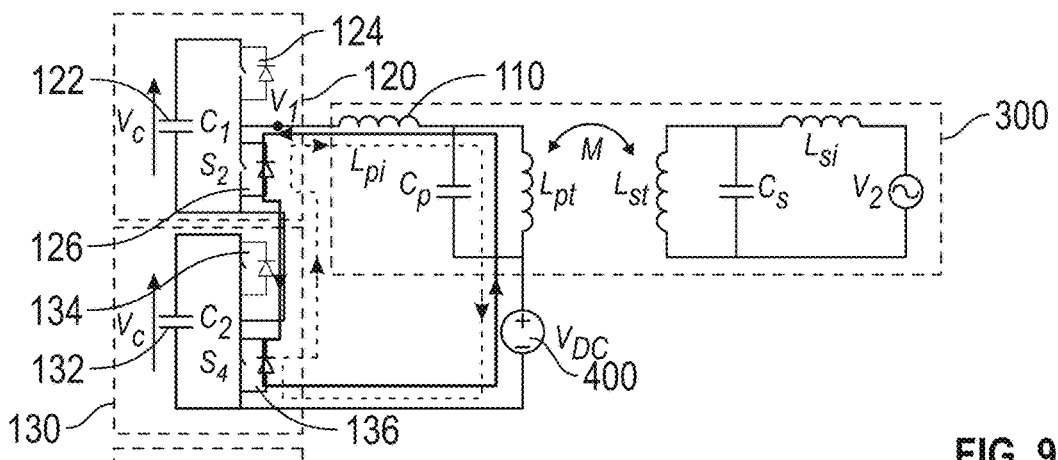
Figure 9J:
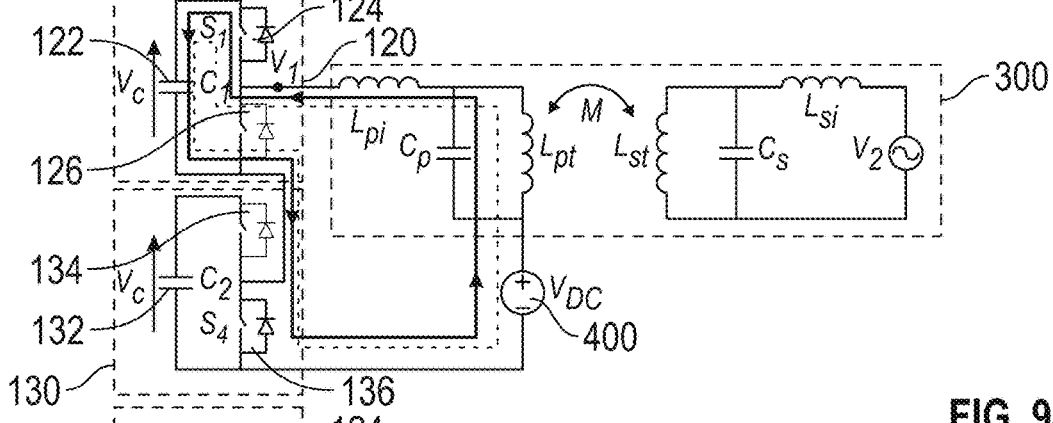
Figure 9K:
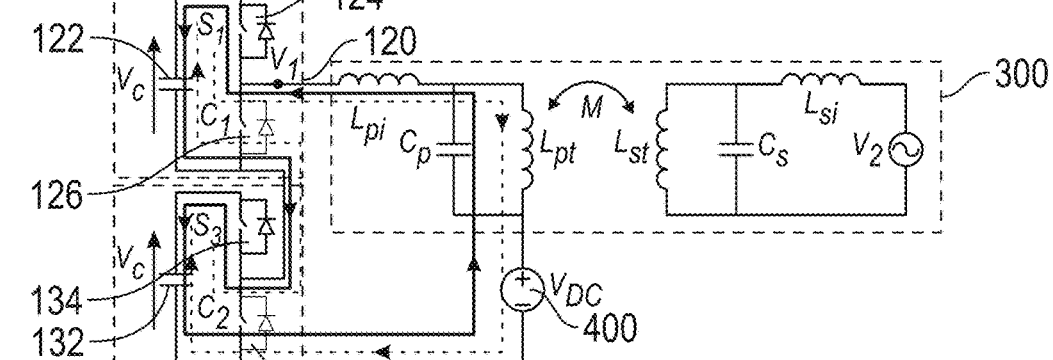
Figure 9L:
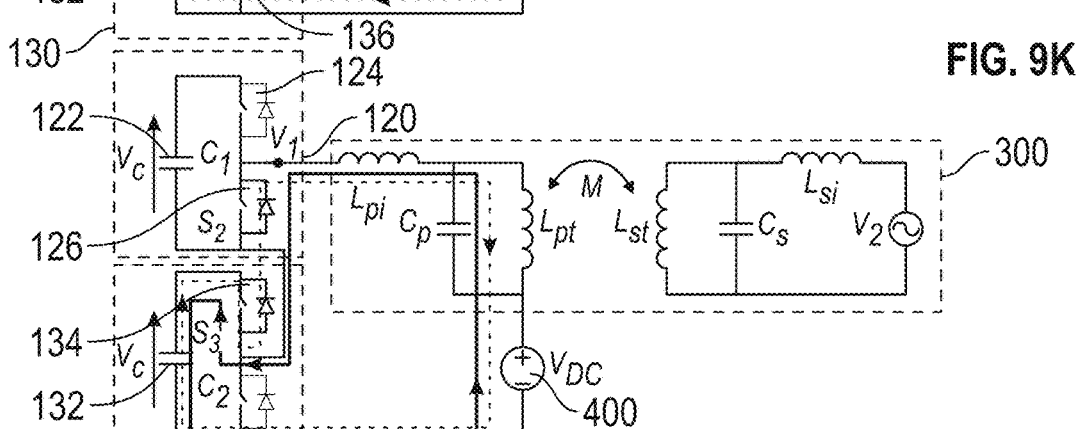

Similarly, FIG. 9f also shows the switching states discussed above in the same order as presented in FIGS. 9a-d. However, in this embodiment, the IPT circuit topology using the present disclosure shown in FIG. 9d has further been simplified by using inductor Lpt and inductor Lpi as the inductive element 110. In the design, the two inductors, Lpt and Lpi, form the primary LCL compensation network of the IPT system. At the same time, they function as the boost (fly-back) inductor.

The switch pairs, S1 & S2 and S3 & S4 (FIGS. 9A to 9I) in each SM are driven complimentaryily to each other. Assuming each SM is operated at a 50% duty cycle, there are four operating states within one switching period:

1. When S1 and S4 are closed, DC current flows into the SM1 and charges capacitor C1. This part of the circuit can be seen as a boost converter, under steady state operating conditions, the average voltage across C1 will be Vdc. The voltage across the LCL tuning network therefore is 0 V during this state.
2. When S1 and S3 are closed, the DC current will charge both capacitors and the voltage at V1 will be boosted to 2Vdc. In this state the voltage across the LCL tuning network is +Vdc and as a result energy is transferred from the capacitors to the pick-up side.
3. When S2 and S3 are closed, capacitor C2 will get charged. Under steady state operating conditions, the average voltage across C2 will also be Vdc, and voltage across the LCL tank therefore is 0 V.
4. When S2 and S4 are closed, both capacitors are bypassed and the voltage across the LCL tank will be −Vdc, transferring energy from the DC source to the pick-up side.

Although the example, shown in FIG. 2 employs two SMs, multiple SMs can be connected in series and by having a phase-shift between the output-voltages each SM produces, a low THD staircase AC waveform can be generated to drive the LCL tuning network. Because of the novel arrangement of the inductor and the DC voltage source, the staircase waveform has a significantly higher amplitude in comparison to what a traditional multilevel converters supplied by the same DC voltage source would generate. In addition, it should be noted that the AC part of the current can be exploited to extend the zero-voltage-switching range of the multilevel converter.

Schematics showing a number of different implementations of the proposed multilevel converter are presented in FIGS. 11A to 11E. Note that the proposed topology is not limited to the four arrangements demonstrated in FIGS. 11A to 11E, and the sub module arrangement may include, but are not limited to half bridge, full bridge, cascaded half-bridge, neutral-point clamped configurations.

Operating Principles and Mathematical Model

To obtain a mathematical model of the proposed converter, an IB-MMC based WPT system with LCL compensation networks, similar to the system shown in FIG. 2, is analysed. It is assumed that the IB-MMC has 2 arms and each arm has N number of SMs. Although each SM can have a unique duty-cycle, to simplify the analysis as well as the closed-loop controller design, it is also assumed that all SMs are operated at the same duty-cycle, D. During steady state conditions, the average voltages across L1 and L2 are zero, therefore the average voltage across each arm is equal to Vdc as given by (1), $$V_{1(avg)} = V_{2(avg)} = V_{dc} = N \cdot V_c \cdot D \tag{1}$$

$$V_c = \frac{V_{dc}}{N \cdot D} \tag{2}$$

The SMs are controlled such that the capacitor voltages, Vc, are regulated close to a nominal value given by (2). To obtain an expression for the voltage across the arms, the state of each SM is represented by a state signal Sk, where Sk equals to 1 when the SM is inserted and 0 when bypassed. The voltage across the left and the right arms, $V_1$ and $V_2$, are expressed as, $$V_1 = \Sigma_{k=1}^{N} V_c S_k \quad V_2 = \Sigma_{k=N}^{2N} V_c S_k \tag{3}$$

The state signal S_k is described by a square-wave signal, which is centred at φ_k radians and is 2πD radians wide, as shown in FIG. 4. The state signal S_k can now be expressed as a Fourier series given by (4). The left and the right arms of the IB-MMC are operated 180° out of phase to each other at the resonant frequency of the LCL compensation network. The voltage Vpi, which is driving the transmitter coil of the WPT system is equal to V1-V2, as expressed by (5). The fundamental frequency component of V_pi is given by (6) while the THD of Vpi is given by (7).

$$S_k = D + \sum_{n=1}^{\infty} \left[ \frac{2}{n\pi} \sin(n\pi D) \cos(n\omega_0 t - n\varphi_k) \right] \tag{4}$$

$$V_{pi} = 2 V_c \sum_{k=1}^{N} \left[ \sum_{n=1,3,5,\ldots}^{\infty} \left[ \frac{2}{n\pi} \sin(n\pi D) \cos(n\omega_0 t - n\varphi_k) \right] \right] \tag{5}$$

$$V_{pi,1} = 2\,V_c \sum_{k=1}^{N} \left[\frac{2}{\pi}\sin(\pi D)\,\cos(\omega_0 t - \varphi_k)\right] \quad (6)$$

$$THD = \sqrt{\frac{\sum_{n=3,5,7...}^{\infty}[V_{pi,n}^2]}{V_{pi,1}}} \quad (7)$$

$$P_{out} = \frac{kV_{pi,1}V_{si,1}}{\omega_s L_{pt}}\sin(\theta) \quad (8)$$

The power transferred to the output load, Vsi, of the WPT can be derived as a function of magnetic coupling (k), switching frequency ($\omega\_s$), inductance of the transmitter coil (Lpi), fundamental components of the driving voltages (Vpi,1 and Vsi,1), and the phase angle ($\theta$) between Vpi,1 and Vsi,1, and is given by. As such, in comparison to a traditional MMC based WPT system driven by the same DC voltage source, the proposed converter produces 1/D times larger Vpi enabling a significant reduction in the current through the transmitter coil. This results in significantly lower conduction losses at the rated power.

As the left arm and right arm operate symmetrically, the current flows from the DC source will split evenly into each arm, as such, the currents in the DC inductors L1 and L2 are given by, $$I_{L_1} = I_{L_2} = \frac{V_{DC} - V_1}{j\omega L_1} = \frac{V_{DC} - V_2}{j\omega L_2} \quad (25)$$

Therefore, as denoted in FIG. 2(a), the current flowing into the SMs is $$I_{SM} = I_{L1} - I_{pi} \quad (26)$$

Capacitor Voltage Balancing

Since there are number of submodules employed in both sides of the converter, the capacitor voltage on each submodule needs to be maintained close to its nominal value to ensure stable operation, and that the voltage output has the minimal THD.

Figure 11A:
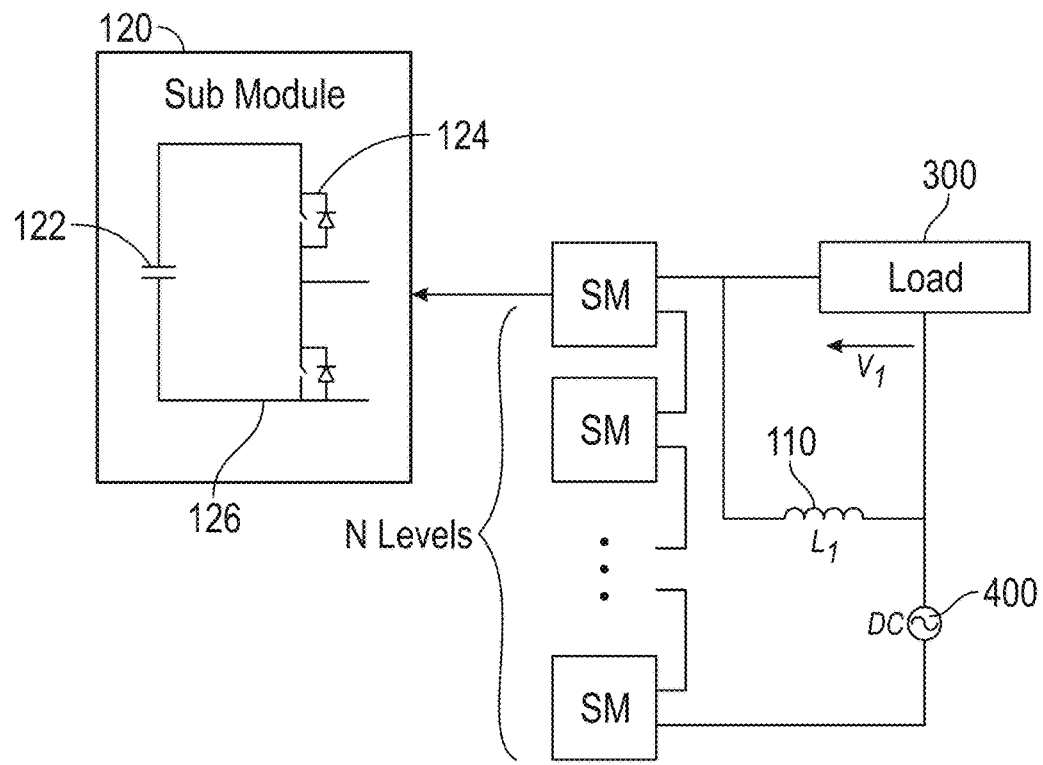
Figure 11B:
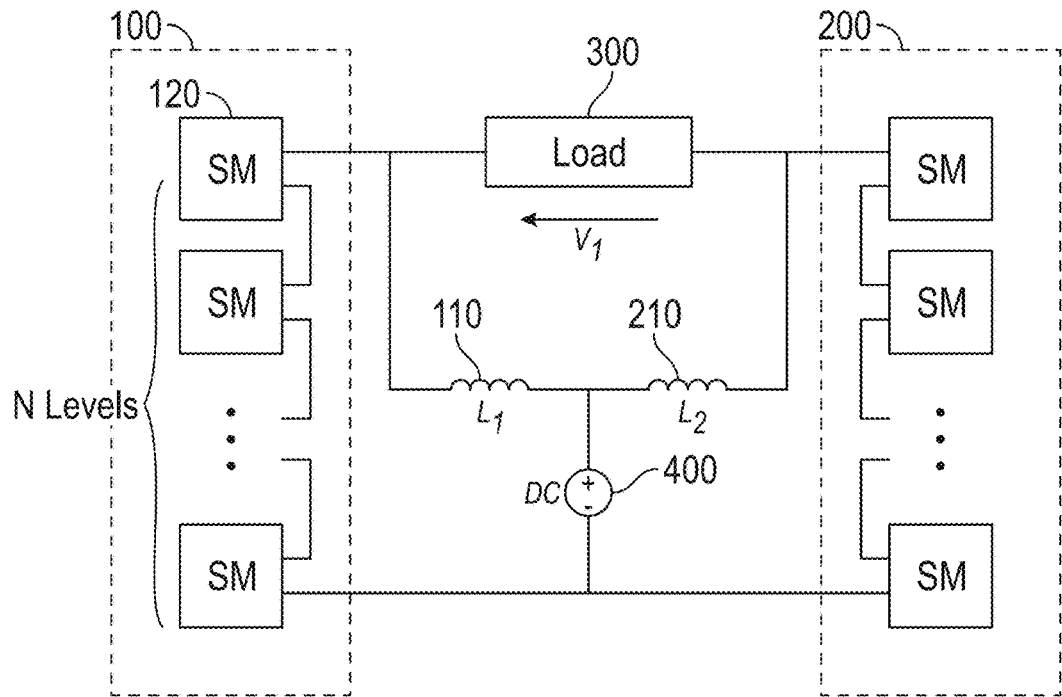
Figure 11C:
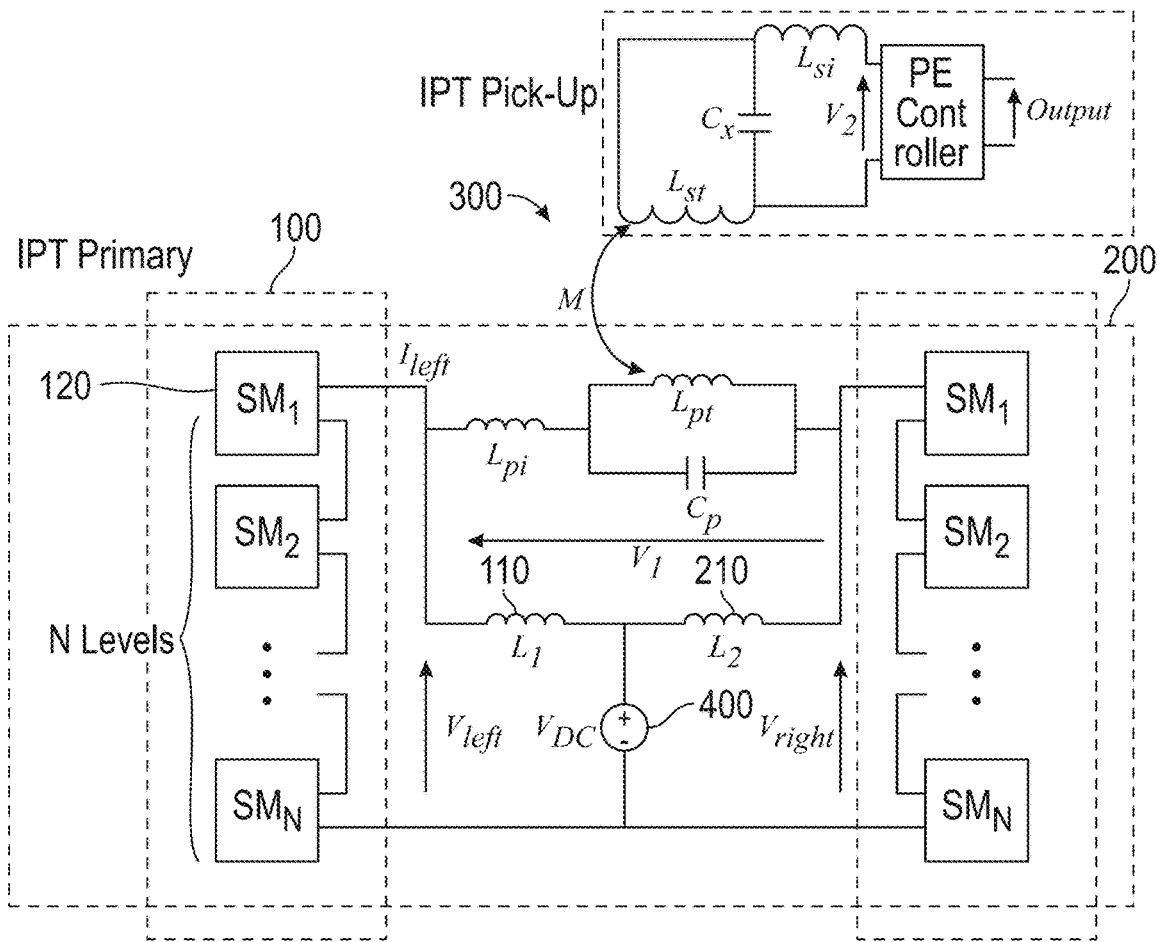
Figure 11D:
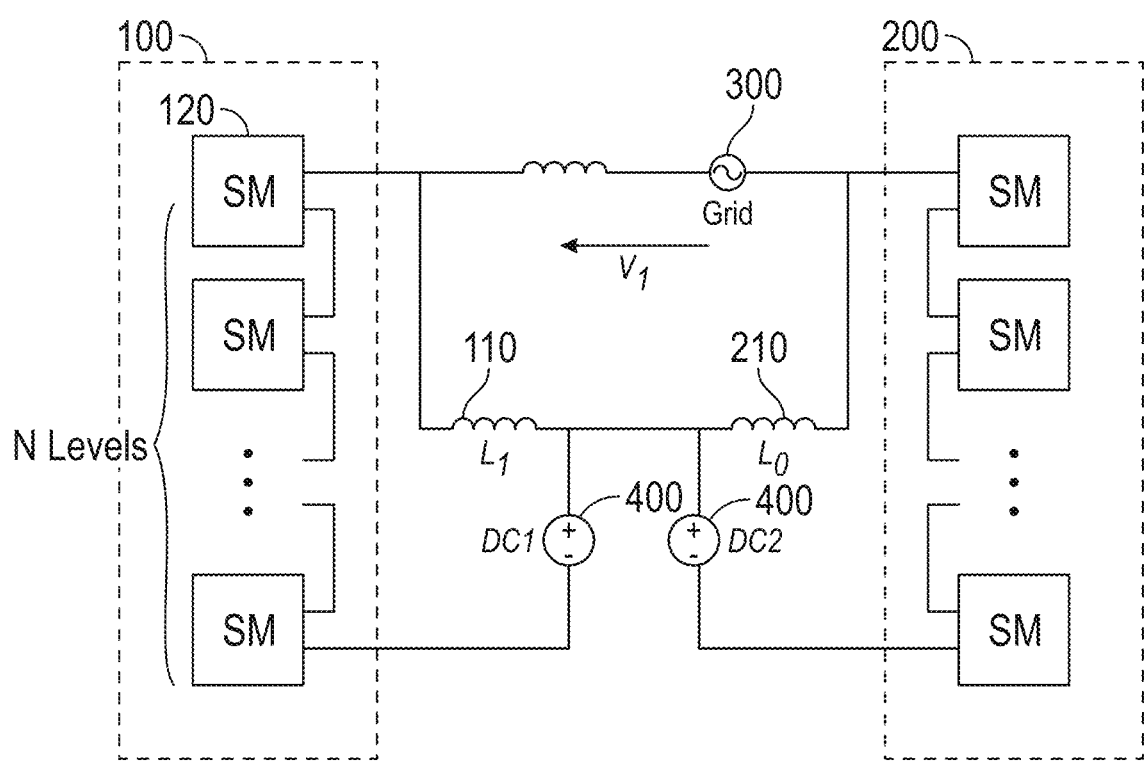

The current flowing into the left-hand side of the converter is marked in FIG. 11(c). When transferring rated power under steady state condition, the current $i_{pi}$ is in phase with $V_{left}$, and the current into the sub modules can be expressed as:

$$\begin{cases} i_{pi} = j\dfrac{k\,V_2}{\omega\,L_{pi}} \\[4pt] i_{L_1} = \dfrac{V_{dc} - V_{left}}{j\,\omega\,L_1} \\[4pt] i_{left} = i_{L_1} - i_{pi} = j\dfrac{V_{dc} - V_{left}}{\omega\,L_1} - j\dfrac{k\,V_2}{\omega\,L_{pi}} \end{cases} \quad (9)$$

The current flowing into the submodules $i_{left}$ is varying depending on $V_{left}$ and $V_2$. Therefore, at different times when a capacitor in a submodule is inserted, the current that is going to charge the capacitor will be different. Because the shape of this current $i_{left}$ changes when the load changes, or when the switching pattern changes, it is difficult to implement a fixed switching pattern to balance to voltage on the capacitors. Instead, a sorting algorithm can be applied to dynamically adjust the order which the capacitors are inserted into the arm according to their voltage level. This algorithm is explained in a flow chart shown in FIG. 12.

The voltage ripples on the capacitor is given by, $$\Delta V_C = \frac{1}{C}\int_0^T i_C\,dt \quad (10)$$

where T is the capacitor voltage sampling period. Therefore, the faster the rate capacitor voltage is sampled, the smaller the voltage ripple on each sub module, hence resulting in better voltage balancing. However, it should be noted that the proposed topology is immune to imbalances in voltages between SMs and unlike in some traditional multilevel converters, voltage imbalances do not lead to circulating currents. Thus, smaller capacitors and a slower sampling time can be tolerated in the proposed system.

Simulations and Control Techniques To validate the proposed multilevel converter, a high power IPT system with 4 submodules on each arm, as shown in FIG. 13, is simulated in MATLAB/PLECS. In order to comply with WPT3 class stated in SAE-J2954, the IPT system is designed for a rated power output of 11 kW. The specifications of the simulation set up are listed in Table 2.

TABLE 2

| Specifications of the Simulated Model | |
|---|---|
| Number of submodules per side | 4 |
| Rated Power | 11.1 kVA |
| DC link voltage | 450 V |
| EV Battery voltage | 850 V |
| Submodule capacitance | 1000 μF |
| DC inductor ($L_1$ and $L_2$) | 200 μH |
| Primary coil inductance ($L_{pt}$) | 26 μH |
| Compensation capacitance ($C_p$) | 134.6 nF |
| IPT coupling factor | 0.3 |
| Switching frequency | 85 kHz |

In an IPT system, the power transfer is a function of magnetic coupling, switching frequency, inductor values, primary and secondary voltages, and the phase angle between them. For a typical system, the inductor values, the coupling factor, the switching frequency, and the phase angle between primary and secondary are usually fixed, hence the preferred method to adjust power delivery is by changing primary and secondary voltages.

In the proposed multilevel converter topology, the primary voltage is made of voltages waveforms produced by sub modules, and is a function of duty cycle $D_k$ and phase angle $\varphi_k$. The equivalent primary voltage can be obtained by calculating the fundamental frequency component of the cascaded multilevel waveform. This can be shown in (12) by substituting n=1 in the derivation for a n-th harmonic component of $V_1$ in (11)

$$V_{1,n(odd)} = \frac{4}{n\pi}V_c\sum_{k=1}^{N}\left[\sin(n\pi D_k)\,\cos(n\omega_0 t - n\varphi_k)\right] \quad (11)$$

$$V_{1,1} = 2\,V_c \sum_{k=1}^{N}\left[\frac{2}{\pi}\sin(\pi D_k)\,\cos(\omega_0 t - \varphi_k)\right] \quad (12)$$

By adjusting the duty cycle or the phase angle between each submodule, different primary voltages can be formed, hence the power delivery can be controlled. FIG. 14 shows the power output and the THD at different combinations of duty-cycles and phase-angles. Note that for each operating point, the duty cycles for all sub module are kept the same, and the phase difference between each sub module is also kept the same.

Given the power level needed by the load, the optimal combination of the duty cycle and the phase angle can be obtained to minimize THD. The optimal combination of duty-cycle and phase modulations for the entire range of V1 voltage is shown in FIG. 15. In order to cope with high power WPT system, it is desired to be operating at a higher voltage level in the V1 spectrum, while THD is still maintained at a low value. The suitable V1 range for the rated power is highlighted in FIG. 15.

In order to reduce the control complexity, the duty cycle is kept the same and only the phase angle is varied. In this case, it is important to find out the desired fixed duty-cycle that would generate high V1 voltage, and also maintain a low THD when phase angle is changed to vary the power delivery. To find out the suitable fixed duty cycle, the duty cycle is the controlled variable, and the relationship between phase angle, V1, and THD can be observed, which is shown in FIG. 16.

By analysing the THD plot, the optimal duty cycle for the proposed system is a fixed value of 0.388, as it produces the lowest THD at the rated power and it provides a lower on-average THD across the whole operating range. To transfer the rated 11.1 kW power, converter should be operated at a $V_1$ of 1209V, which is marked in FIG. 16. By using $V_1$=1209V the appropriate inductance $L_{pi}$, $L_{pt}$, $L_{si}$, $L_{st}$ and the compensating network can be calculated as tabulated in Table 1.

A PI controller, shown in FIG. 17, is used to control the power flow. In a case study, the power reference changes from 3.7 kW to 11.1 kW, the phase angle between each SM changes accordingly, resulting a higher fundamental frequency component in the voltage waveform V1. The steady state waveforms are shown in FIG. 18.

The simulation result shows that the voltage V1 has fundamental frequency component of 1206V amplitude and has a THD of 9.72%. The power output in this case is 11 kW. The THD reduction from the proposed topology in comparison to a traditional H-Bridge converter is presented in FIG. 19.

Modelling the Compensation Network

A simplified circuit diagram of the 5-level IB-MMC based WPT system is shown in FIG. 22. The IB-MMC is modelled by a voltage source, Vpi, whereas the rectifier and the battery is modelled as an equivalent AC resistor, Rac. The circuit was analysed in the phasor-domain at each frequency component of Vpi. Assuming LDC is large and the current through the rectifier is continous, Ibatt is related to Irect as given by, $$I_{batt} = \frac{\pi}{2\sqrt{2}} I_{rect} \quad (13)$$

Therefore, Rac can be expressed as a function of Vbatt and Ibatt as, $$R_{ac} = \frac{\pi^2}{8} R_{Load} = \frac{\pi^2}{8} \frac{V_{batt}}{I_{batt}} \quad (14)$$

The primary coil current, Ipt, and the AC currect sourced by the IB-MMC, Ipi, can be derived as, $$I_{pt} = \frac{V_{pi}}{X_{L_{pi}}} \frac{(X_{L_{pi}}//X_{C_p})}{(X_{L_{pi}}//X_{C_p}) + X_{L_{pi}} + Z_{pr}} \quad (15)$$

$$I_{pi} = \frac{V_{pi}}{X_{L_{pi}} + (X_{C_p}//(X_{L_{pi}} + Z_{pr}))}$$

where $$Z_{pr} = \frac{\omega^2 M^2}{X_{L_{st}} + (X_{C_p}//R_{ac})} \quad (16)$$

Similarly, Irect can be derved as given by, $$I_{rect} = I_{sc} \frac{(X_{L_{st}}//X_{C_o})}{(X_{L_{st}}//X_{C_s}) + R_{ac}} \quad (17)$$

where $$M = k\sqrt{L_{pt}L_{st}} \quad (18)$$

$$I_{sc} = \frac{V_{oc}}{j\omega L_{st}} = \frac{MI_{pt}}{L_{st}}$$

In order to minimize the VA rating of the converters, both primary and secondary compensation networks are typically tuned to the fundamental frequency fT of Vpi, as given by $$j\omega L_{pi} = \frac{1}{j\omega C_p} = j\omega L_{pt} \quad (19)$$

$$j\omega L_{st} = \frac{1}{j\omega C_s}$$

where, $\omega = 2\pi f_T$.

Under tuned conditions, (15) and (17) can be simplified to $$I_{pt} = \frac{V_{pi}}{X_{L_{pi}}} \quad (20)$$

$$I_{rect} = I_{sc} = \frac{MI_{pt}}{L_{st}}$$

Therefore, using (13) and (20) the power delivered to the battery can be given by $$P = V_{batt}I_{batt} = \frac{\pi}{2\sqrt{2}} \frac{k\sqrt{L_{pt}L_{si}}}{X_{L_{pi}}L_{st}} V_{pi}V_{batt} \quad (21)$$

Compensation Techniques

Multilevel Control and Phase-angle Control

In a typical WPT system, the magnitude of power transferred to the load is regulated by controlling the amplitudes of primary converter voltage and secondary power converter output current. However, the proposed system in this disclosure as shown in FIG. 21(a), focuses mainly on the primary IBMMC inverter, and employs a passive diode rectifier for the secondary. Therefore, the power is regulated by controlling the primary output voltage, denoted by Vpi.

According to eq. (21), the power output is proportional to the inverter output voltage. In order to analyse the relationship between the coupling factor and the primary inverter voltage required for a desired power level, (21) can be normalised to:

$$P = \frac{\pi}{2\sqrt{2}} kAM_{V_{pi}} V_{DC} V_{batt} \quad (22)$$

where $$M_{V_{pi}} = \frac{V_{pi}}{V_{DC}} \text{ and } A = \frac{\sqrt{L_{pi}L_{st}}}{X_{L_{pi}}L_{st}}. \quad (23)$$

In the new power equation arrangement, the term A describes the magnetics employed for a WPT system, and MVpi is the modulation index, describing the relationship between the amplitude of the inverter output voltage and the DC source voltage. According to the WPT2 system requirement stated in SAE standard, at 7.7 kW power level, the relationship between the modulation index and the coupling factor is shown in FIG. 21 at different values of the magnetic components A. Note, a higher A value normally represents more circulating currents in the compensation networks, but the discussion on the magnetics is out of scope for this paper. The value of A in the setup used for this analysis is 0.185, and the system parameters will be discussed below.

According to FIG. 23, at higher coupling points, to transfer the same amount of power, the modulation index, MVpi decreases, meaning the voltage driving the LCL compensation network is lower, as a result, the inverter current will increase. Whereas at positions with lower coupling factor, MVpi increases to maintain the same power level, this results in a lower inverter current and a higher track current. Therefore, the efficiencies at varying coupling factors can be simulated and are shown in FIG. 24.

The proposed IB-MMC can also provide the opportunity to operate in the 3-level mode, especially when the coupling factor is high, the required output voltage Vpi is relatively low. The 3-level mode will permanently bypass one SM in each arm, leaving only one half-bridge in operation in each arm, thus creating the 3-level waveform. The advantage of reducing the number of levels is the reduction in switching losses, although the RMS output voltage and inverter current remain the same for both modes, 3-level mode has 4 switching instances as opposed to 8 in the 5-level mode. This is demonstrated in FIG. 24 where the blue line indicates the performance of the 3-level mode and the red line indicates the performance of the 5-level mode. However, the limitation of the 3-level mode is the higher THD on the output voltage as well as higher voltage stress on the switches. When a higher modulation index is required for situations with lower coupling factor, the voltage stress will be applied on a single SM instead of sharing it with other SMs in the arm, this voltage value can exceed the rated voltage for the switches and the capacitors in the SM. Therefore, in the IB-MMC used for this analysis, the transition between 3-level mode and 5-level mode happens at a coupling factor of 0.2, as shown by the vertical dotted line in FIG. 24. The nature of an adjustable number of levels in the IB-MMC enables the opportunity to operate with the most suitable number of levels in its output waveform.

Since the IB-MMC based WPT system utilises a primary controller as shown in eq. (21), according to eq. (5), the amplitude of Vpi can be altered by controlling either D or φ, or both D and φ concurrently. Although changing both D and φ can result in Vpi values with the lowest THD at different modulation index according to (14), the required controller can become complex, as the SM voltage changes with a changing duty-cycle. Therefore, for the 5-level mode operation, D is maintained constant at a predetermined semi-optimum value and φ is changed to control the modulation index, thus to regulate the power, as trajected by the red dashed line in FIG. 25. In this specific example, when the coupling factor exceeds 0.2, the required MVpi becomes lower than 1.2, the controller changes IB-MMC to 3-level mode, as shown in FIG. 25. In this region, D is the only control variable, and its trajectory is plotted in black dashed line.

Capacitor Voltage Balancing

According to (16), the current entering the SM is related to the inverter current Ipi and DC inductor current IL1. Therefore, through one switching period, depending on D and φ, SMs inserted at different times will have a different amount of accumulated current flowing through them, which results in a different rate of change on the capacitor voltages. Eventually, the capacitor in one SM in an arm will be charged to VDC/D while rest of capacitors in the same arm will have 0 V. To prevent this from happening, a voltage balancing algorithm is implemented to ensure the net charge gain/loss in all the SMs are zero, as shown in FIG. 26.

The balancing algorithm measures the capacitor voltages in the SMs in one arm, and compares them at a certain frequency, $f_{compare}$. Based on the voltage levels, the algorithm determines the overcharged and undercharged SMs, and swaps their charging order, to allow an overall balanced charging speed. Therefore, with the operations of the voltage balancing algorithm, the variation in the SM voltages is maintained at $$\Delta V_C = \frac{f_{compare}}{f_T} \frac{1}{C_{SM_N}} \int_{t_N}^{t_N+DT} I_{SM} dt \quad (24)$$

where $t_N$ is the instance when the Nth SM is inserted, and T is the switching period of the IB-MMC inverter.

Experimental Results

WPT2 System Parameter Selection

In order to verify the viability of the proposed IB-MMC power converter, a prototype 7.7 kW WPT system that complies with SAE J2954 standard WPT2/Z2 class was designed and built. DD type magnetic pad were used as the universal primary pad and the WPT2/Z2 secondary pad. The coil structure, ferrite arrangement and pad sizes were designed to match with the standard to the best of the ability in the laboratory. The magnetic coupling factor was measured at the three points specified in the standard, the best coupling point (Z-height of 140 mm, no misalignment), the nominal coupling point (Z-height of 175 mm, no misalignment) and the worst coupling point (Z-height of 210 mm, 75 mm misaligned in X direction, 100 mm misaligned in Y direction), they were 0.23, 0.18 and 0.11, respectively. The measured coupling factors were somewhat different to the values specified in the standard, this is due to manufacturing errors and the lack of the large shielding aluminium sheet that simulates the car body.

Given the values of primary and secondary pads, appropriate component values for the compensation network were calculated using eqs. (19) and (21). The maximum voltage and current stress in each component were calculated using eqs. (15), (1) and (25), and the appropriate semiconductor devices and inductors were selected. The parameters of the prototype system are presented in Table. III.

TABLE III

Parameters of the proposed system

| Parameter | Value | | ESR | |
|---|---|---|---|---|
| Lpi | 38.5 | uH | 40 | mOhm |
| Cp | 91 | nF | 7 | mOhm |
| Lpt | 68.04 | nH | 70 | mOhm |
| Clp | 119 | nF | 5 | mOhm |
| Lst | 72.88 | nH | 95 | mOhm |
| Cls | 66.6 | nF | 9 | mOhm |
| Cs | 175 | nF | 4 | mOhm |
| LDC | 480 | uH | 30 | mOhm |
| CSM | 80 | uF | — | |
| L1, L2 | 430 | uH | 27 | mOhm |
| f | 85 | kHz | | |
| VDC, Vbatt | 400 | V | | |
| Switches | C3M0065090D | | | |
| Diodes | GDP30P120B | | | |

To validate the accuracy of the mathematical model and its ability to predict the behaviour of an IB-MMC based WPT system, experimental waveforms of the prototype system are demonstrated along with the waveform derived from the mathematical model, as shown in FIGS. 27(a-c). Note that FIG. 27(a) also shows the input voltage on the secondary diode rectifier and the output current flowing into the battery. Since the battery voltage is constant, and the power transferred is maintained constant, the secondary voltage and current waveform is expected to be identical at different coupling positions, thus it is only shown once.

At the lowest coupling position, the duty-cycle of the SM in the IB-MMC is controlled to be 35%, and the phase angle between the SMs is 0.51 rad, this results in a 5-level staircase voltage waveform Vpi with the highest amplitude, as demonstrated in FIG. 27(a), which validates the concept of IB-MMC. Since the output voltage is the highest at the worst coupling position, inverter current Ipi is the lowest, as a result, the losses in the switches are relatively low and the coil loss is relatively high. At the nominal position, the duty-cycle of IB-MMC stays at 35% and the phase-angle is 1.7 rad. This results in a lower output voltage and hence a higher inverter current, as shown in FIG. 27(b). Compare to the worst coupling position, the coil loss is lower and the losses in the switches are higher. Whereas at the best coupling position, the output voltage is low enough that the IB-MMC is operating in the 3-level mode with a D of 68% to reduce the switching losses. In this position, the primary coil current is the lowest and the inverter current is the highest, as shown in FIG. 27(c).

The efficiency of the IB-MMC based WPT2 system was measured using Yokogawa T1800 power analyser and the results are 92.4%, 91.9% and 91.8% at worst, nominal and best coupling positions, respectively, and the THD of the experimental voltage waveform is 16.3%, 31.6% and 32.6%. The unusual lower efficiency at higher coupling position is because of the higher losses in the semiconductors dominating the coil losses, which can be addressed by using higher performance devices.

To validate the capacitor voltage balancing algorithm, the experimental capacitor voltage waveforms are captured in FIG. 11. The algorithm activates every 50 switching cycles, which is 1.7 kHz. At this rate, the nominal voltage variation is kept below 4.7 V, which aligns with eq.(24). The larger 14 V voltage variation appeared in the experiment is due to the noises in the ADC signal, and the slight difference in the SM average voltages is due to the tolerances in the voltage sensing circuit.

Furthermore, for a typical WPT system, the preferred method to adjust power delivery is by changing primary and secondary voltages. However, in the proposed multilevel converter topology, the main focus is on the IB-MMC applied on primary side and the secondary is assumed to be a simple rectifier circuit, hence the power regulation is achieved by regulating primary voltage. As aforementioned in (6), the equivalent primary voltage is the fundamental frequency component of the cascaded multilevel waveform. An IB-MMC with 2 SMs in each arm is selected for analysis, there are three methods of changing primary voltage, by either adjusting the duty-cycle or the phase-angle between each SM, or both the duty-cycle and the phase-angel. The last method results in an optimal combination of the duty-cycle and the phase-angel at each specific loading condition. FIG. 5(a) demonstrates the change in the THD for different combinations of duty-cycle and phase-angle, and region A shows the optimal combination where the THD is the lowest at 16.3%. FIG. 5(b) shows the power level with respect to the rated power at each loading condition.

Although the proposed converter provides the freedom for adjusting both duty-cycle and phase angle, as show in (2), changing the duty-cycle results in a change in capacitor voltage Vc, which has a long settling time and reduces the system stability and increases control complexity. Therefore, the duty-cycle is kept constant and only the phase angle is varied to control the power level. A PI controller shown in FIG. 6 is used to control the power flow. The power reference changes from 100% to 70% of the rated power, the phase angle between each SM changes accordingly, resulting the change in voltage waveform Vpi. The steady state waveforms are shown in FIG. 7

Capacitor voltage balancing is applied post the phase modulation control, and is done by sampling and ranking each capacitor voltage and swapping the switching order accordingly. However, it should be noted that the proposed topology is immune to imbalances in voltages between SMs and unlike in some traditional multilevel converters, voltage imbalances do not lead to circulating currents.

To validate the proposed multilevel converter, an 11 kW WPT system with 2 SMs on each arm is simulated in MATLAB/PLECS, it complies with WPT3 class stated in SAE-J2954 standard, and the specifications of the simulation set up are listed in Appendix A. The simulated waveforms of Vpi, Ipi and Ipt are shown in FIG. 8, the efficiency of the simulated converter is 93.3% and the THD of voltage Vpi is 16.3%, as supposed to close to 30% in a standard H-bridge converter.

Compared to a modular multilevel converter, the proposed system provides four times higher voltage which results in a lower conduction loss at the rated power, and the proposed system only utilizes a single DC source in this example. The simulation results show that the system is suitable for delivering 11 kW power, which is a WPT level 3 converter and it complies with the SAE-J2954 standard. The staircase voltage waveform connected to the IPT system has a low THD of 9.72% as supposed to close to 30% in a standard H-bridge topology. As shown in simulation, the overall efficiency is 95.1%, making it ideal for high power systems.

An integrated boost modular multilevel converter (IB-MMC) for high-power EV charging applications is also disclosed. Due to the unique boost converter configuration, the proposed IB-MMC is able to generate a staircase voltage waveform with high amplitude and low THD from a single DC source. The operating principles of a 5-level IB-MMC have also been presented. A comprehensive mathematical model that is able to predict the steady-state voltage and current has also been disclosed. The ability of the IB-MMC to operate in both 3-level mode and 5-level mode has been disclosed, and a phase modulation control has been adopted to regulate the power at varying coupling positions. A 7.7 kW WPT experiment utilising DD pads compatible with the SAE J2954 WPT2/Z2 standard verifies the viability of the IB-MMC. With the readily available equipment in the laboratory, the maximum efficiency of 92.4% is measured at the offset position.

This current multilevel converter topology can be used for applications including but not limited to HVDC, high power motor drive, and high power wireless EV charging system. In summary, comparison to a modular multilevel converter, the proposed system provides four times higher voltage which results in a lower conduction loss at the rated power, and the proposed system only utilizes a single DC source. Capacitor voltage balancing is simply achieved through a sorting algorithm, which can balance the capacitor voltage by changing the charging order.

Throughout the description like reference numerals have been used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this disclosure has been described by way of example and with reference to possible embodiments thereof, it is to be understood that modifications or improvements may be made thereto without departing from the scope of the disclosure. The disclosure may also be said broadly to consist in the parts, elements and features referred to or indicated in the specification of the application, individually or collectively, in any or all combinations of two or more of said parts, elements or features. Furthermore, where reference has been made to specific components or integers of the disclosure having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A system comprising:
a tuned coil;
at least one stack of switchable submodules connected to the tuned coil by a first current path; and
a DC input connected to the stack of switchable submodules by a second current path, wherein
the system is a resonant wireless power transfer system,
the first current path does not include an inverter circuit,
the second current path bypasses the tuned coil and
at least one of:
the first and second current paths both lead to one stack of the at least one stack; or
the system is configured to wirelessly inductively charge, via the tuned coil, an object movable to the system for charging and movable from the system after charging.

2. The resonant wireless power transfer system of claim 1, wherein the resonant wireless power transfer system comprises:
a compensation network for the coil;
a first stack of switchable submodules connected to a first side of the compensation network; and
a second stack of switchable submodules connected to a second side of the compensation network,
wherein the resonant wireless power transfer system is configured to produce an AC voltage across the compensation network by alternately switching, at substantially the resonant frequency of the compensation network, the switchable submodules of the first stack of switchable submodules and the switchable submodules of the second stack of switchable submodules to produce complementary switching states in the first stack of switchable submodules and the second stack of switchable submodules.

3. The resonant wireless power transfer system of claim 1, wherein the resonant wireless power transfer system comprises:
a DC inductor in the second current path, wherein
the resonant wireless power transfer system is configured to control the current in the second current path, by modulating the switching state of the switchable submodules in the at least one submodule stack, to boost the voltage applied to the switchable submodules of the at least one submodule stack to a voltage that exceeds the voltage of the DC input.

4. The resonant wireless power transfer system of claim 1, wherein the resonant wireless power transfer system is configured to have substantially zero DC offset across the tuned coil.

5. The resonant wireless power transfer system of claim 1, wherein the resonant wireless power transfer system comprises an LCL tuned network.

6. The resonant wireless power transfer system of claim 1, wherein the resonant wireless power transfer system comprises:
a compensation network, for the tuned coil, in the first current path; and
at least one DC inductor in the second current path,
wherein the DC inductor is connected in parallel with the compensation network and the tuned coil.

7. The resonant wireless power transfer system of claim 1, wherein the resonant wireless power transfer system comprises:
a single DC input, wherein
the resonant wireless power transfer system is configured to extract energy from the single DC input by switching the switchable submodules of the at least one stack to produce a DC voltage, across the switchable submodules of the at least one stack, that exceeds the voltage of a voltage source connected to the single DC input.

8. The resonant wireless power transfer system of claim 1, wherein the resonant wireless power transfer system is configured so that the first current path and the second current path overlap on a same side of the tuned coil.

9. The resonant wireless power transfer system of claim 1, wherein a third current path that leads from the DC input leads to a location of the resonant wireless power transfer system between the tuned coil and a first switchable submodule of the at least one stack of the switchable submodules.

10. The resonant wireless power transfer system of claim 1, wherein the at least one stack of switchable submodules includes two stacks of switchable submodules, and the first and second paths lead to one of the two stacks.

11. The resonant wireless power transfer system of claim 1, wherein:
the first and second current paths both lead to one stack of the at least one stack.

12. The resonant wireless power transfer system of claim 1, wherein:
the system is configured to wirelessly inductively charge, via the tuned coil, the object movable to the system for charging and movable from the system after charging.

13. The resonant wireless power transfer system of claim 1, wherein:
the first and second current paths both lead to one stack of the at least one stack; and
the system is configured to wirelessly inductively charge, via the tuned coil, the object movable to the system for charging and movable from the system after charging.

14. A wireless power transfer primary comprising:
a coil;
a compensation network for the coil;
at least one stack of switchable submodules connected to the compensation network;
a single DC source connected to the at least one stack of switchable submodules; and
a DC inductor connected in series with the DC source and the at least one stack of switchable submodules, wherein
the DC inductor is connected in parallel with the coil and the compensation network.

15. The wireless power transfer primary of claim 14, wherein the wireless power transfer primary is configured to switch the switchable submodules of the at least one stack of switchable submodules to produce an AC waveform across the compensation network, and to boost voltage across the at least one stack of switchable submodules to a voltage that exceeds the voltage of the single DC source.

16. The wireless power transfer primary of claim 14, wherein the wireless power transfer system comprises:
a first stack of switchable submodules connected to a first side of the compensation network;
a first DC inductor connected in series with the DC source and the first stack of switchable submodules;
a second stack of switchable submodules connected to a second side of the compensation network; and
a second DC inductor connected in series with the DC source and the second stack of switchable submodules, wherein
the first DC inductor and the second DC inductor are connected in parallel with the compensation network and the coil, and the wireless power transfer system is configured to operate the switchable submodules of the first submodule stack, at substantially the frequency of the compensation network, to boost voltage across the first submodule stack to a voltage that exceeds the voltage of the single DC source, and the wireless power transfer system is configured to operate the switchable submodules of the second submodule stack, at substantially the resonant frequency of the compensation network and 180° out of phase with the switchable submodules of the first submodule stack, to boost voltage across the second submodule stack to a voltage that exceeds the voltage of the single DC source.

17. The wireless power transfer primary of claim 14, wherein the wireless power transfer system comprises:
a first stack of switchable submodules connected to a first side of the compensation network; and
a second stack of switchable submodules connected to a second side of the compensation network, wherein
the wireless power transfer primary is configured to produce an AC voltage across the compensation network by operating the switchable submodules of a first stack of switchable submodules and the switchable submodules of the second stack of switchable submodules at substantially the resonant frequency of the compensation network and 180° out of phase to produce alternating switching states in the first stack of switchable submodules and the second stack of switchable submodules.

18. A method comprising:
producing an AC voltage waveform with a multilevel converter by controlling a switching state of switchable submodules of the multilevel converter; and
applying the AC voltage waveform to a compensation network of an inductive power transfer primary to make power available for inductive power transfer, the compensation network having a resonant frequency, wherein
the method comprises the multilevel converter operating the switchable submodules at substantially the resonant frequency of the compensation network, and
the method also comprises controllably bypassing one or more respective capacitors of the switchable submodules to increase energy in a DC inductive element and then transferring the increased energy from the DC inductive element to at least one of the previously bypassed one or more respective capacitors.

19. The method of claim 18, wherein the method further comprises:
extracting with the multilevel converter energy from a single DC source; and
applying a DC voltage to the switchable submodules of the multilevel converter while the multilevel converter is applying the AC voltage waveform to the compensation network of the inductive power transfer primary, wherein the DC voltage applied to the switchable submodules exceeds the voltage of the single DC source.

20. The method of claim 18, wherein the method comprises:
controlling with the multilevel converter the switching state of the switchable submodules to boost a DC voltage applied to the switchable submodules; and
boosting, with the multilevel converter, the DC voltage applied to the switchable submodules concurrently with producing the AC voltage waveform.

21. The method of claim 18, wherein the method comprises:
controlling, with the multilevel converter, current through a DC inductor of the multilevel converter by modulating the switching state of switchable submodules within at least one submodule stack; and
operating the at least one submodule stack, in combination with the DC inductor of the multilevel converter, as a boost converter.

22. The method of claim 18, wherein the method comprises:
regulating, with the multilevel converter, voltage of individual switchable submodules of the multilevel converter by controlling a duty cycle of the individual switchable submodules.

23. The method of claim 22, wherein the method comprises:
operating, with the multilevel converter, the switchable submodules of the multilevel converter to substantially balance a charge level of the switchable submodules of the multilevel converter.

24. The method of claim 18, wherein the method comprises:
combining, with the multilevel converter, voltage waveforms from at least two submodule stacks to produce the AC voltage waveform applied to the compensation network.

25. The method of claim 24, wherein the method comprises:
alternating, with the multilevel converter, the switching state of switchable submodules in the at least two submodule stacks, at substantially the resonant frequency of the compensation network, to produce the voltage waveforms, wherein
the multilevel converter operates the switchable submodules of a first of the at least two submodule stacks 180° out of phase with the switchable submodules of a second of the at least two submodule stacks.

26. The method of claim 24, further comprising supplying current to the two submodule stacks by a DC power source having a first terminal and a second terminal, the first terminal being a positive or negative terminal and the second terminal being the other of the positive or negative terminal, and a first current path exists between the first terminal to an input of a first submodule stack of the at least two submodule stacks and a second current path exists between the first terminal to an input of a second submodule stack of the at least two submodule stacks, the first current path bypassing the second submodule stack and the second current path bypassing the first submodule stack.

27. The method of claim 24, wherein the at least two submodule stacks include a first submodule stack and a second submodule stack, and wherein the method comprises supplying current to respective inputs of the first submodule stack and the second submodule stack using only passive components.

28. The method of claim 24, wherein the action of combining to produce the AC voltage waveform is executed without a full-bridge converter.

29. The method of claim 24, further comprising storing energy in and discharging energy from a first inductance element and a second inductance element, one of the first inductance element or the second inductance element corresponding to the DC inductive element, wherein the discharge of energy from the first inductance element provides energy to a first of the submodule stacks of the at least two submodule stacks and the discharge of energy from the second inductance element provides energy to a second of the submodule stacks of the at least two submodule stacks to charge the submodule stacks to produce the AC voltage.

30. The method of claim 29, further comprising transferring DC current from a DC power source to the first inductance element and the second inductance element to charge the first and second inductance element, wherein the first inductance element and the second inductance element is connected to a same side of the DC power source.

31. The method of claim 24, wherein the at least two submodule stacks include a first submodule stack and a second submodule stack, and wherein the method comprises supplying current from a DC power source to respective inputs of the first submodule stack and the second submodule stack, wherein the action of supplying current includes passively varying respective amounts of current supplied from the DC power source to the respective inputs.

32. The method of claim 18, wherein the method comprises:
operating with the multilevel converter the switchable submodules to produce an AC staircase voltage waveform; and
applying the AC staircase voltage waveform to the compensation network.

33. The method of claim 18, wherein:
the action of producing the AC voltage waveform is executed without an inverter circuit.

* * * * *